(12) United States Patent
Kodama

(10) Patent No.: US 6,999,835 B2
(45) Date of Patent: Feb. 14, 2006

(54) CIRCUIT-SUBSTRATE WORKING SYSTEM AND ELECTRONIC-CIRCUIT FABRICATING PROCESS

(75) Inventor: Seigo Kodama, Aichi-ken (JP)

(73) Assignee: Fuji Machine Mfg. Co., Ltd., Chiryu (JP)

( * ) Notice: Subject to any disclaimer, the term of this patent is extended or adjusted under 35 U.S.C. 154(b) by 379 days.

(21) Appl. No.: 10/197,458

(22) Filed: Jul. 18, 2002

(65) Prior Publication Data

US 2003/0027363 A1    Feb. 6, 2003

(30) Foreign Application Priority Data

Jul. 23, 2001    (JP) .............................. 2001-220967

(51) Int. Cl.
*G06F 19/00*    (2006.01)
*G05B 13/00*    (2006.01)

(52) U.S. Cl. ...................... 700/121; 700/28; 700/108; 702/81

(58) Field of Classification Search ............ 700/28–33, 700/49–52, 56–64, 79–81, 108–114, 117–121; 702/116–119, 121, 123, 81–84; 324/601, 324/602, 511, 512, 537, 765; 714/724
See application file for complete search history.

(56) References Cited

U.S. PATENT DOCUMENTS

| 5,692,292 | A | * | 12/1997 | Asai et al. ..................... 29/740 |
| 5,758,410 | A | * | 6/1998 | Asai et al. ..................... 29/740 |
| 5,930,140 | A | * | 7/1999 | Asai et al. ................... 700/121 |
| 6,161,277 | A | * | 12/2000 | Asai et al. ..................... 29/740 |
| 6,286,202 | B1 | * | 9/2001 | Asai et al. ..................... 29/740 |
| 6,334,097 | B1 | * | 12/2001 | Yoshitake et al. .......... 702/185 |
| 6,374,484 | B1 | * | 4/2002 | Yoshida et al. ............... 29/740 |
| 6,433,561 | B1 | * | 8/2002 | Satya et al. .................. 324/753 |
| 6,456,951 | B1 | * | 9/2002 | Maeda et al. ................. 702/81 |
| 6,507,997 | B1 | * | 1/2003 | Kawai et al. ................. 29/833 |
| 6,556,955 | B1 | * | 4/2003 | Yoshitake et al. .......... 702/185 |
| 6,643,921 | B1 | * | 11/2003 | Asai et al. ..................... 29/833 |
| 6,647,303 | B1 | * | 11/2003 | Johnson et al. ............... 700/95 |
| 6,671,570 | B1 | * | 12/2003 | Schulze ...................... 700/121 |

(Continued)

FOREIGN PATENT DOCUMENTS

JP    A 5-7100    1/1993

(Continued)

*Primary Examiner*—Maria N. Von Buhr
(74) *Attorney, Agent, or Firm*—Oliff & Berridge, PLC

(57) ABSTRACT

An electronic-circuit fabricating system wherein an inspecting machine is provided for each of working machines such as a mask printing machine and an electronic-component mounting machine, to inspect a result of an operation of each working machine, and a monitoring device is arranged to receive information on monitoring-object portions of the working machines and information on the inspected result of the operation, to estimate the present state of each monitoring-object portion on the basis of these kinds of information, to obtain a tendency of change of the present state on the basis of the present state and stored past data, and to monitor the working machines so that the present state does not exceed a predetermined threshold state. When the present state of the monitoring-object portion has exceeded the thresholds state, the monitoring device estimates a cause for an abnormality of the working machine on the basis of the information on the working machine and the inspected result, and automatically compensates control data or activates a monitor or indicator to prompt the operator to implement a suitable treatment.

31 Claims, 37 Drawing Sheets

U.S. PATENT DOCUMENTS

| | | | |
|---|---|---|---|
| 6,718,626 B1 * | 4/2004 | Kawada | 29/740 |
| 6,724,211 B1 * | 4/2004 | Chen et al. | 324/765 |
| 6,727,106 B1 * | 4/2004 | Ankutse et al. | 438/5 |
| 6,732,003 B1 * | 5/2004 | Bolotin | 700/112 |
| 6,759,256 B1 * | 7/2004 | Makita | 438/14 |
| 6,775,899 B1 * | 8/2004 | Tomomatsu et al. | 29/593 |
| 6,788,989 B1 * | 9/2004 | Kodama | 700/117 |
| 6,792,366 B1 * | 9/2004 | Hosoya et al. | 702/83 |
| 6,792,367 B1 * | 9/2004 | Hosoya et al. | 702/83 |
| 2002/0116083 A1 * | 8/2002 | Schulze | 700/108 |
| 2003/0040830 A1 * | 2/2003 | Parikh et al. | 700/121 |
| 2004/0173464 A1 * | 9/2004 | Parikh et al. | 205/157 |

FOREIGN PATENT DOCUMENTS

JP　　　A 11-330798　　　11/1999

\* cited by examiner

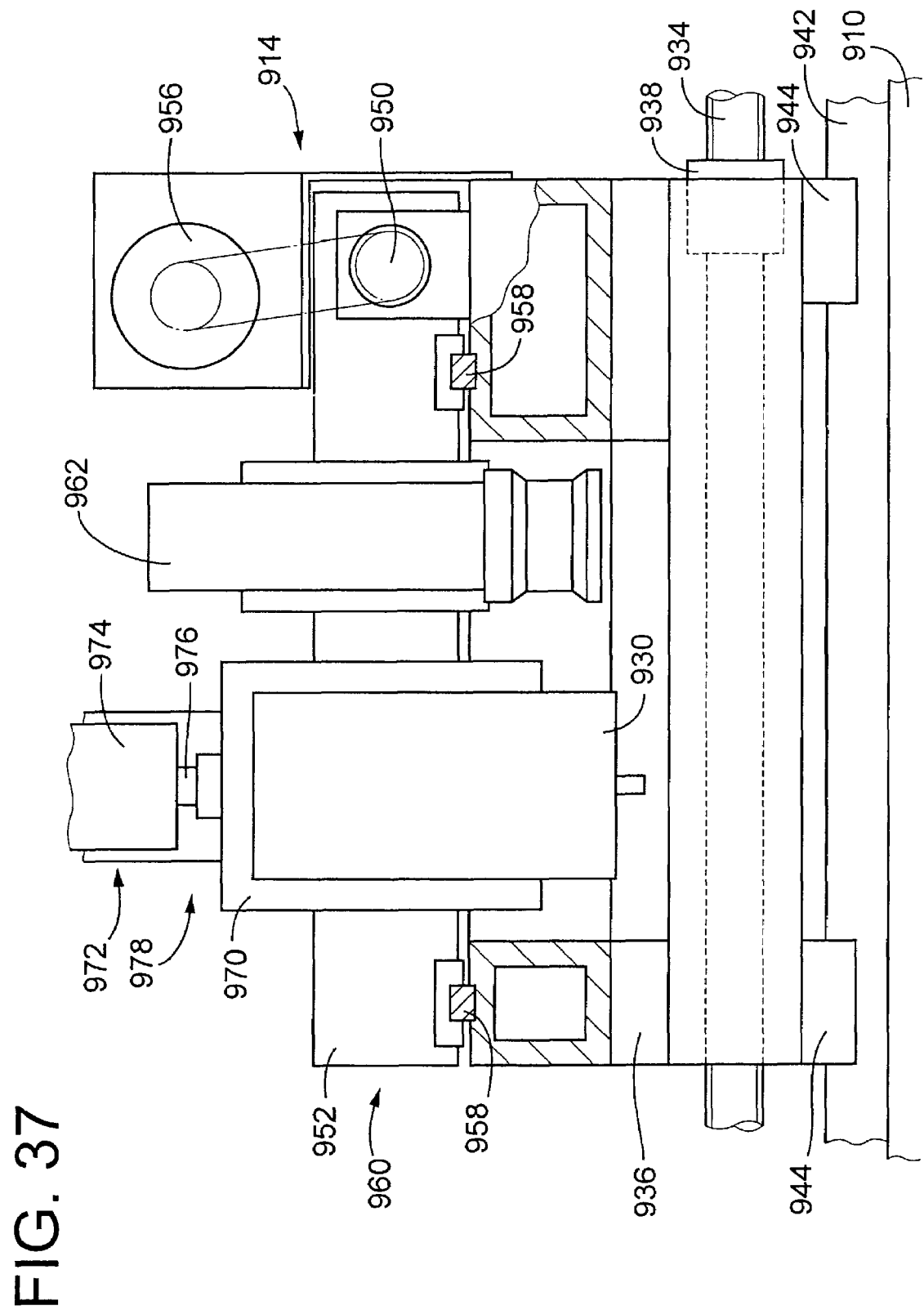

CIRCUIT-SUBSTRATE WORKING SYSTEM AND ELECTRONIC-CIRCUIT FABRICATING PROCESS

BACKGROUND OF THE INVENTION

1. Field of the Invention

The present invention relates to a circuit-substrate working system and an electronic-circuit fabricating process, and more particularly to a circuit-substrate working system including at least one working machine each arranged to perform a predetermined working operation on a circuit substrate, such as an electronic-component mounting machine arranged to mount electronic components on a circuit substrate such as a printed-wiring board, and a high-viscosity-fluid applying machine arranged to apply a highly viscous fluid such as a solder paste or cream or an adhesive agent to the circuit substrate. The invention is also concerned with an electronic-circuit fabricating process using such a circuit substrate working system.

2. Discussion of Related Art

In an electronic-circuit fabricating system including an electronic-component mounting machine, it has been practiced to inspect an electronic circuit after fabrication thereof. Conventionally, however, electronic components are visually inspected by the operator of the fabricating system or by taking images of the electronic components with an image-taking device, after the electronic components are mounted on the circuit substrate by the electronic-component mounting machine, provisionally fixed on the circuit substrate with a solder paste or cream or adhesive agent, and finally fixed on the circuit substrate in a re-flow furnace or a curing furnace. The electronic components are inspected to check if the electronic circuit is normally fabricated.

The assignee of the present application proposed an electronic-component mounting device provided with an inspecting device including an image-taking device arranged to take an image of each electronic component mounted on the circuit substrate, for early detection of any defect or abnormality in the component-mounting operations. An example of this type of electronic-component mounting device is disclosed in JP-A-11-330798. This type of electronic-component mounting device permits early detection of any defect in the component-mounting operations, and early treatment necessary to correct the defect.

SUMMARY OF THE INVENTION

However, both of the inspections indicated above suffer from a problem of difficulty in finding a cause for the detected defect. This problem is encountered not only in a circuit-substrate working system including an electronic-component mounting machine, but also in a circuit-substrate working system including a high-viscosity-fluid applying machine or any other working machine as well as the electronic-component mounting machine. The present invention was made in view of the background situation described above. It is an object of the present invention to permit easy finding of a cause for a detected defect in working operations on a circuit substrate. This object may be achieved according to any one of the following modes of this invention in the form of a circuit-substrate working system or an electronic-circuit fabricating process, each of which is numbered like the appended claims and depends from the other mode or modes, where appropriate, for easy understanding of the invention. It is to be understood that the present invention is not limited to the technical features of the following modes or any combinations thereof. It is to be further understood that a plurality of elements or features included in any one of the following modes of the invention are not necessarily provided all together, and that the invention may be embodied with only selected one or ones of the elements or features described with respect to the same mode.

(1) A circuit-substrate working system comprising:

at least one working machine each operable to perform a predetermined operation on a circuit substrate and to transmit object information relating to at least one monitoring-object portion thereof to be monitored;

at least one result-detecting device each operable to detect a result of the operation performed by the at least one working machine; and a monitoring device operable on the basis of the result detected by each result-detecting device and the object information received from the at least one working machine, to estimate a state of each of the at least one monitoring-object portion.

The present state of each monitoring-object portion of the at least one working machine can be estimated on the basis of a combination of the object information supplied from the at least one working machine and the result of the operation detected by each result-detecting device. The state of each monitoring-object portion can be recognized with high reliability by a statistical processing portion arranged to effect a statistical processing of the present states of a plurality of monitoring-object portions estimated by a present-state estimating portion. The state of each monitoring-object portion can be recognized with higher reliability on the basis of a tendency of change of the state of each monitoring-object portion obtained by a change-tendency obtaining portion on the basis of the present states successively estimated by the present-state estimating portion. The state of each monitoring-object portion can be more effectively recognized by a critical-point estimating portion, or a critical-point-approaching indicating device. The critical-point estimating portion is arranged to estimate a critical point of time at which the state of each monitoring-object portion is expected to exceed a threshold state. The critical-point-approaching indicating device is arranged to inform the operator that the critical point of time estimated by the critical-point estimating portion will be reached in the near future.

(2) A circuit-substrate working system according to the above mode (1), wherein said monitoring device includes a treatment-necessity detecting portion operable to detect a necessity to implement a treatment for at least one of the at least one monitoring-object portion, before the at least one of the at least one monitoring-object portion causes an abnormality of the predetermined operation.

For example, the treatment-necessity detecting portion is arranged to detect the necessity to implement a treatment for a given monitoring-object portion, on the basis of the critical point of time estimated by the above-indicated critical-point estimating portion. Alternatively, the treatment-necessity detecting portion is arranged to detect the necessity, by comparing the present state estimated by the above-indicated present-state estimating portion and a predetermined condition for determining whether the treatment is necessary.

(3) A circuit-substrate working system according to the above mode (2), wherein the monitoring device includes an operation stopping portion operable to automatically stop the operation of the working machine when the treatment-necessity detecting portion has detected the necessity to implement the treatment for the at least one monitoring-object portion.

Automatic stopping of the operation of the working machine when it has become necessary to implement a treatment for the monitoring-object portion, the operator is informed that the treatment is necessary for the monitoring-object portion, so that the operator can immediately start the necessary treatment.

(4) A circuit-substrate working machine according to the above mode (2) or (3), wherein the monitoring device includes an indicating portion operable to inform an operator of the system, in an operator-recognizable manner, that the treatment-necessity detecting portion has detected the necessity to implement the treatment for the at least one monitoring-object portion The indicating portion permits the operator to know with certainty that the treatment for the monitoring-object portion has become necessary, so that the operator can implement the treatment in a suitable manner. Where a plurality of monitoring-object portions are provided, and/or where there are a plurality of different possible treatments for a given one monitoring-object portion, the indicating portion is preferably arranged to indicate a specific one of the monitoring-object portions and/or a specific one of the possible treatments.

(5) A circuit-substrate working system according to any one of the above modes (2)–(4), further comprising an automatically treating device operable when the treatment-necessity detecting portion has detected the necessity to implement the treatment for the at least one monitoring-object portion, to automatically implement the treatment.

The automatically treating device arranged to automatically implement the treatment for the monitoring-object portion when the treatment has become necessary further improves the ease of handling of the circuit-substrate working system, without manipulation by the operator.

(6) A circuit-substrate working system according to any one of the above modes (1)–(5), wherein the at least one result-detecting device includes an imaging device operable to image the result of the above-indicated operation.

Various sorts of information on the result of the operation can be obtained by an image processing device arranged to process image data obtained by the imaging device arranged to image the result of the operation.

(7) A circuit-substrate working system according to any one of the above modes (1)–(6), wherein the at least one working machine includes an electronic-component mounting machine operable to mount electronic components on the circuit substrate.

(8) A circuit-substrate working system according to any one of the above modes (1)–(7), wherein the at least one monitoring-object portion includes at least one of a mounting head operable to hold the electronic components and mount the electronic components on the circuit substrate, a relative-movement device operable to move the mounting head and a substrate-holding device holding the circuit substrate, relative to each other, and a component-supplying device operable to supply the electronic components.

For example, the mounting head includes a suction nozzle for holding the electronic component by suction under a negative pressure, a holding head for removably holding the suction nozzle, and a head-rotating device for rotating the holding head about an axis of rotation substantially parallel to a longitudinal direction of the suction nozzle. In this case, the position of the axis of rotation of the holding head and the suction nozzle may be selected as the monitoring-object portions. In the latter case, the suction nozzle is preferably monitored for the axial and radial positions of its sucking surface in its axial and radial directions of the suction nozzle, or the flatness of its sucking surface.

(9) A circuit-substrate working system according to the above mode (8), wherein the at least one monitoring-object portion includes a plurality of the mounting heads each holding the electronic component by suction with the suction nozzle under the negative pressure, and the electronic-component mounting machine includes a hold-position-error detecting device operable to detect hold-position errors of the electronic component as held by the suction nozzle, the at least one result-detecting device including a mounting-position-error detecting device operable to detect mounting errors of the electronic components as mounted on the circuit substrate, the monitoring device including a state-estimating portion operable to estimate the state of each of the at least one monitoring-object portion, on the basis of both the hold-position errors detected by the hold-position-error detecting device and the mounting-position errors detected by the mounting-position-error detecting device.

The hold-position errors cannot be obtained by the result-detecting device, and can be obtained by only the electronic-component mounting machine. On the basis of both these hold-position errors and the mounting-position errors detected by the result-detecting device, the state of each monitoring-object portion can be estimated with high reliability. The reliability of estimation of the cause for the mounting-position errors can be effectively increased even where the mounting-position errors may be caused depending upon the states of the plurality of monitoring-object portions, as in the electronic-component mounting machine of a type including (a) a head-turning device operable to turn the plurality of mounting heads about a common axis of turning, (b) a component-supplying device provided with a plurality of feeders movable in a direction parallel to a line of tangency to a circular path of turning of the mounting heads by the head turning device, and (c) a relative-movement device operable to move the substrate-holding device holding the circuit substrate and the head-turning device, relative to each other in a direction parallel the surface of the circuit substrate.

(10) A circuit-substrate working system according to the above mode (8) or (9), wherein the at least one monitoring-object portion includes a plurality of the mounting heads each holding the electronic component by suction with the suction nozzle under the negative pressure, and the electronic-component mounting machine includes a nozzle-information supplying portion operable to supply the monitoring device with nozzle information indicative of each of the plurality of suction nozzles which was used to mount the corresponding electronic component on the circuit substrate and each of the plurality of suction nozzles which was assigned to mount the corresponding electronic component on the circuit substrate but failed to mount the electronic component on the circuit substrate, the monitoring device monitoring each of the plurality of suction nozzles on the basis of at least the nozzle information.

In the system according to the present mode, each of the plurality of suction nozzles can be monitored for its state.

(11) A circuit-substrate working system according to any one of the above modes (8)–(10), wherein the at least one monitoring-object portion includes the component-supplying device, and the component-supplying device includes a plurality of feeders each accommodating the electronic components of a corresponding one kind and having a component-supply portion from which the electronic components are supplied one after another, and the electronic-component mounting machine includes a feeder-information supplying portion operable to supply the monitoring device with feeder information indicative of each of the plurality of feeders which was used to supply the corresponding electronic component mounted on the circuit substrate, the monitoring device monitoring each of the plurality of feeders on the basis of at least the feeder information.

In the system according to the present mode, each of the plurality of feeders can be monitored for its state.

(12) A circuit-substrate working system according to any one of the above modes (8)–(11), wherein the at least one monitoring-object portion includes the relative-movement device, and the relative-movement device includes positioning-data compensating portion operable to compensate relative-positioning data for positioning the mounting head and the substrate-holding device relative to each other, the monitoring device including a positioning-data-compensation commanding portion operable to generate a positioning-data compensating command commanding the positioning-data compensating portion to compensate said relative-positioning data, and a commanding-interval monitoring portion operable to monitor a commanding interval at which the positioning-data compensating command is generated.

The necessity for operator's inspection of the electronic-component mounting machine can be detected on the basis of the monitored compensating interval at which the positioning-data compensating command is generated.

(13) A circuit-substrate working system according to any one of the above modes (7)–(12), wherein the at least one result-detecting device includes an imaging device operable to image the electronic components mounted on the circuit substrate before the electronic components are fixed on the circuit substrate.

The imaging device can easily obtain enough information relating to the state of the electronic-component mounting machine. In addition, the imaging of the electronic components by the imaging device before the electronic components are fixed on the circuit substrate by soldering or other method permits the above information to be obtained at an early point of time.

(14) A circuit-substrate working system according to any one of the above modes (7)–(13), wherein the at least one result-detecting device includes a detecting machine disposed downstream of the electronic-component mounting machine, and the detecting machine is operable after the plurality of electronic components have been mounted on one circuit substrate by the electronic-component mounting machine, to effect at least one of detection as to whether at least one of the electronic components is present or absent at a predetermined mounting spot on the circuit substrate, and detection of mounting-position errors of at least one of the electronic components as mounted on the circuit substrate.

Since the detecting machine for detecting a result of the operation of the electronic-component mounting machine to mount the electronic components is independent of the electronic-component mounting machine, the operation of the electronic-component mounting machine is hardly disturbed by the detection by the detecting machine. This advantage is particularly significant since the electronic-component mounting machine requires a particularly long time to perform its intended operation, of a plurality of working machines provided in the circuit-substrate working system.

(15) A circuit-substrate working system according to any one of the above modes (1)–(13), wherein the at least one result-detecting device includes a detecting device incorporated in the electronic-component mounting machine and operable after the plurality of electronic components have been mounted on one circuit substrate by the electronic-component mounting machine, to effect one of detection as to whether at least one of the electronic components is present or absent at a predetermined mounting spot on the circuit substrate, and detection of mounting-position errors of at least one of the electronic components as mounted on the circuit substrate.

The system including the present detecting machine is advantageous for its lower cost of manufacture than the system including the detecting machine which is independent of the electronic-component mounting machine.

(16) A circuit-substrate working system according to any one of the above modes (7)–(13), wherein the at least one result-detecting device includes a detecting device incorporated in the electronic-component mounting machine and operable during mounting of the plurality of electronic components on one circuit substrate by the electronic-component mounting machine, to effect at least one of detection as to whether at least one of the electronic components is present or absent at a predetermined mounting spot on the circuit substrate, and detection of mounting-position errors of at lest one of the electronic components as mounted on the circuit substrate.

The present system enjoys both a reduced cost of manufacture and early obtaining of the information relating to the result of the operation.

(17) A circuit-substrate working system according to any one of the above modes (1)–(16), wherein the at least one working machine includes a high-viscosity-fluid applying machine operable to apply to the circuit substrate a high-viscosity fluid for provisionally fixing the electronic components on the circuit substrate.

(18) A circuit-substrate working system according to the above mode (17), wherein the high-viscosity-fluid applying machine includes a screen printing machine operable to apply by printing the high-viscosity fluid to the circuit substrate through a plurality of apertures formed through a screen.

(19) A circuit-substrate working system according to the above mode (18), wherein the at least one monitoring-object portion includes at least one of the screen, a position-adjusting device operable to adjust a position of the screen in a direction parallel to a surface of the screen, and a squeegee device movable on the screen and operable to fill the plurality of apertures with the high-viscosity fluid.

Preferably, the screen is monitored for plugging of its apertures with the high-viscosity fluid or contamination of its back surface, for example, and the position-adjusting device is monitored for positioning errors of the screen, for example, while the squeegee device is monitored for its extrusion pressure acting on the screen, a speed of its movement on the screen, and damaging of its squeegee, for example.

(20) A circuit-substrate working system according to the above mode (17), wherein the high-viscosity-fluid applying device comprises a dispenser including:

a substrate-holding device operable to position and hold the circuit substrate;

a coating head operable to apply the high-viscosity fluid in the form of spots at respective predetermined positions on the circuit substrate held by the substrate-holding device; and a relative-movement device operable to move the coating head and the substrate-holding device relative to each other, and wherein the at least one monitoring-object portion includes at least one of the substrate-holding device, the coating head and the relative-movement device.

Preferably, the substrate-holding device is monitored for positioning errors of the circuit substrate, for example, and the coating head is monitored for its extrusion pressure, extrusion time and extrusion temperature of the high-viscosity fluid, for example, while the relative-movement device is monitored for positioning errors of the coating head, for example.

(21) A circuit substrate working system according to any one of the above modes (1)–(20), wherein the monitoring device includes a treatment-time estimating portion operable on the basis of past data and present data of the object information relating to at least one of the at least one monitoring-object portion, to estimate a point of time at which a treatment for the at least one monitoring-object portion is expected to become necessary.

The point of time at which the treatment for the at least one monitoring-object portion becomes necessary can be correctly estimated on the basis of the past data and the present data of the object information.

(22) A circuit-substrate working system according to the above mode (21), wherein the monitoring device includes:

a treatment commanding portion operable on the basis of the estimation by the treatment-time estimating portion, to generate a treatment command commanding the at least one working machine to implement the treatment for at least one of the at least one monitoring-object portion; and a commanding-interval monitoring portion operable to monitor a commanding interval at which the treatment command is generated by the treatment commanding portion for each of the at least one monitoring-object portion.

A change of the state of the working machine can be easily estimated with high reliability on the basis of the commanding interval indicated above.

(23) A circuit-substrate working system according to any one of the above modes (1)–(22), wherein the monitoring device includes:

a treatment commanding portion operable to generate a treatment command for implementing a treatment in relation to at least one of the at least one monitoring-object portion of at least one of the at least one working machine; and an effect-obtaining portion operable to obtain an effect provided by the treatment implemented according to the treatment command generated by the treatment commanding portion.

The adequacy of the treatment command can be evaluated on the basis of the effect provided by the treatment implemented according to the treatment command of the treatment commanding portion.

(24) A circuit-substrate working system according to the above mode (23), wherein the monitoring device includes a determining portion operable to determine that the treatment command is inadequate, if the effect obtained by the effect-obtaining portion is smaller than a predetermined effect.

(25) A circuit-substrate working system according to any one of the above modes (1)–(24), wherein the monitoring device includes:

a compensation commanding portion operable to generate a command requiring compensation of control data relating to at least one of the at least one monitoring-object portion of at least one of the at least one working machine; and an inspection prompting portion operable when the control data as compensated according to the command of the compensation commanding portion have reached a limit of a permissible range, to prompt an operator of the system to inspect the control data of the working machine.

According to the feature of the present mode, the control data are normally compensated automatically, and the operator can be asked to inspect the control data as needed.

(26) A circuit-substrate working system according to any one of the above modes (17)–(20), wherein the monitoring device includes:

a treatment commanding portion operable to generate a treatment command for implementing a treatment in relation to at least one of the at least one monitoring-object portion of at least one of the at least one working machine;

an effect-obtaining portion operable to obtain an effect provided by the treatment implemented according to the treatment command generated by the treatment commanding portion; and a high-viscosity-fluid-inspection prompting portion operable when the effect obtained by the effect-obtaining portion is smaller than a predetermined effect, to prompt an operator of the high-viscosity-fluid applying machine to inspect the high-viscosity fluid for its property.

While it is possible to arrange to automatically inspect the high-viscosity fluid for its property, this arrangement not only increases the cost of manufacture of the system, but also suffers from unsatisfactory reliability of the inspection. Where the operator is required to inspect the high-viscosity fluid for its property solely on his or her own responsibility, the operator's load is relatively high. In the present circuit-substrate working system, the operator is prompted by the high-viscosity-inspection prompting portion, to inspect the high-viscosity fluid for its property, so that the high-viscosity fluid can be inspected for its property with high reliability, while preventing an increase in the operator's load and an increase in the cost of manufacture of the system.

(27) A circuit-substrate working system according to any one of the above modes (17)–(20), wherein the monitoring device includes:

a compensation commanding portion operable to generate a command requiring compensation of control data relating to at least one of the at least one monitoring-object portion of at least one of the at least one working machine; and a high-viscosity-fluid-inspection prompting portion operable when the control data as compensated according to the command of the compensation commanding portion have reached a limit of a permissible range, to prompt an operator of the high-viscosity-fluid applying machine to inspect the high-viscosity fluid for its property.

The present circuit-substrate working system has substantially the same advantage as that according to the above mode (26).

(28) A circuit-substrate working system according to any one of the above modes (1)–(27), wherein the at least one working machine includes a plurality of working machines, and the monitoring device includes a computer commonly used for the plurality of working machine.

(29) A process of mounting electronic components on circuit substrates, to fabricate electronic circuits, by using a circuit-substrate working system according to any one of the above modes (7)–(14), wherein the at least one result-detecting device includes a detecting machine disposed downstream of a corresponding one of the at least one electronic-component mounting machine and operable after the plurality of electronic components have been mounted on one circuit substrate by the corresponding one electronic-component mounting machine, to effect at least one of detection as to whether each of at least one of the electronic components is present or absent at a predetermined mounting spot on the circuit substrate, and detection of mounting-position errors of at least one of the electronic components as mounted on the circuit substrate, the electronic circuits being fabricated while the state of the at least one electronic-component mounting machine is monitored by the monitoring device on the basis of the result detected by the detecting machine and the object information, while a plurality of electronic circuits are fabricated.

The present process has the advantage as described with respect to the above mode (14).

(30) A process of mounting electronic components on circuit substrates, to fabricate electronic circuits, by using a circuit-substrate working system according to any one of the above modes (7)–(13) and (15), wherein the at least one result-detecting device includes a detecting device incorporated in a corresponding one of the at least one electronic-component mounting machine and operable after the plurality of electronic components have been mounted on one circuit substrate by the corresponding one electronic-component mounting machine, to effect at least one of detection as to whether each of at least one of the electronic components is present or absent at a predetermined mounting spot on the circuit substrate, and detection of mounting-position errors of at least one of the electronic components as mounted on the circuit substrate, the electronic circuits being fabricated while the state of the at least one electronic-component mounting machine is monitored by the monitoring device on the basis of the result detected by the detecting device and the object information.

The present process has the advantage as described with respect to the above mode (15).

(31) A process of mounting electronic components on circuit substrates, to fabricate electronic circuits, by using a circuit-substrate working system according to any one of the above modes (7)–(13) and (16), wherein the at least one result-detecting device includes a detecting device incorporated in a corresponding one of the at least one electronic-component mounting machine and operable during mounting of the plurality of electronic components on one circuit substrate by the corresponding one electronic-component mounting machine, to effect at least one of detection as to whether each of at least one of the electronic components is present or absent at a predetermined mounting spot on the circuit substrate, and detection of mounting-position errors of at least one of the electronic components as mounted on the circuit substrate, the electronic circuits being fabricated while the state of the at least one electronic-component mounting machine is monitored by the monitoring device on the basis of the result detected by the detecting device and the object information.

The present process has the advantage as described with respect to the above mode (16).

Although the processes according to the above modes (29)–(31) relate to an operation to mount the electronic components on the circuit substrate, the features of these processes are equally applicable to an operation to apply a high-viscosity fluid to the circuit substrate. It is also noted that the features according to the above modes (29)–(31) are equally applicable to the circuit-substrate working system according to any one of the above modes (1)–(29). Namely, the result-detecting device includes a control device arranged to effect the detection described above with respect to the above modes (29)–(31), at the point of time described therein.

BRIEF DESCRIPTION OF THE DRAWINGS

FIG. 37 is a side elevational view (partly in cross section) showing the above-indicated adhesive coating machine.

DETAILED DESCRIPTION OF THE PREFERRED EMBODIMENTS

There will be described an electronic-circuit fabricating system according to one embodiment of the present invention.

Figure 1:
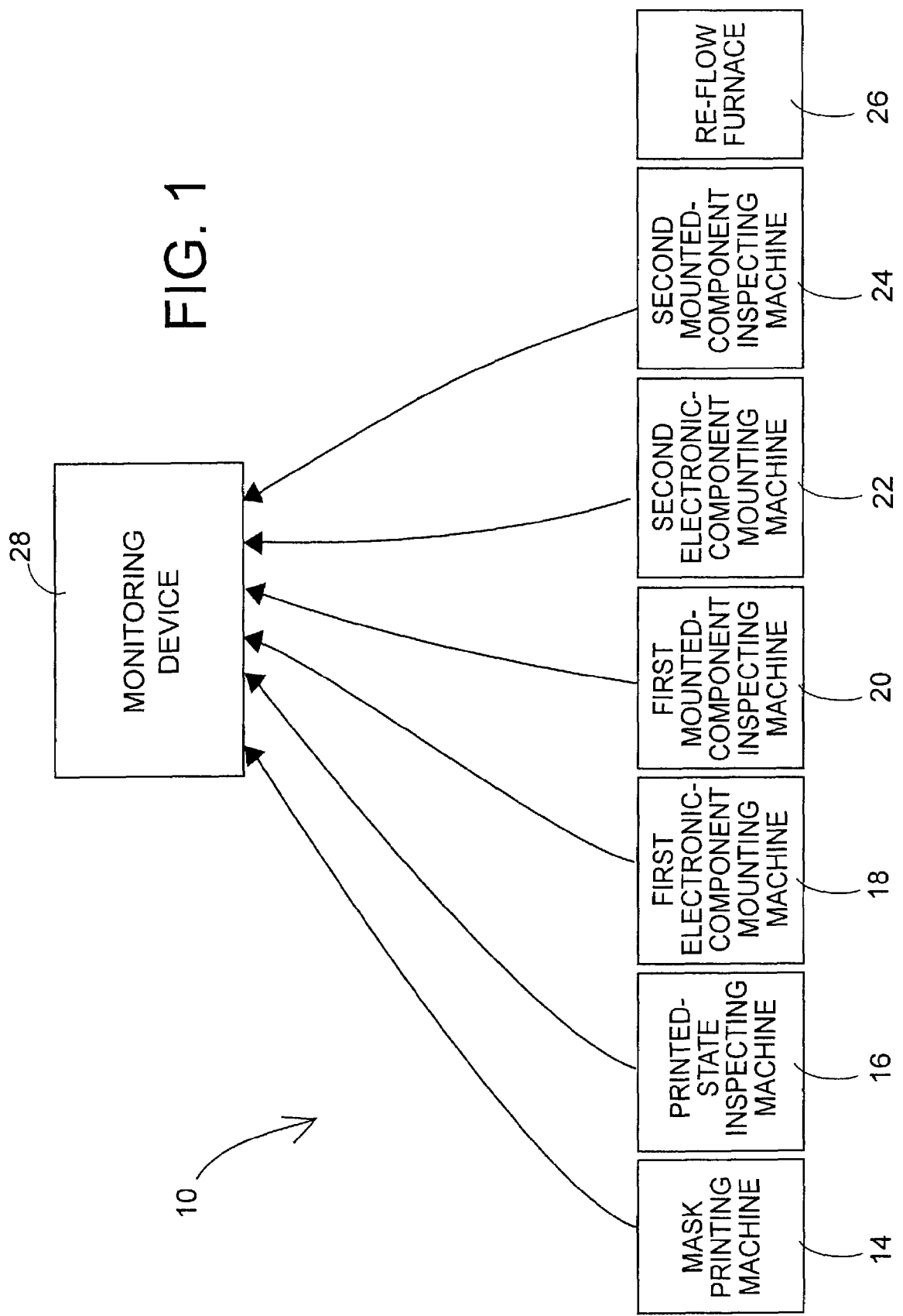
FIG. 1 is a block diagram schematically showing an electronic-circuit fabricating system according to one embodiment of this invention.
Figure 2:
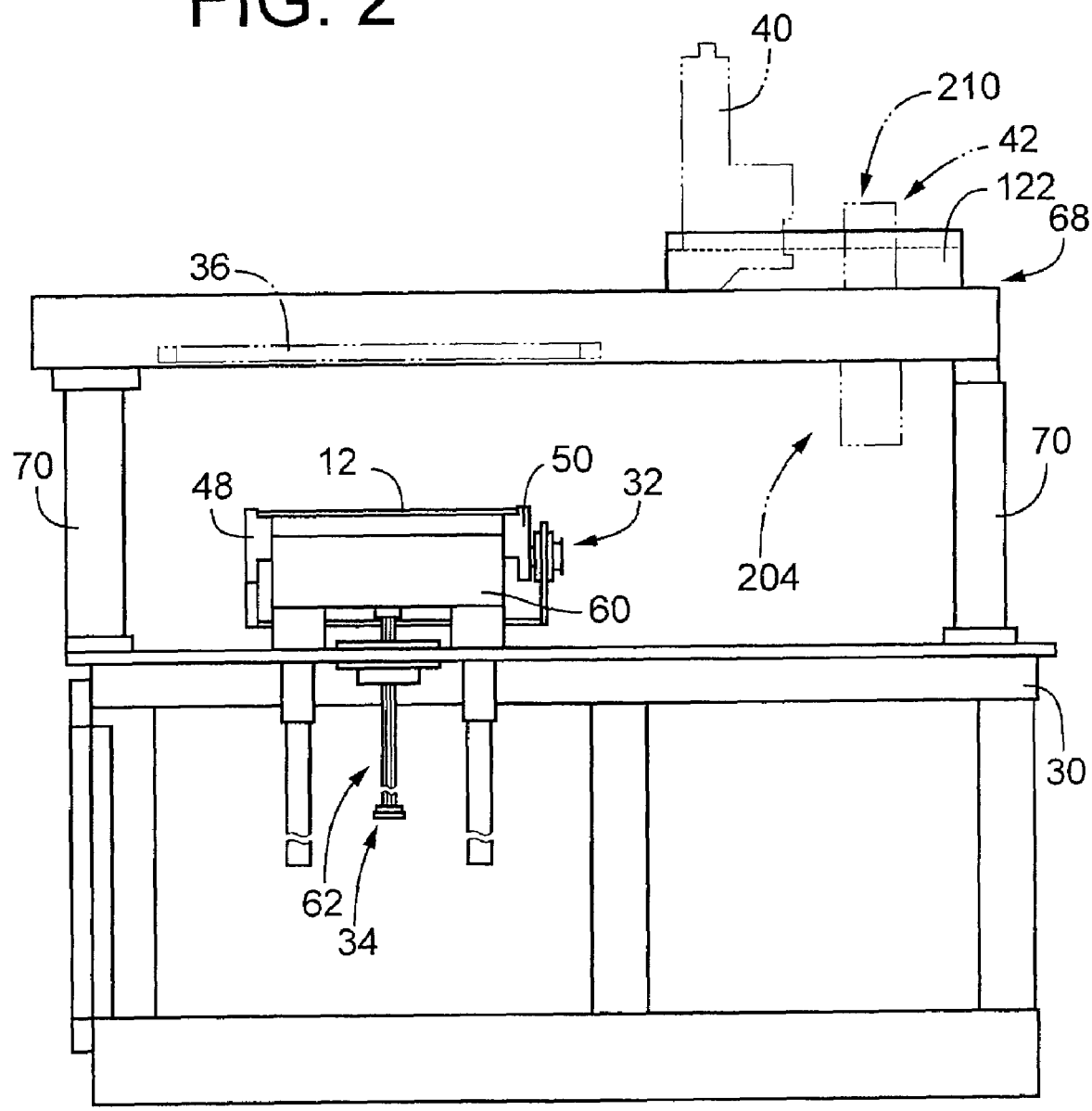
FIG. 2 is a front elevational view showing a mask printing machine in the above-indicated system.

As shown in FIG. 1, the present system 10 includes (a) a mask printing machine 14 for applying a solder paste or cream by printing to a circuit substrate in the form of a printed substrate 12 (which is shown in FIG. 2 and which collectively covers a printed-wiring board on which electronic components have not been mounted, and a printed-circuit board on which the electronic components have been mounted), (b) a printed-state inspecting machine 16 for inspecting a state of the solder paste applied by printing, (c) a first electronic-component mounting machine 18 for mounting electronic components of comparatively small sizes, (d) a first mounted-component inspecting machine 20 for inspecting a result of mounting of the electronic components as mounted by the first electronic-component mounting machine 18, such as the presence or absence and the mounting positions of the electronic components, (e) a second mounted-component inspecting machine 22 for mounting electronic components of comparatively large sizes, and (f) a second electronic-component mounting machine 24 for inspecting a result of mounting of the electronic components as mounted by the second electronic-component mounting machine 22, such as the mounting positions of the electronic components with respect to the printed-wiring board 12. These machines are arranged in the order of description from the upstream side of the system 10 (from the left-hand side of FIG. 1). Between the adjacent ones of the machines 14–24 in the present system 10, there is provided a printed-wiring-board conveyor device for conveying the printed-wiring board 12, so that the printed-wiring board 12 is fed from each machine 14–24 to the next downstream machine each time a working operation of each machine is completed. On the downstream side of the second mounted-component inspecting machine 24, there is disposed a re-flow furnace 26 for finally fixing the electronic components which have been provisionally fixed. The present system 10 further includes a monitoring device 28 arranged to receive working data or inspection result data from the above-indicated machines, monitor or diagnose the mask printing machine 14 and the first and second electronic-component mounting machines 18, 22, for their operating states, and inform the operator of any defect or abnormality if detected on any machine. The above-indicated machines and devices will be described one after another.

To begin with, the mask printing machine 14 will be discussed. The present mask printing machine 14 is substantially identical with a mask printing machine as disclosed in JP-A-2001-116528, and is briefly explained.

In FIG. 2, reference sign 30 is a machine base on which there are mounted: a printed-wiring-board conveyor 32 serving as a transferring device for transferring the printed-wiring board 12; a printed-wiring-board supporting and elevating/lowering device 34 serving as an object supporting device in the form of an object supporting and elevating/lowering device for supporting, elevating and lowering the printed-wiring board 12 transferred by the printed-wiring-board conveyor 32; a printed-wiring-board clamping device (not shown) for clamping the printed-wiring board 12 supported by the printed-wiring-board supporting and elevating/lowering device 34; a mask positioning and holding device 38 (shown in FIG. 3) for supporting a mask plate 36; a printing device 40 printing a printing material in the form of a solder paste on the printed-wiring board 12; a mask cleaning device 42 for cleaning a mask of the mask plate 36; a printed-wiring-board fiducial-mark imaging device 44 (shown in FIG. 9) for taking images of fiducial marks provided on the printed-wiring board 12; and a mask fiducial-mark imaging device 46 (also shown in FIG. 9) for taking images of fiducial marks provided on the mask.

The printed-wiring-board conveyor 32 has a pair of rails 48, 50, as shown in FIG. 2. An endless belt (not shown) is wound on each of these rails 48, 50, so as to extend in the longitudinal direction of the rails, and the printed-wiring board 12 is placed on these endless belts and is transferred by rotation of the endless belts by a belt drive device (not shown). The distance between the two rails 48, 50 is variable according to the size of the printed-wiring board 12. The printed-wiring board 12 is located by a stopper device (not shown), at a printing position at which the solder paste is printed in the direction of transfer of the printed-wiring board 12.

Figure 3:
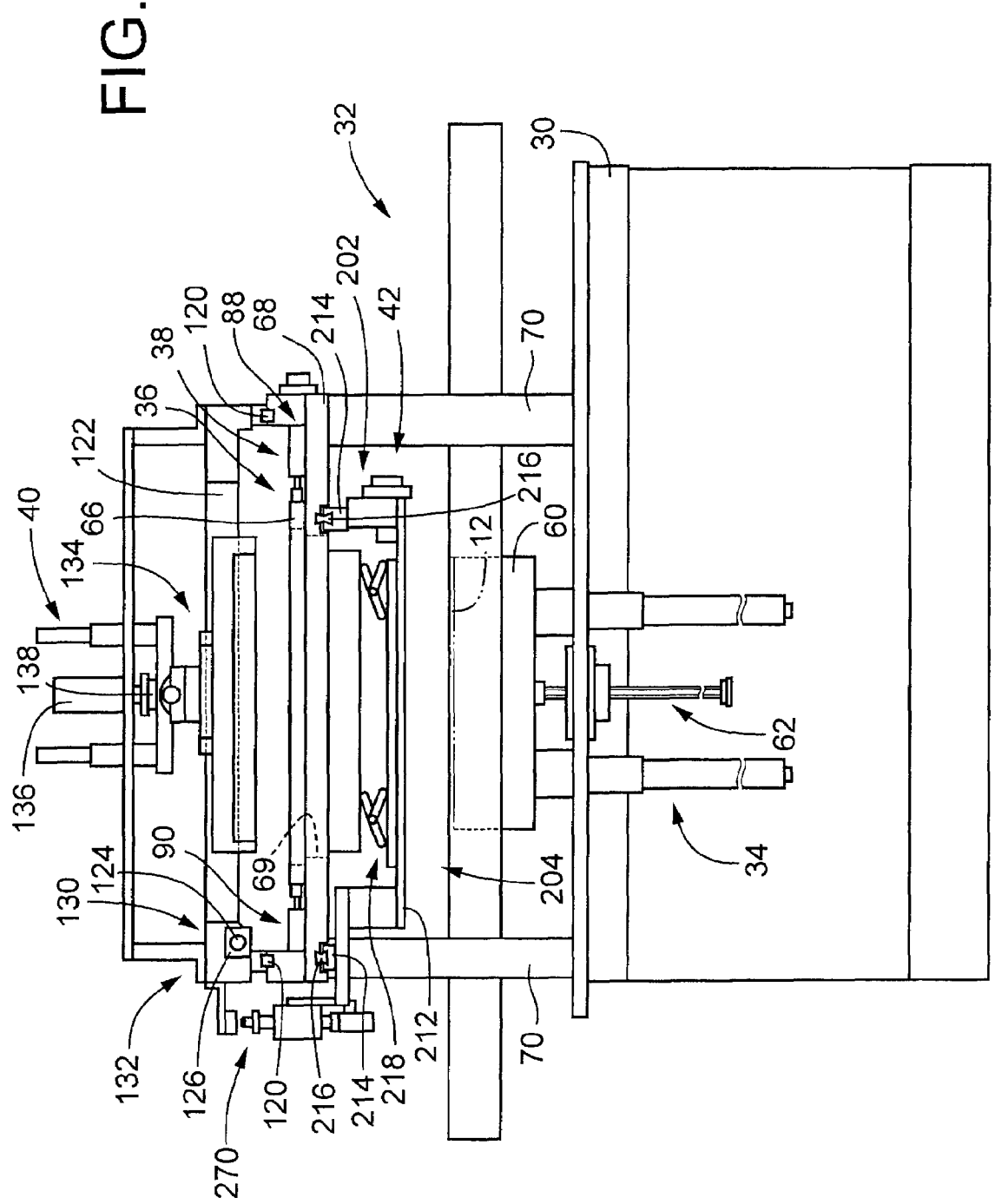
FIG. 3 is a front elevational view showing a relevant portion of the mask printing machine of FIG. 2.

As shown in FIG. 3, the printed-wiring-board supporting and elevating/lowering device 34 has an object support table in the form of a printed-wiring-board support table 60 which is disposed below the printing device 40 and which is vertically movable between the pair of rails 48, 50. In the present embodiment, the printed-wiring-board support table 60 is arranged to hold the printed-wiring board 12 by suction under a negative pressure, and support the board 12 in its horizontal attitude. The support table 60 is movable by an elevating and lowering device 62, between a fully lowered position located below the printed-wiring-board conveyor 32, and a fully elevated position in which the printed-wiring board 12 is spaced upwards from the endless belts and is held in contact with a lower surface of the mask of the mask plate 36.

Figure 4:
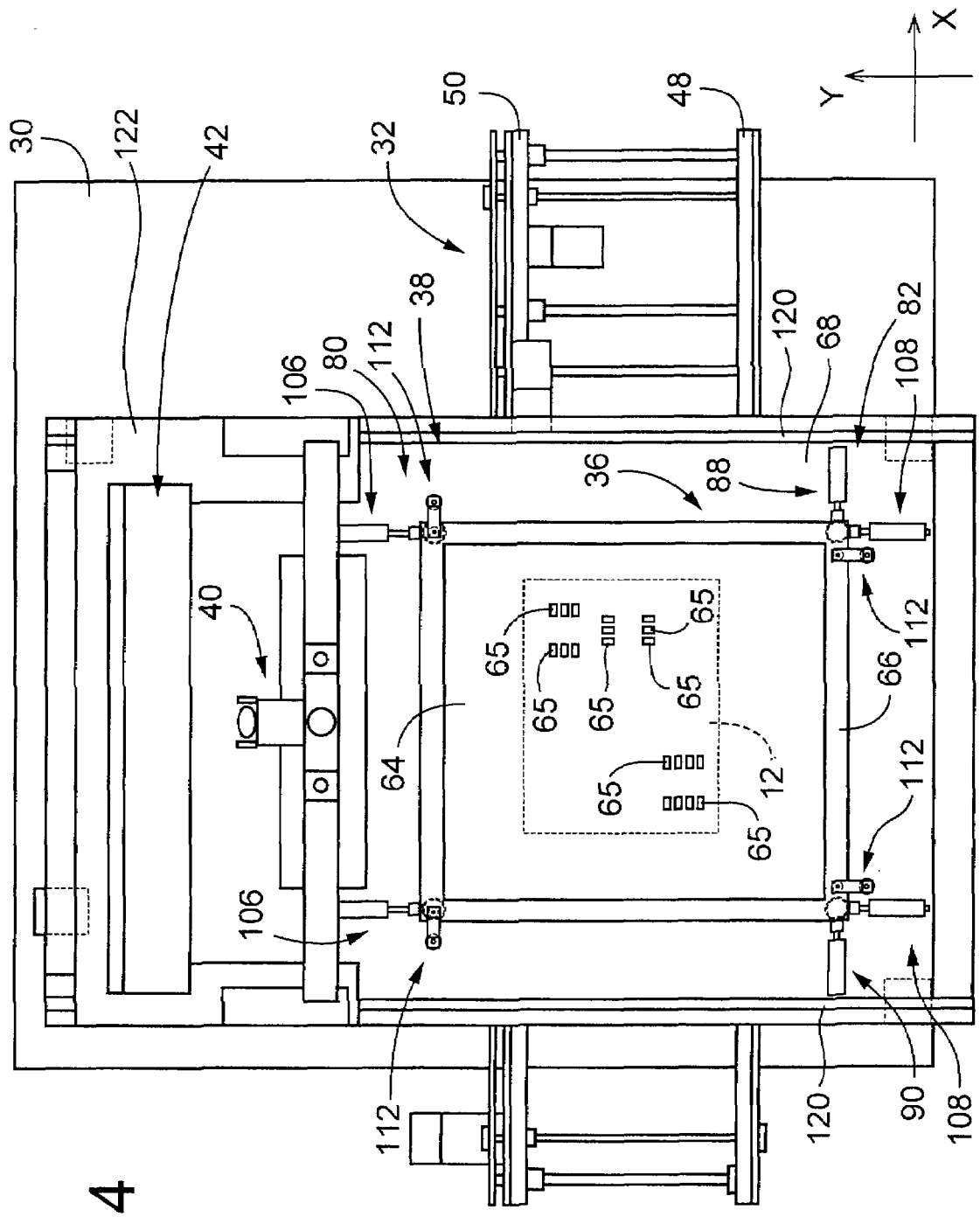
FIG. 4 is a plan view showing the above-indicated mask printing machine.

As shown in FIG. 4, the mask plate 36 is provided with a mask frame 66 having a lower surface to which the mask 64 is fixed at its peripheral portion. In the present embodiment, the mask 64 is a stencil mask formed of a nickel alloy, stainless steel or the like. This mask 64 has a plurality of apertures 65 formed through its thickness. The apertures 65 have a rectangular shape (which may be a square) in cross section taken in a plane parallel to the mask 64. One flat surface of the printed-wiring board 12 has a plurality of printing spots to be coasted with the solder paste, and the apertures 65 are formed at respective portions of the mask 64 which correspond to the respective printing spots. In the present embodiment, the apertures 65 each having the rectangular cross sectional shape are formed such that one side of the rectangle is parallel to an X-axis direction while the adjacent side of the rectangle is parallel to a Y-axis direction.

Figure 5:
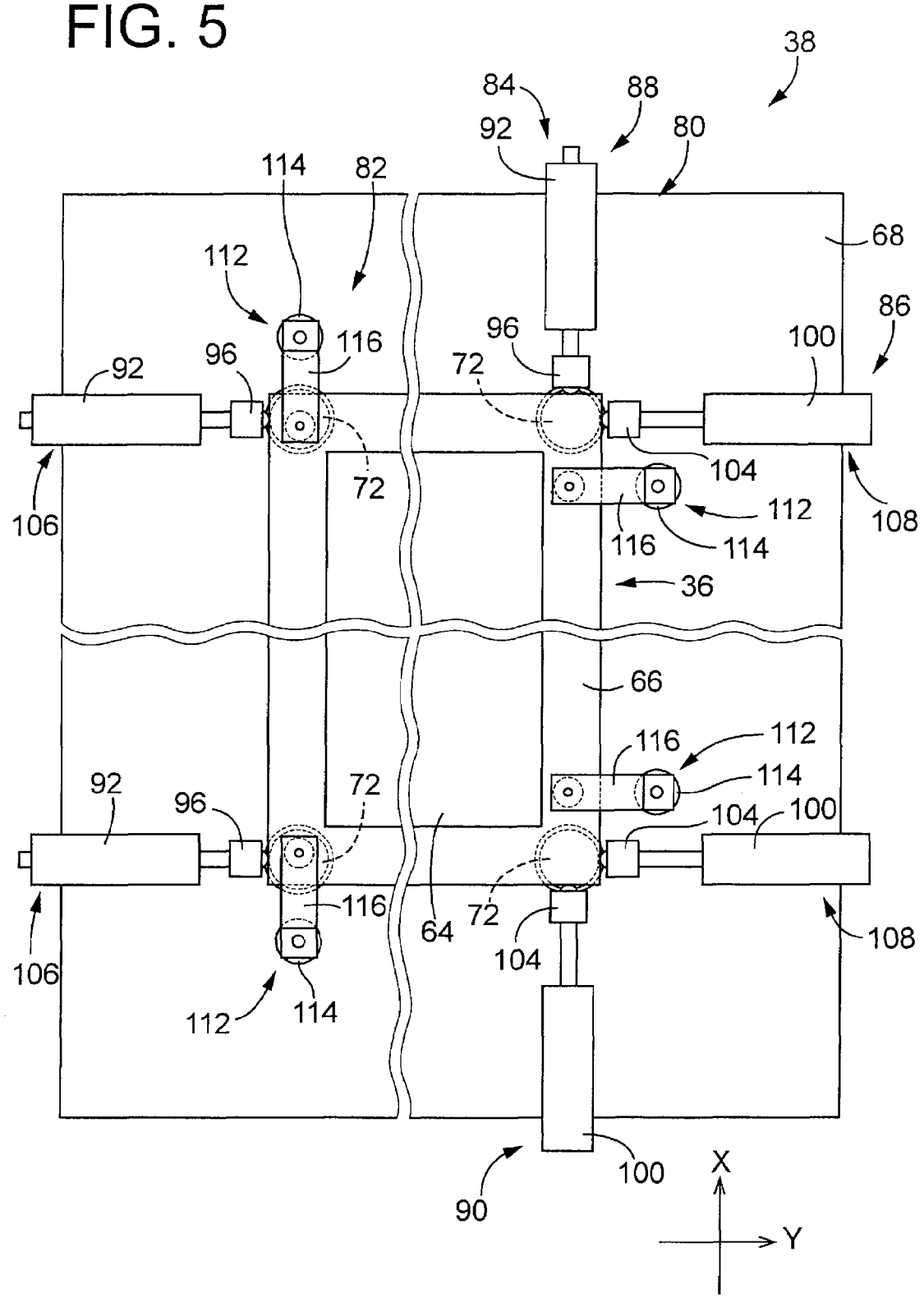
FIG. 5 is a view showing a relevant portion of FIG. 4.

As shown in FIG. 5, the mask positioning and holding device 38 is provided with a mask support table 68 for supporting the mask frame 66. The mask support table 68 is a planar member supported by four posts 70 which extend upright from the machine base 30 described above. As shown in FIG. 3, the mask support table 68 has an opening 69 formed through its thickness, and the mask frame 66 is supported by a portion of the mask support table 68 which defines the opening 69.

As shown in FIG. 4, the mask support table 68 is provided with ball units 72 at respective four corners of the mask frame 66. Each ball unit 72, which is similar in construction to a ball unit as disclosed in JP-A-2000-177100 (publication of Japanese Patent Application filed by the assignee of the present application), does not directly relate to the present invention and will not be further described.

The mask support table 68 is further provided with a position-adjusting device 80 with presser devices, and a fixing device 82. These position-adjusting device 80 and fixing device 82, which are similar in construction to a positioning-adjusting device and a fixing device as disclosed in the above-identified JP-A-2000-177100, do not directly relate to the present invention and will be only briefly described.

The position-adjusting device 80 with the presser devices includes a position-adjusting device 84 provided with an X-axis-direction presser device, and a position-adjusting device 86 provided with a Y-axis-direction presser device. The position-adjusting device 84 is arranged to adjust the position of the mask plate 36 relative to the mask support table 68 in the X-axis direction (parallel to the direction of transfer of the printed-wiring board 12), while the position-adjusting device 86 is arranged to adjust the position of the mask plate 36 in the Y-axis direction which is perpendicular to the X-axis direction in the horizontal plane. The position-adjusting device 84 with the X-axis-direction presser device includes an X-axis-direction position-adjusting device 88, and an X-axis-direction presser device 90. The X-axis-direction position adjusting device 88 includes a position-adjusting cylinder 92 electrically operated by a drive source in the form of a servomotor, and a positioning member in the form of a head portion 96 arranged for abutting contact with the mask frame 66 to position the mask frame 66. The head portion 96 is moved by the position-adjusting cylinder 92 in the X-axis direction, to automatically adjust the position of the mask frame 66 relative to the mask support table 68 in the X-axis direction.

The X-axis-direction presser device 90 includes an air cylinder in the form of a pressing cylinder 100 disposed in a opposed relationship with the X-axis-direction position-adjusting device 88 in the X-axis direction, and a positioning member in the form of a head portion 104. The air cylinder is a fluid-operated cylinder, which is a fluid-operated actuator serving as a drive source. This applies to other air cylinders provided in the mask printing machine 14. The head portion 104 is moved by the pressing cylinder 100, so that the mask frame 66 is pressed by the head portion 104. The position-adjusting device 86 with the Y-axis-direction presser device is provided with two Y-axis-direction position-adjusting devices 106 and two Y-axis-direction presser devices 108, which are similar in construction with the X-axis-direction position-adjusting device 88 and the X-axis-direction presser device 90. It is noted that the Y-axis-direction presser devices 108 are not shown in FIG. 6.

Figure 6:
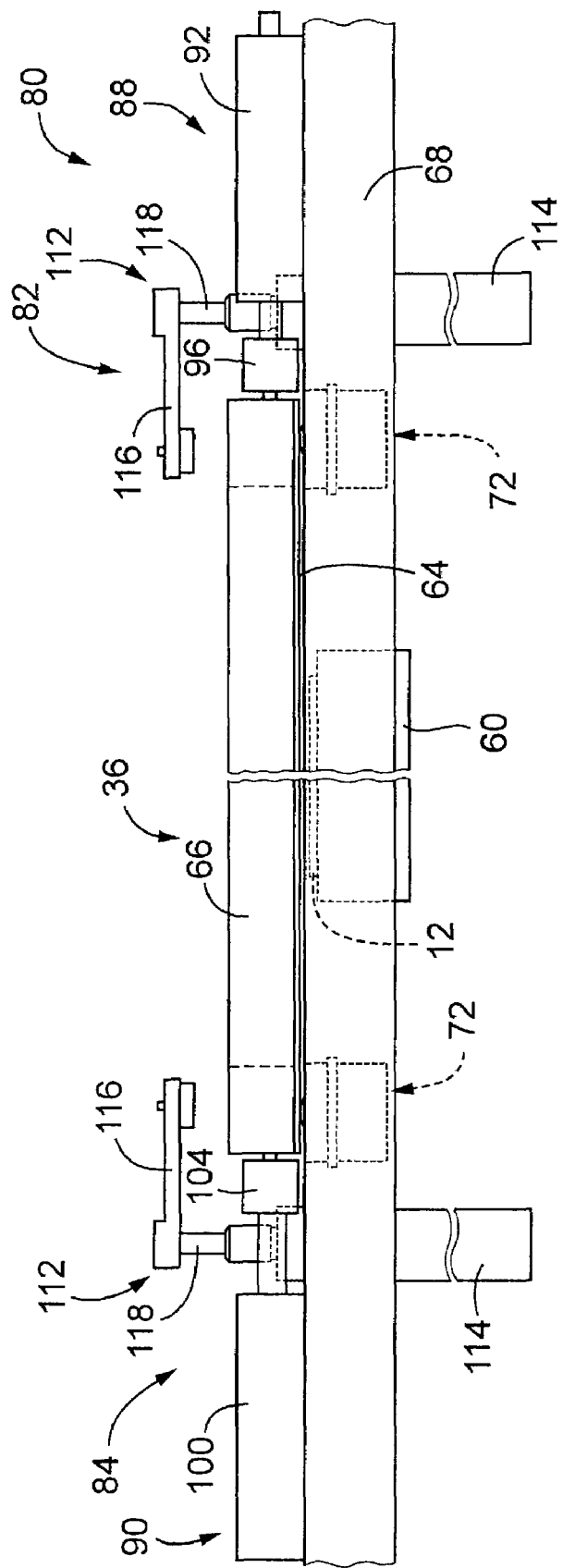
FIG. 6 is a side elevational view showing the above-indicated mask printing machine.

As shown in FIG. 5, the fixing device 82 is provided with four clamping units 112 (two of which are shown in FIG. 6). These four clamping units 112 are located at respective four positions of the mask support table 68 which substantially correspond to respective four corner portions of the mask frame 66. Each clamping unit 112 includes a fluid-operated cylinder in the form of an air cylinder 114 serving as a fluid-operated actuator as a drive source, a cam device (not shown) and a clamp arm 116. The clamp arm 116 is movable by the air cylinder 114 and the cam device, in a vertical direction perpendicular to the mask support table 68, and is pivotable about an arm shaft 118 (shown in FIG. 6). The clamp arm 116 is movable between a clamping position for forcing the mask frame 66 onto the mask support table 68, to thereby clamp the mask frame 66, and a retracted position in which the clamp arm 116 is spaced upwards sideways from the mask frame 66, to thereby release the mask frame 66. The mask support table 68, the position-adjusting device 80 with presser devices, the fixing device 82, etc. constitute the mask positioning and holding device 38 which permits adjustment of the position of the mask 64 relative to the printed-wiring board 12. When the clamp arm 116 is moved upwards in the vertical direction away from the mask frame 66 to the retracted position, the clamp arm 116 is pivoted about the arm shaft 118 so that the clamp arm 116 is spaced from the mask frame 66 in the horizontal direction. In FIG. 6, however, the clamp arm 116 placed in the retracted position in which the mask frame 66 is released by the clamping unit 112 is shown so as to be located above the mask frame 66, for the purpose of clarifying the relative position between the clamp arm 116 and the mask frame 66 in the vertical direction.

The printing device 40 will be described. This printing device 40 is similar in construction to a mask printing device as disclosed in JP-A-9-39214, and will be only briefly described. As shown in FIG. 3, a pair of guide rails 120 are disposed on the mask support table 68, so as to extend in a direction perpendicular to the direction of transfer of the substrate in the form of the printed-wiring board. A slide 122 is movably mounted on the guide rails 120. The slide 122 is movable by a drive device 130 while being guided by the guide rails 120, in a printing direction parallel to the Y-axis direction which is perpendicular to the direction of transfer of the printed-wiring board. The drive device 130 includes a ballscrew 124 rotatably and axially immovably supported by the slide 122, a nut 126 fixed to the slide 122 and engaging the ballscrew 124, and a printing-head drive servomotor (not shown). The slide 122 and the drive device 130 constitute a printing-head moving device 132, while the pair of guide rails 120 constitute a guiding device.

Figure 7:
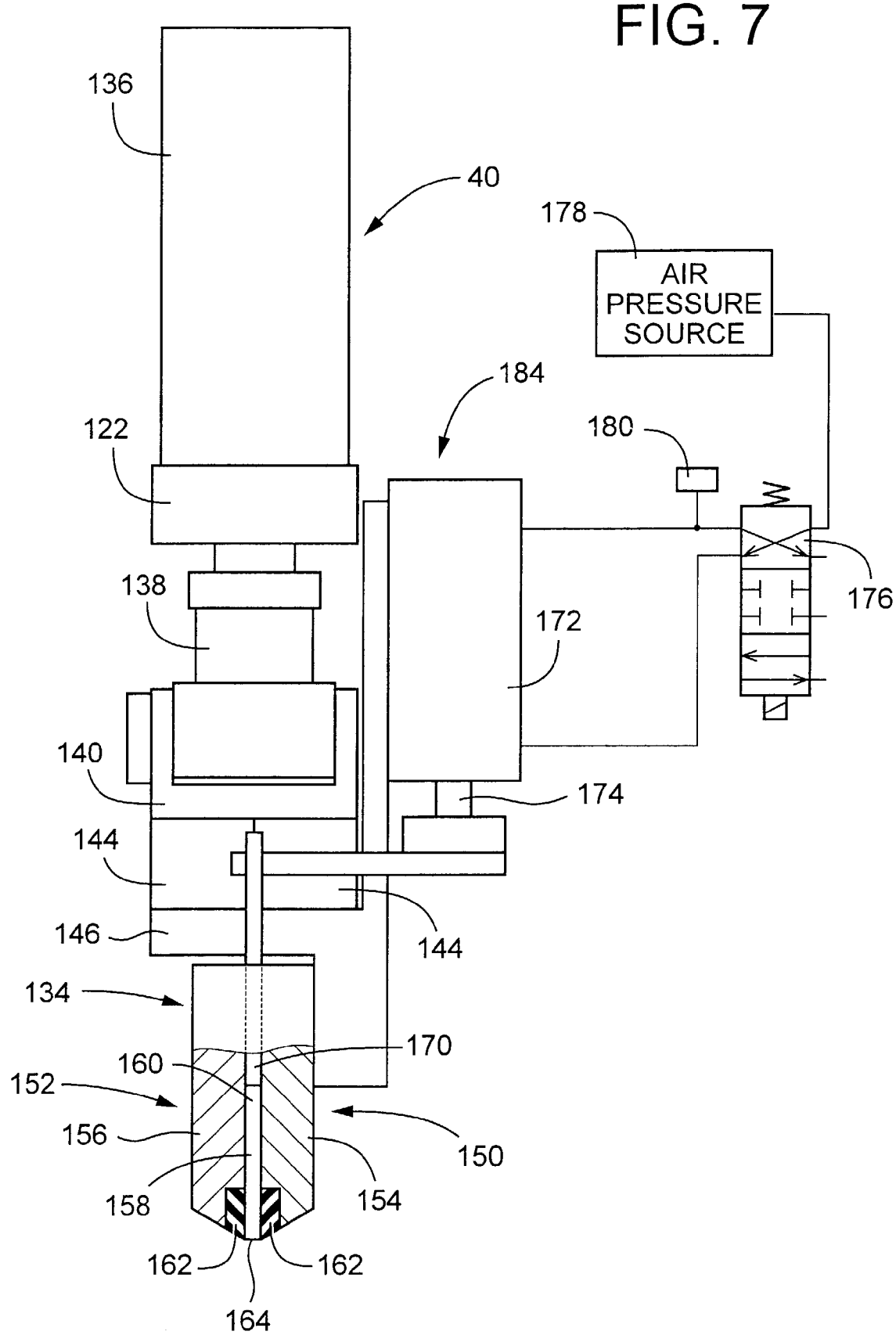
FIG. 7 is a side elevational view (partly in cross section) showing a printing head of the above-indicted mask printing machine.

A printing head 134 is mounted on the slide 122 such that the printing head 134 is vertically movable and is pivotable about an axis parallel to the direction of transfer of the printed-wiring board. The printing head 134 is vertically moved by a printing-head elevating and lowering device in the form of a printing-head elevating and lowering air cylinder 136. As shown in FIG. 7, the printing head 134 is mounted on the printing-head elevating and lowering air cylinder 136 through a contact-load adjusting air cylinder 138, a rotary plate 140, two load sensors 144 and a mounting member 146. The contact-load adjusting air cylinder 138 is controlled on the basis of outputs of those load sensors 144, so that the printing head 134 contacts the mask 64 under a predetermined load.

The printing head 134 includes a printing-material container in the form of a solder container 150, which has a unitary main body 152 consisting of a plurality of members assembled together. The main body 152 includes a pair of plate members 154, 156, and closure plates 158 fixed to respective opposite longitudinal ends of the plate members 154, 156. The main body 152 has the longitudinal direction parallel to the direction perpendicular to the printing direction in the horizontal plane (is elongated in the direction of width of the mask 64 positioned and held by the mask positioning and holding device 38), and has a printing-material accommodating chamber in the form of a solder accommodating chamber 160 which is elongated in the direction of width of the mask and which accommodates the solder paste. The pair of plate members 154, 156 have respective outlet-defining members 162 formed of a rubber material and removably attached thereto. These outlet-defining members 162 are planar members which are elongated in the direction of width of the mask and the lower edges of which define a printing-material outlet in the form of a solder outlet 164 communicating with the solder accommodating chamber 160.

Between the pair of plate members 154, 156, there is sandwiched an extruding member in the form of an extruder plate 170 such that the extruder plate 170 is vertically movable, namely, movable toward and away from the solder outlet 164. The extruder plate 170 is removably held by a piston rod 174 of an extruding air cylinder 172 held by the mounting member 146, and elevated and lowered by a vertical movement of the piston rod 174. The extruding air cylinder 172 is provided as a drive source in the form of a fluid-operated actuator serving as an extruder drive device. The extruding air cylinder 172 is a double-acting air cylinder having two air chambers which are connected to a solenoid-operated directional control valve 176, as shown in FIG. 7, such that the air cylinder 172 is switchable to one of a state in which one of the two air chambers is communicated with an air pressure source 178 while the other air chamber is open to the atmosphere, a state in which the above-indicated one air chamber is open to the atmosphere while the other air chamber is communicated with the air pressure source 178, and a state in which the two air chambers are not communicated with the air pressure source 178 and the atmosphere, with pressures in the air chambers being kept constant. The pressure of the air supplied to the upper air chamber to move the extruder plate 170 toward the solder outlet 164 is detected by an extruding pressure sensor 180. A control device 182 (shown in FIG. 10) controls a switching action of the solenoid-operated directional control valve 176, on the basis of an output of the extruding pressure sensor 180, so that the air pressure in the extrusion air chamber is controlled to a level suitable for the extruder plate 170 to extrude the solder paste from the solder accommodating chamber 160, at a predetermined extruding pressure. Accordingly, the solder paste is forced into the apertures 65 of the above-described mask 64, at a predetermined penetrating pressure. These extruder plate 170, extruding air cylinder 172, etc. constitute a printing-material extruding device in the form of a solder extruding device 184. The extruder plate 170 serves as a solder forcing plate for forcing the solder paste through the apertures 65, while the extruding air cylinder 172 serves as a solder forcing air cylinder for forcing the solder paste into the apertures 65, and the extruder plate 170 and extruding air cylinder 172 constitute a solder forcing device.

The mask cleaning device 42, which is similar in construction to a mask cleaning device as disclosed in JP-A-9-39214, does not directly relate to the present invention and will be only briefly described. As shown in FIGS. 2 and 3, the mask cleaning device 42 includes a cleaning device 204 provided with a cleaner head 202, and a wiping device 210 provided with a wiper head 208. The cleaning device 204 is disposed below a lower surface of the mask 64, namely, a printed-wiring-board contacting surface 200 with which the printed-wiring board 12 is held in contact, while the wiping device 210 is disposed above an upper surface of the mask 64, namely, a printing-material-extrusion side surface in the form of a solder-extrusion side surface 206 from which the solder paste is forced through the apertures 65.

The cleaning device 204 has a pallet 212 in the form of a shallow container, which is elongated in the direction of width of the mask. As shown in FIG. 3, the pallet 212 is provided at its opposite longitudinal ends with respective two guide blocks 214, which are held in sliding engagement with respective guide rails 216 which are formed on the lower surface of the mask support table 68, so as to extend in the printing direction. Thus, the cleaning device 204 is slidably disposed on the underside of the mask support table 68. The guide rails 216 constitute a guiding device. Between the mask support table 68 and the printed-wiring-board clamping device, there is provided a vertical gap sufficient to permit the cleaner head 202 to be moved therethrough.

Figure 8:
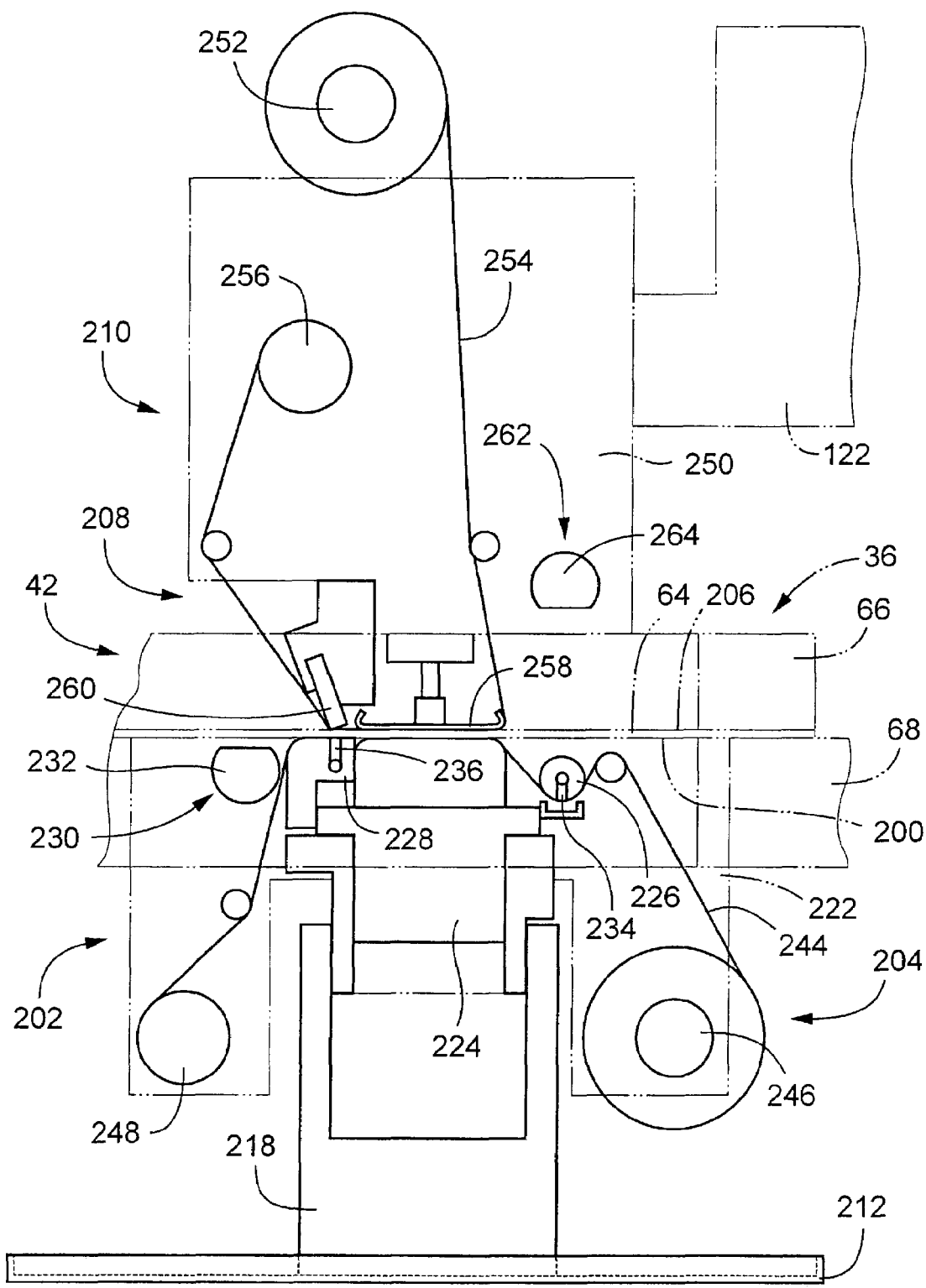
FIG. 8 is a side elevational view showing a cleaning device in the above-indicated mask printing machine.

The cleaner head 202 is disposed so as to be vertically movable on the pallet 212, by an elevating and lowering device 218. As shown in FIG. 8, the cleaner head 202 has a main body 222 on which are mounted a ultrasonic oscillator 224, cleaning-agent dispenser members 226, 228, and an air injector member 232 of a cleaning-web side drying device 230. The cleaning-agent dispenser members 226, 228 are elongate members extending in the direction of width of the mask, and are arranged to receive a cleaning agent from a cleaning-agent supply source (not shown), and inject the cleaning agent from respective nozzles 234, 236. The air injector member 232 is a cylindrical member which is disposed so as to extend in the direction of width of the mask and which is connected to an air supply source (not shown). The cylindrical member has slits (not shown) through which air is injected upwards, that is, towards the mask 64.

A cleaning web 244 is passed over the ultrasonic oscillator 224 and the cleaning-agent dispenser members 226, 228. The cleaning web 244 is a strip having a width substantially equal to the width of the mask 64 (more precisely, an internal width dimension of the mask frame 66), and is formed of a paper having a porous structure and a high degree of water absorption property. The cleaning web 244 is wound on a supply shaft 246. A portion of the cleaning web 244 extending from the supply shaft 246 is threaded extending under the cleaning-agent dispenser member 226, over the ultrasonic oscillator 224 and the cleaning-agent dispenser member 228, and between the cleaning-agent dispenser member 228 and the air injector member 232, and is taken up by a take-up shaft 248. A portion of the cleaning web 244 which is located at a cleaning position, that is, located above the ultrasonic oscillator 224 and the cleaning-agent dispenser members 226, 228, provides a cleaning surface for cleaning the printed-wiring-board contacting surface 200.

The cleaning web 244 is brought into contact and spaced apart from the printed-wiring-board contacting surface 200 of the mask 64, when the cleaner head 202 is elevated and lowered by the elevating and lowering device 218. The elevating and lowering device 218 constitutes a contacting and releasing device. The cleaning web 244 is fed at a predetermined pitch by a cleaning-web feeding device (not shown) disposed on the main body 222. The supply shaft 246, take-up shaft 248, ultrasonic oscillator 224, cleaning-agent dispenser members 226, 228, air injector member 232 and the feeding device for feeding the cleaning web 244 constitute the cleaner head 202.

The wiping device 210 will be explained. On the slide 122 of the printing device 40, there is disposed an elevator table 250 such that the elevator table 250 is vertically movable on the slide 122, by a elevating and lowering device not shown. On the elevator table 250, there is disposed a supply shaft 252 such that the supply shaft 252 is rotatable about an axis parallel to the direction of width of the mask. A wiping web 254 is wound on the supply shaft 252. The wiping web 254 has a width substantially equal to the width of the mask 64 (more precisely, an internal width dimension of the mask frame 66), and is formed of a paper having a porous structure and a high degree of water absorption property. The wiping web 254 is taken up by a take-up shaft 256. The wiping web 254 is fed by a wiping-web feeding device (not shown), at a predetermined pitch. The wiping web 254 is pressed at a portion thereof by a wiping-web presser member 258, so that this portion has a flat wiping surface parallel to the mask 64.

A scraper member 260 formed of a rubber material and an air injector member 264 of a wiping-web side drying device 262 are also disposed on the elevator table 250. The scraper member 260 and the air injector member 264 are elongate members extending in the direction of width of the mask. The air injector member 264 is arranged to receive air supplied from an air supply source (not shown), and inject the air downwards.

Thus, the supply shaft 252, take-up shaft 256, wiping-web feeding device, wiping-web presser member 258, scraper member 260, air injector member 264, etc. are disposed on the elevator table 250. Those members and device constitute the wiper head 208. The wiper head 208 is disposed on the slide 122, and located above the mask 64, such that the wiper head 208 is movable in the printing direction with the slide 122. Further, the wiper head 208 is vertically movable with a vertical movement of the elevator table 250, so that the wiping web 254 is brought into contact with or spaced apart from the mask 64. The elevator table 250 and the elevating and lowering device constitute a wiper-head elevating and lowering device, and a contacting and releasing device for the wiping web 254.

The cleaner head 202, etc. and the wiper head 208, etc. are connected through the above-described slide 122 to each other by a connecting device 270 schematically shown in FIG. 3, so that the cleaner and wiper heads 202, 208 are moved together. The connecting device 270 is arranged to connect the cleaner head 202 to the slide 122 and disconnect the cleaner head 202 from the mask support table 68, and to disconnect the cleaner head 202 from the slide 122 and connect the cleaner head 202 to the mask support table 68. These connection and disconnection of the cleaner head 202 are effected when the cleaner head 202 is located at a retracted position which is distant from the mask 64 as held by the mask support table 68.

Figure 9:
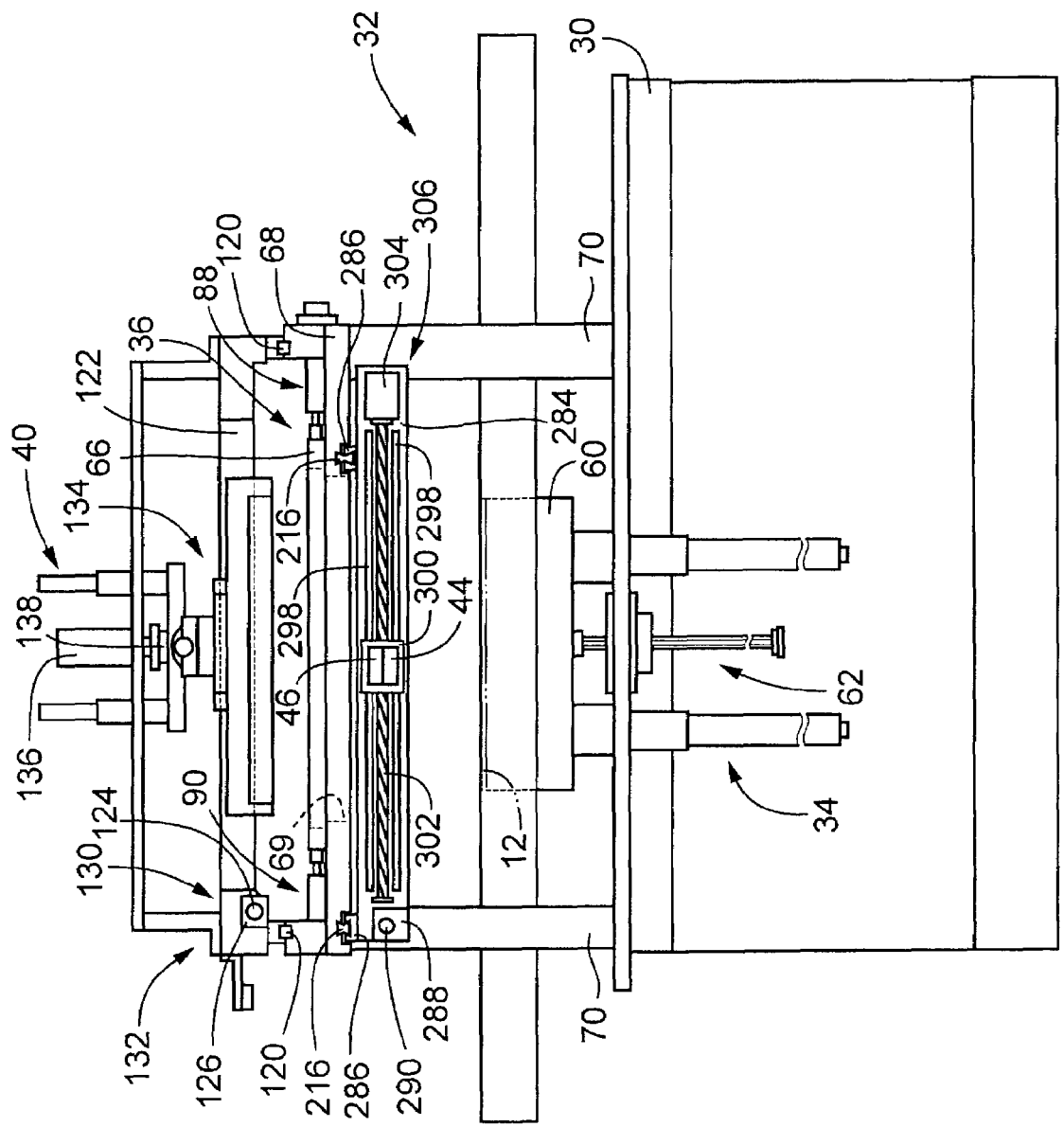
FIG. 9 is a front elevational view showing another relevant portion of the above-indicated mask printing machine.

The printed-wiring-board fiducial-mark imaging device 44 and the mask fiducial-mark imaging device 46 will be explained. In the present embodiment, these imaging devices 44, 46 are CCD cameras capable of taking a two-dimensional image of an object. An illuminating device not shown is provided for each of the imaging devices 44, 46. By moving these imaging devices 44, 46 to appropriate positions in the horizontal plane, fiducial marks provided on the printed-wiring board 12 and the mask 64 are taken. To this end, a Y-axis slide 284 is slidably movably disposed on the pair of guide rails 216 through a plurality of guide blocks 286, as shown in FIG. 9. The guide rails 216 are used commonly for the mask cleaning device 42 and the imaging devices 44, 46.

The Y-axis slide 284 is provided with a nut 288 engaging a ballscrew 290 which is supported by the mask support table 68 such that the ballscrew 290 is rotatable and axially immovable relative to the mask support table 68. The Y-axis slide 284 is moved while by guided by the guide rails 216, when the ballscrew 290 is rotated by a drive source in the form of a Y-axis drive servomotor 292 (shown in FIG. 10).

The Y-axis slide 284 has a vertical surface on which are provided a pair of guide rails 298 extending in the X-axis direction, and an X-axis slide 300 is disposed in sliding engagement with the guide rails 298. The X-axis slide 300 is held in engagement with a ballscrew 302 disposed on the Y-axis slide 284 such that the ballscrew 302 is rotatable about an axis parallel to the X-axis direction, and is axially immovable. The X-axis slide 300 is moved in the X-axis direction while being guided by the guide rails 298, when the ballscrew 302 is rotated by an X-axis drive servomotor 304. To this X-axis slide 300, there are attached the imaging devices 44, 46. The Y-axis slide 284, X-axis slide 300, the guide rails 216, 298 for guiding these slides 284, 300, the X-axis drive servomotor 304 and the Y-axis drive servomotor 292 constitute a positioning device 306 for positioning the imaging devices in the horizontal directions.

The mask fiducial-mark imaging device 46 is disposed on the X-axis slide 300 such that the imaging device 46 faces upwards towards the mask 64, while the printed-wiring-board fiducial-mark imaging device 44 is disposed so as to face downwards towards the printed-wiring board 12. A plurality of fiducial marks are provided on each of the printed-wiring board 12 and the mask 64. In the present embodiment, two fiducial marks are provided on a diagonal straight line on each of the printed-wiring board 12 and the mask 64. To take images of the fiducial marks provided on each of the printed-wiring board 12 and the mask 64, the corresponding imaging devices 44, 46 are moved to the appropriate positions in the horizontal plane. It is noted that each of the imaging devices 44, 46 may be a line sensor arranged to take a line of image each time the imaging devices are fed by a predetermined distance.

As described above, the Y-axis slide 284 are guided by the guide rails 216 provided to guide the cleaner head 202. Like the cleaner head 202, the fiducial-mark imaging devices 44, 46 are moved through the gap between the mask support table 68 and the printed-wiring-board clamping device. The retracted position in which the imaging devices 44, 46 are normally placed is provided on one side of the mask support table 68 which is opposite to the side on which the retracted position of the cleaner head 202 is provided. Accordingly, the cleaner head 202 does not disturb the imaging operation of the fiducial-mark imaging devices 44, 46, and the imaging devices 44, 46 do not disturb the cleaning operation of the cleaner head 202.

The present mask printing machine 14 is controlled by the control device 182 indicated above.

Figure 10:
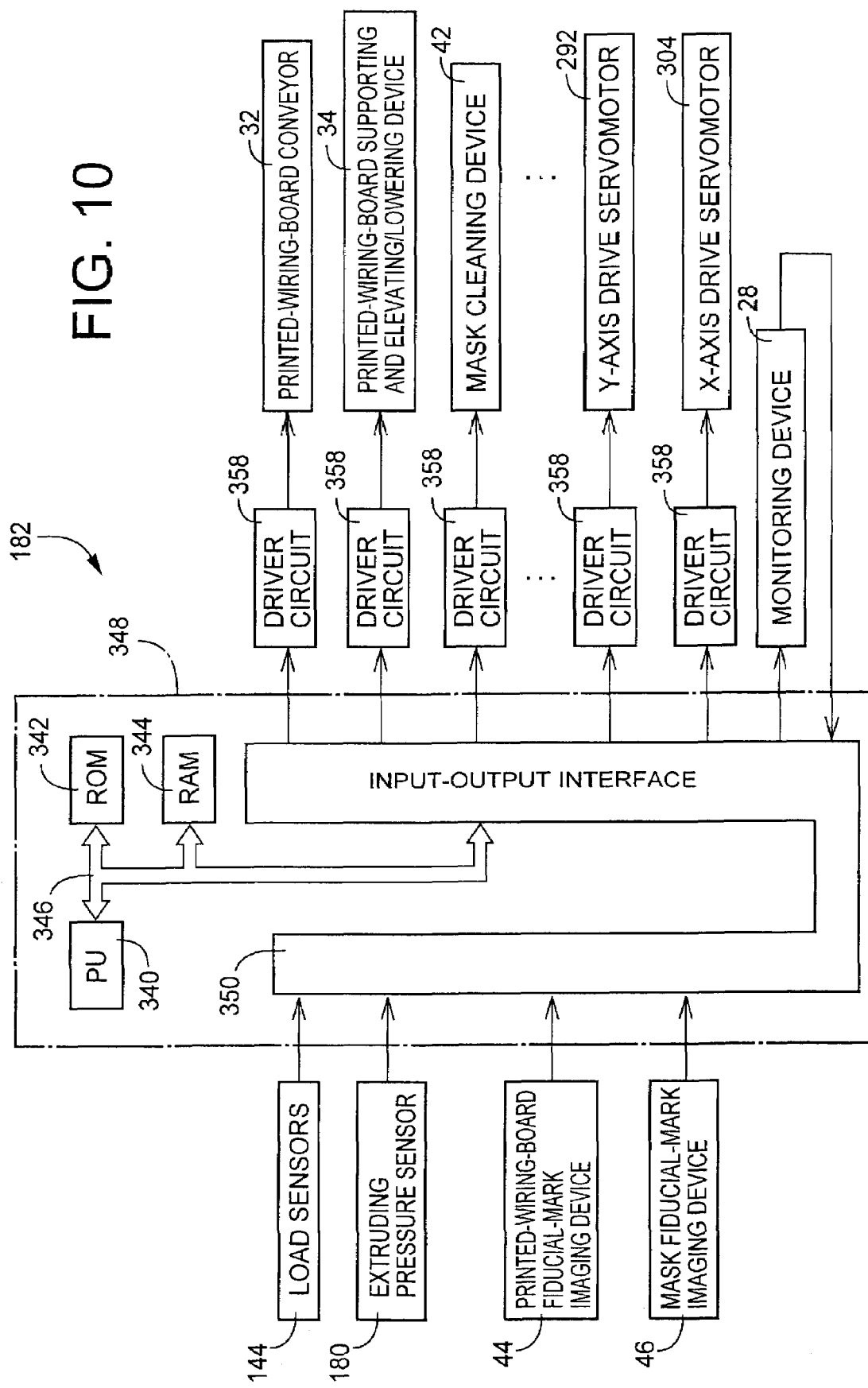
FIG. 10 is a block diagram showing a control device in the above-indicated mask printing machine.

As shown in FIG. 10, the control device 182 is principally constituted by a computer 348 incorporating a PU (processing unit) 340, a ROM (read-only memory) 342, a RAM (random-access memory) 344, and a bus 346 interconnecting those elements. To the bus 346, there is connected an input-output interface 350 which is connected to various sensors such as the above-indicated load sensor 144, and imaging devices such as the fiducial-mark imaging device 44. The input-output interface 350 is further connected through respective driver circuits 358 to various actuators such as the printed-wiring-board conveyor 32, for controlling those actuators. The input-output interface 350 is also connected to the monitoring device 28, to supply the monitoring device 28 with information received from the various sensors, and calculated values relating to information. The ROM 342 stores various routines.

Then, operations of the mask printing machine 14 will be described. A normal operation of the mask printing machine, which is described in detail in JP-A-2000-177100, does not directly relate to the present invention, and will be only briefly described. Before the solder paste is printed on the printed-wiring board 12, the mask plate 36 is fixed on the mask support table 68. At this time, the positions of the mask 64 relative to the mask support table 68 in the directions parallel to the plane of the mask 64 are adjusted, so that the positions of the mask 64 relative to the printed-wiring-board supporting and elevating/lowering device 34 and the printed-wiring board 12 are adjusted. This adjustment of the positions of the mask 64 is implemented by operating the fiducial-mark imaging devices 44, 46 to take images of the fiducial marks provided on the printed-wiring board 12 and the mask 64, obtaining relative positioning errors of the mask 64 and the printed-wiring board 12, and moving the mask plate 36 relative to the mask support table 68 in the directions parallel to the plane of the mask 64, so as to eliminate the relative positioning errors.

The relative positioning of the mask support table 68 and the mask plate 36, which is effected in a manner similar to that in a mask printing device as disclosed in JP-A-2000-177100, will be described only briefly.

When the relative positioning is effected, the printed-wiring board 12 is supported by the printed-wiring-board supporting and elevating/lowering device 34, and is located at a position spaced from the mask plate 36. The printed-wiring board 12 is positioned, and held by suction by the printed-wiring-board support table 60, while the support table 60 is placed in a sucking position in which the printed-wiring board 12 held by the support table 60 is lifted away from the printed-wiring-board conveyor 32 and is spaced apart from the mask plate 36. The operator sets the mask plate 36 on the mask support table 68 through the ball units 72, with the fixing device 82 for fixing the mask plate 36 being placed in the non-operated state. Then, the position-adjusting device 80 with presser devices is operated so that the mask plate 36 is pressed by the X-axis-direction presser device 90 and the Y-axis-direction presser devices 108, and is positioned in place by the X-axis-direction position-adjusting device 88 and the Y-axis-direction position-adjusting devices 106.

In this state, the fiducial-mark imaging devices 44, 46 are moved in between the printed-wiring board 12 and the mask plate 36, to take images of the fiducial marks provided on the printed-wiring board 12 and the mask 64, respectively. On the basis of the image data, positioning errors of the mask plate 36 relative to the printed-wiring board 12 are calculated to calculate the nominal positions at which the mask plate 36 is positioned relative to the mask support table 68 by the X-axis-direction position-adjusting device 88 and the Y-axis-direction position-adjusting devices 106, without the positioning errors of the mask plate 36 with respect to the printed-wiring board 12.

Then, the X-axis-direction position-adjusting device 88 and the Y-axis-direction position-adjusting devices 106 are operated to position the mask plate 36 relative to the printed-wiring-board supporting and elevating/lowering device 34, without the positioning errors with respect to the printed-wiring board 12. During this position adjustment of the mask plate 36, the mask plate 36 is not fixed by the fixing device 82, so that the mask plate 36 can be freely moved. After the position adjustment, the fixing device 82 is operated to fix the mask plate 36 to the mask support table 68.

When the printing is effected with the mask, the cleaner head 202 of the mask cleaning device 42 is disconnected from the wiper head 208, and is fixed on the mask support table 68, namely, placed in its retracted position. Further, the cleaner head 202 is located at its fully lowered position, while the wiper head 208 is located at its fully elevated position, so that the cleaning web 244 and the wiping web 254 are spaced apart from the mask 64, and do not disturb the printing operation. In addition, the printed-wiring-board fiducial-mark imaging device 44 and the mask fiducial-mark imaging device 46 are both located at their retracted positions, and do not disturb the printing operation, either.

When the printing is effected with the mask, the printed-wiring board 12 transferred by the printed-wiring-board conveyor 32 is stopped by the stopper device on the printed-wiring-board support table 60. Then, the printed-wiring-board clamping member of the printed-wiring-board clamping device is moved to a position above the printed-wiring board 12, and the printed-wiring-board support table 60 is elevated, and positioned by the positioning device such that the board 12 is lifted above the rails 48, 50 and the printed-wiring-board conveyor 32. After the printed-wiring board 12 has been pressed onto the printed-wiring-board clamping member by the printed-wiring-board support table 60, a negative pressure is applied to the printed-wiring-board support table 60, so that the printed-wiring board 12 is held by suction by the printed-wiring-board support table 60.

After the printed-wiring board 12 has been held by suction by the printed-wiring-board support table 60, the support table 60 is lowered by a small distance away from the printed-wiring-board clamping member, and the clamping member is returned to its retracted position. Then, the printed-wiring board 12 is further elevated by the printed-wiring-board support table 60, so that the board 12 is brought into contact with the printed-wiring-board contacting surface 200 of the mask 64. Successively, the printing head 134 is lowered to its fully lowered position by the printing-head elevating and lowering air cylinder 136, and is further lowered by the contact-load adjusting air cylinder 138 so that the outlet-defining members 162 are brought into contact with the solder-extrusion side surface 206.

While the printing head 134 is lowered to cause the outlet-defining members 162 to contact the mask 64, the control device 182 controls the contact-load adjusting air cylinder 138 on the basis of the contact load of the outlet-defining members 162 acting on the mask 64, so that the outlet-defining members 162 are held in pressing contact with the mask 64 under a predetermined preload. After the outlet-defining members 162 has been brought into contact with the mask 64, the extruder plate 170 is lowered to pressurize the solder paste. Since the solder outlet 164 of the solder container 150 is closed by the mask 64, the solder paste is not delivered but is suitably pressurized. When the printing head 134 is moved on the mask 64 by the printing-head moving device 132 in this state, the solder paste is moved with the solder container 150 while remaining within the solder accommodating chamber 160, such that the delivery of the solder paste from the solder accommodating chamber 160 is prevented by the outlet-defining member 162 located on the downstream side as viewed in the printing direction, while a portion of the solder paste in contact with the upper surface of the mask is scraped by the outlet-defining member 162 located on the upstream side. When the solder outlet 162 is aligned with each of the apertures 65 of the mask 64, a corresponding part of the solder paste is forced into the aperture 65 in question, and an excess of the solder paste is scraped by the outlet-defining member 162 located on the upstream side, so that the aperture 65 is filled with the solder paste. Thus, the printing head 134 is a printing head or coating head of pressurizing type arranged to fill the apertures 65 with the solder paste contained therein, for thereby applying the printing material to the printing object. This step of mask-printing the solder paste on the printed-wiring board 12 is a printing step.

As the solder paste is delivered, the extruder plate 170 is lowered by the extruding air cylinder 172, while the pressure in the extrusion air chamber of the air cylinder 172 is detected by the extruding pressure sensor 180 and controlled to permit the solder paste to be delivered at the predetermined extruding pressure. Accordingly, the extruding pressure of the solder paste is kept constant at the predetermined value, irrespective of a decrease in the amount of the solder paste, so that the solder paste is forced into the apertures 65 at the predetermined penetrating pressure, whereby the solder paste is applied to the corresponding printing spots on the surface of the printed-wiring board 12. After the printing operation on one printed-wiring board 12 is completed, the printing head 134 is elevated with its outlet-defining members 162 being spaced away from the mask 64. In the present embodiment, one of the two outlet-defining members 162 which is located on the upstream side as viewed in the printing direction serves as a squeegee, and the contact load of this upstream outlet-defining member 162 acting on the mask 64 is referred to as a squeegee pressure.

Then, the printed-wiring-board support table 60 is lowered to lower the printed-wiring board 12 away from the mask 64, onto the printed-wiring-board conveyor 32, which is operated to feed the printed-wiring board 12 onto the printing-state inspecting machine 16. Thus, the mask printing operation of the printing machine 14 on the printed-wiring board 12 is completed.

When the mask printing machine 14 is operated to effect the mask printing operation to apply the solder paste to the printed-wiring board 12, the control device 182 supplies the monitoring device 28 with printing machine information including the squeegee pressure and speed, which printing machine information is generally referred to as "working machine information" which includes specific device information relating to the individual devices of the mask printing machine. The device information to be supplied to and retained by the monitoring device 28 includes the output signal of the extruding pressure sensor 180 provided to detect the extruding air chamber of the extruding air cylinder 172, and the output signal of the load sensor 144. The device information further includes control data for fixing the mask plate 36 on the mask support table 68, such as position data for controlling the position-adjusting device 80 with presser devices to position the mask plate 36.

There will next be described the printing-state inspecting machine 16. The inspecting machine 16 includes many elements similar to those in the mask printing machine 14 described above, and will be briefly described, by using the same reference signs as used for the mask printing machine 14.

The printing-state inspecting machine 16 is disposed on the downstream side of the mask printing machine 14 as viewed in the direction of transfer of the printed-wiring board. That is, the printing-state inspecting machine 16 is spaced from the mask printing machine 14 in the direction parallel to the plane of the mask 64. The inspecting machine 16 is provided with a stopper device (not shown) to stop the printed-wiring board 12 at a predetermined inspecting position, when the printed-wiring board 12 is transferred by the printed-wiring-board transferring device from the mask printing machine 14. This stopper device has an operated position for stopping a movement of the printed-wiring board 12, and a non-operated position for permitting the movement of the board 12.

Figure 11:
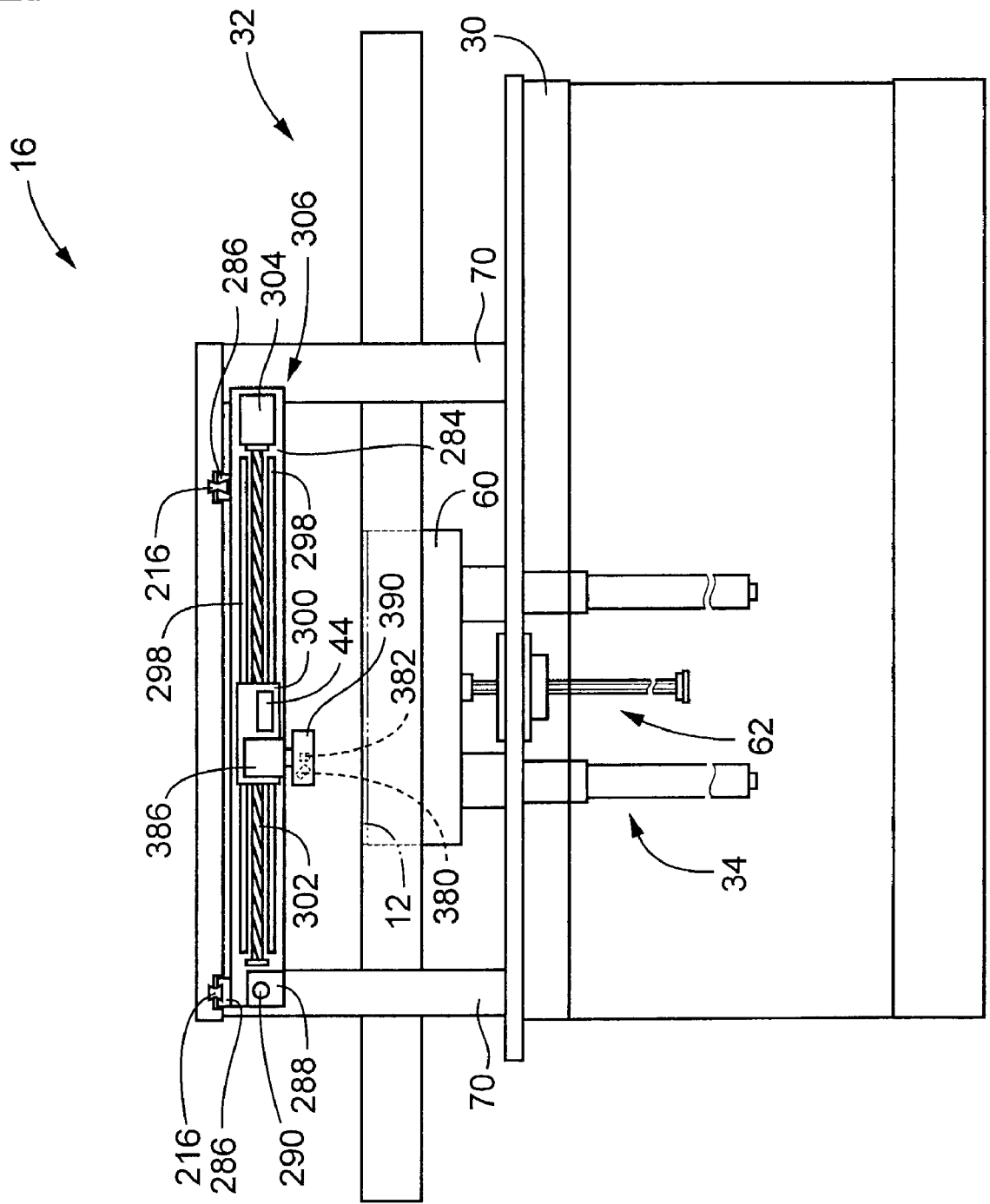
FIG. 11 is a front elevational view showing a printed-state inspecting machine in the above-indicated system.
Figure 12:
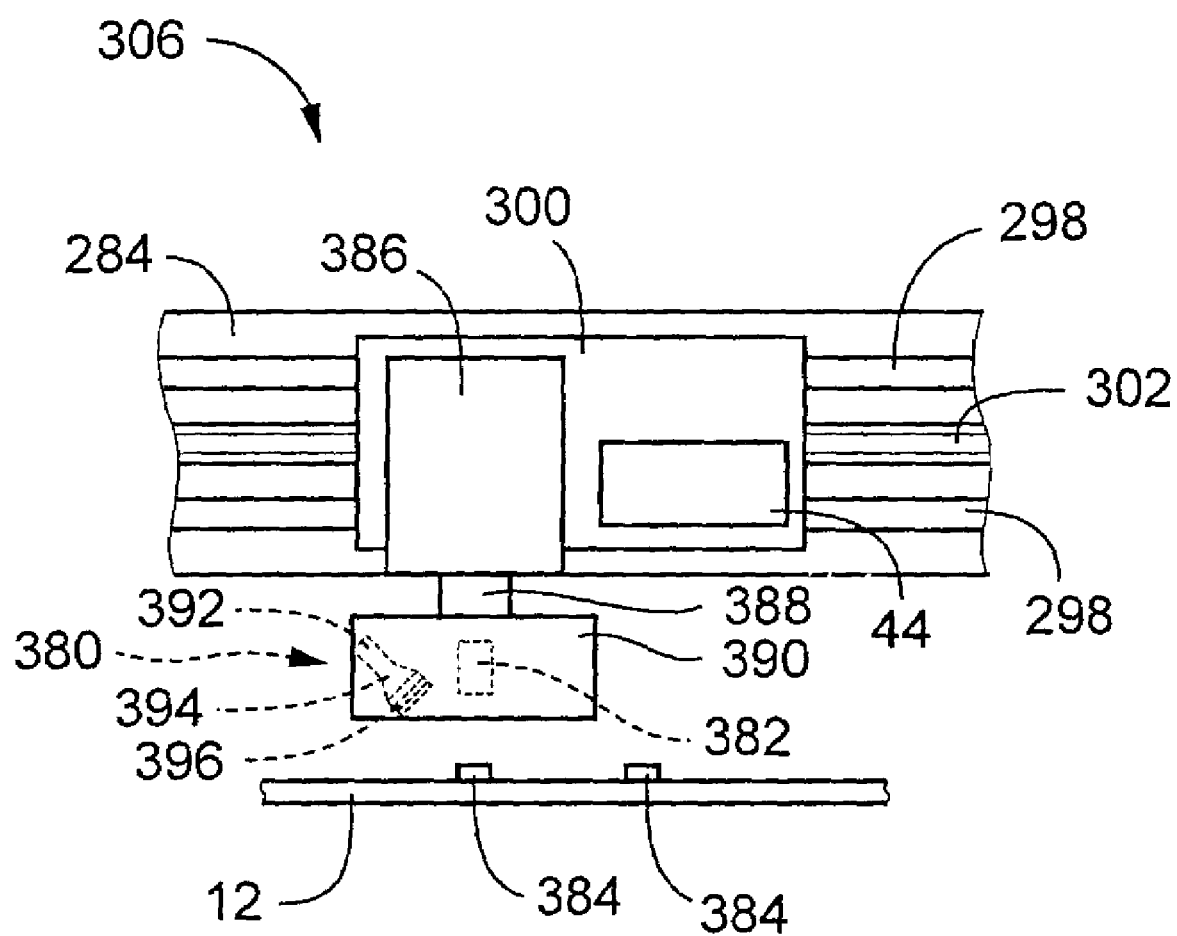
FIG. 12 is a front elevational view showing a relevant portion of the above-indicated printed-state inspecting machine.

As shown in FIGS. 11 and 12, the printing-state inspecting machine 16 includes a slit type light source 380 and a two-dimensional imaging device 382, which are movable in directions parallel to the printed-wiring board 12, that is, in the horizontal plane, to appropriate positions for inspecting masses 384 of the solder paste as printed on the printed-wiring board 12. As in the mask printing machine 14, the printed-wiring-board fiducial-mark imaging device 44 is disposed so as to be movable in the horizontal direction by the positioning device 306, and the slit type light source 380 and the two-dimensional imaging device 382 are movable by the positioning device 306, together with the imaging device 44. On the X-axis slide 300 of the positioning device 306, there is disposed a rotating device in the form of a swinging air cylinder 386 such that the swinging air, cylinder 386 extends in the vertical direction perpendicular to the surface of the printed-wiring board 12. The swinging air cylinder 386 has a rotary shaft 388 which is rotatable about its vertical axis within an angular range of 90°, which defined by stoppers not shown. The rotary shaft 388 extends downwards from the X-axis slide 300, and carries a holder body 390 at its lower end. The holder body 390 is movable by the positioning device 306 to a desired position in the horizontal plane, and is rotatable about the vertical axis by the swinging air cylinder 386, within the angular range of 90°.

In the present printing-state inspecting machine 16, the mask fiducial-mark imaging device 46 described above is not disposed on the X-axis slide 300.

As shown in FIG. 12, the holder body 390 carries the above-indicated slit type light source 380 and two-dimensional imaging device 382. In the present embodiment, the slit type light source 380 includes a semiconductor laser device 392, a beam expander 394, and a slit plate 396, and is arranged to emit a slit light. The beam expander 394 is arranged to increase the diameter of a light beam emitted from the semiconductor laser device 392, and convert the light beam into a parallel pencil of rays having a generally circular cross sectional shape. The slit plate 396 is arranged to convert the parallel pencil of rays into the light. By changing the slit plate 396, the width of the light can be changed as needed. The slit type light source 380 may be replaced by another other light source capable of emitting a light, for instance, a light source using a cylindrical lens or an aspherical lens, or a combination of such lenses.

In the present embodiment, the two-dimensional imaging device 382 is a CCD camera capable of taking a two-dimensional image of an object. The CCD camera is provided with a solid image sensor in the form of a matrix of CCDs (charge-coupled devices) and a focusing lens.

The slit type light source 380 and the two-dimensional imaging device 382 are positioned relative to the holder body 390 such that the optical axis of the slit type light source 380 is inclined, for example, at 45° with respect to the vertical line normal to the plane of the printed-wiring board 12, while the optical axis of the two-dimensional imaging device 382 is perpendicular to the plane of the board 12, that is, parallel to the above-indicated vertical line, so that those optical axes intersect each other. That is, the optical axis of the two-dimensional imaging device 382 is perpendicular to the plane of the board 12, and the angle of this optical axis with respect to the above-indicted vertical line is 0°. Thus, the slit type light source 380 and the two-dimensional imaging device 382 are held by the holder body 390 such that their optical axes have respective different angles of inclination with respect to the vertical line normal to the plane of the board 12.

The slit type light source 380 and the two-dimensional imaging device 382 are moved to appropriate positions in the horizontal plane, with the holder body 390 being moved by the positioning device 306, and are rotated within the range of 90°, with the holder body 390 being rotated about the vertical axis by the swinging air cylinder 386. Since the slit type light source 380 and the two-dimensional imaging device 382 are both held by the holder body 390, these light source 380 and imaging device 382 are moved and rotated together, with the predetermined relative position being kept unchanged irrespective of the horizontal and angular positions of the holder body 390. Further, the holder body 390 is rotated to rotate the slit type light source 380 and the two-dimensional imaging device 382 to a selected one of two angular positions in which a vertical plane including the optical axes and normal to the plane of the printed-wiring board 12 is parallel to the X-axis and Y-axis directions, respectively.

Figure 13:
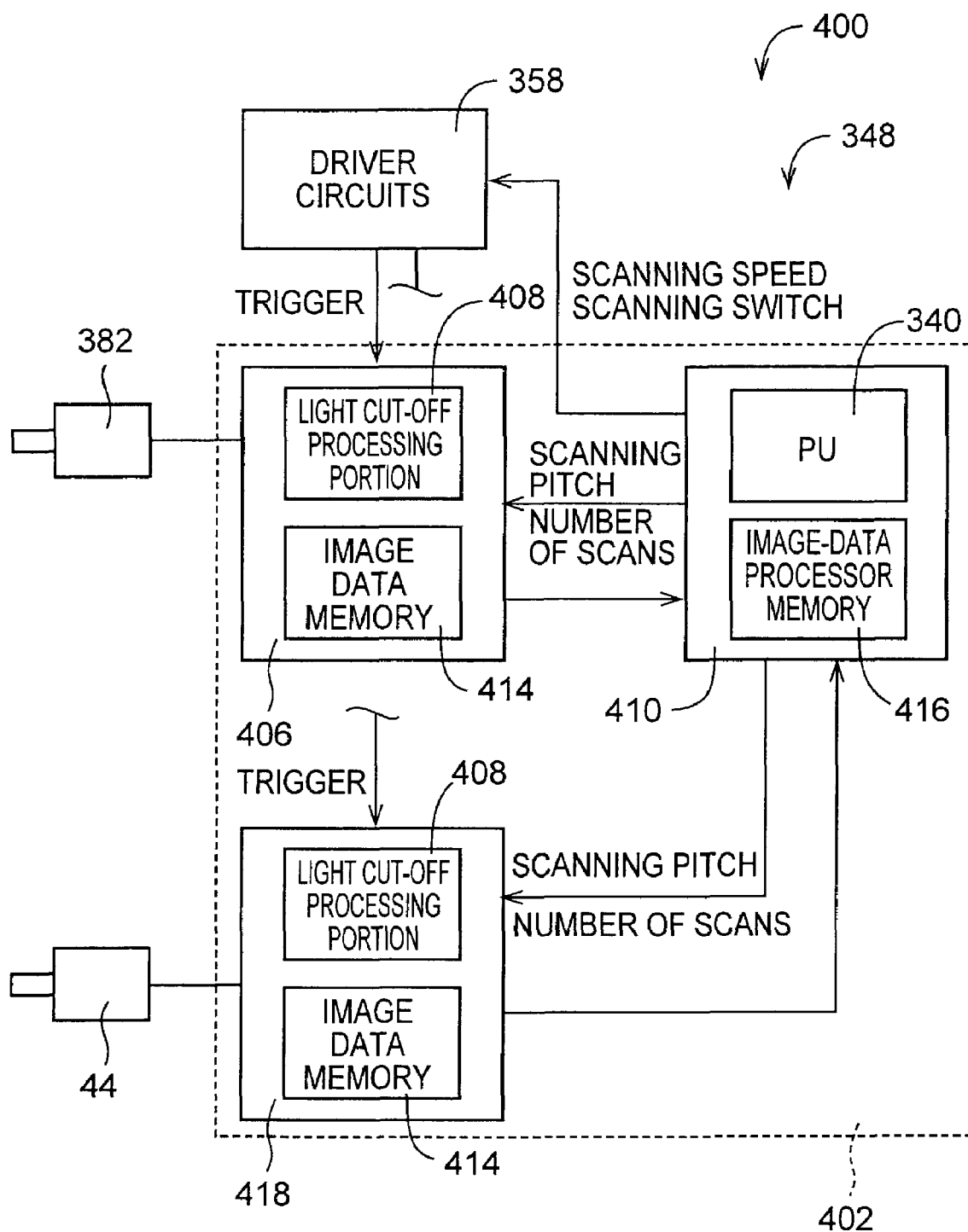
FIG. 13 is a block diagram showing a control portion of the above-indicated printed-state inspecting machine.

The printing-state inspecting machine 16 constructed as described above is controlled by a control device 400, which is similar to the control device 182 shown in FIG. 10. As shown in FIG. 13, the control device 400 is provided with an image data processing device 402. Since the image data processing device 402 is similar to an image data processing device as disclosed in JP-A-2001-116528 and does not directly relate to the present invention, the image data processing device 402 will be only briefly described.

The image data processing device 402 includes an image-data input portion 406 arranged to receive image data obtained by the two-dimensional imaging device 382, and a main image data processing portion 410 arranged to process the image data. The image-data input portion 406 receives the image data from the two-dimensional imaging device 382, and transmits the image data to the main image data processing portion 410, which is an image processing portion of the computer 348. The image-data input portion 406 includes a light cut-off processing portion 408 arranged to receive the image data from the two-dimensional imaging device 382, on the basis of information on the number of scans (number of image-taking operations) and scanning pitch (incremental feeding distance per each image-taking operation) received from the main image data processing portion 410, and data reading trigger signals received from the driver circuits 358 for the X-axis drive servomotor 292 and the Y-axis drive servomotor 304. The image data received by the light cut-off processing portion 408 are stored in an image data memory 414. The image data memory 414 is constituted by a portion of the RAM 344 of the computer 348.

The image-data input portion 406 is arranged to selectively transmit to the main image data processing portion 410 a part of the image data which is stored in a predetermined area of the image data memory 414 and which is likely to represent a portion of the object that is irradiated by the slit light. Accordingly, the main image data processing portion 410 is required to process only a portion of the image data, which is only a fraction of the entire volume of the image data, so that the required image data processing time can be reduced.

The main image data processing portion 410 stores the received image data in an image-data processing memory 416, which is also constituted by a portion of the RAM 344 of the computer 348. The image-data processing memory 416 includes a two-dimensional image data memory, a three-dimensional image data memory, and an inspection result data memory. The received image data are stored in the two-dimensional image data memory of the image-data processing memory 416. On the basis of the image data stored in this two-dimensional image data memory, the main image data processing portion processes the image data, to obtain the volume, surface area and average height of each solder paste mass 384 applied to the surface of the printed-wiring board 12, and information regarding the presence or absence of a bridging segment in the solder paste mass 384.

The image data processing device 402 is further connected to the fiducial-mark imaging device 44, which is connected to the main image data processing portion 416 through another image-data input portion 418. The fiducial-mark imaging device 44 is operated to take images of the fiducial marks provided on the printed-wiring board 12, at a time different from the time at which the two-dimensional imaging device 382 is operated. The image data obtained by the fiducial-mark imaging device 44 are fed to the main image data processing portion 410.

In the present embodiment, each aperture 65 formed through the mask 64 has a rectangular shape in cross section taken in a plane parallel to the plane of the mask 64, as described before. Accordingly, the solder paste mass 384 printed on the board surface is a rectangular parallelepiped having a three-dimensional shape including two adjacent sides which are perpendicular to each other and which are parallel to the X-axis and Y-axis directions, respectively.

In the present embodiment, all of the printed solder paste masses 384 are inspected. Each of the solder paste masses 384 is irradiated with the slit light emitted by the slit type light source 380, and the two-dimensional imaging device 382 is operated to obtain an image of each solder paste mass 384. During the operation of the imaging device 382, the holder body 390 is fed by the positioning device 306, to move the slit type light source 380 and the two-dimensional imaging device 382 relative to the object in the form of the printed solder paste mass 384, along a predetermined path, while maintaining the predetermined relative position between the light source 380 and the imaging device 382. In the present embodiment, the predetermined path is a straight line parallel to the plane of the printed-wiring board 12 and the longitudinal direction of the rectangular parallelepiped of the solder paste mass 384.

When the slit type light source 380 and the two-dimensional imaging device 382 are moved relative to each solder paste mass 384, as described above, the two-dimensional imaging device 382 images a portion of the solder paste mass 384 being irradiated by the slit light, without an interruption of the movement of the imaging device 382. A plurality of imaging operations are effected at a predetermined time interval, to take a plurality of two-dimensional images of a portion of the surface of the printed-wiring board 12 and the portions of the solder paste mass 384 irradiated by the slit light upon the respective imaging operations.

Image information thus obtained on the printed solder paste masses and the above-described device information are transmitted to and stored in the monitoring device 28, and are analyzed by the monitoring device 28 to estimate the operating condition of the mask printing machine 14.

Next, the first electronic-component mounting machine 18 will be described.

This electronic-component mounting machine 18, which is arranged to primarily mount electronic components of small sizes, is substantially identical in construction with an electronic-component mounting machine as disclosed in co-pending U.S. patent application Ser. No. 10/159,008, and will be only briefly described.

Figure 14:
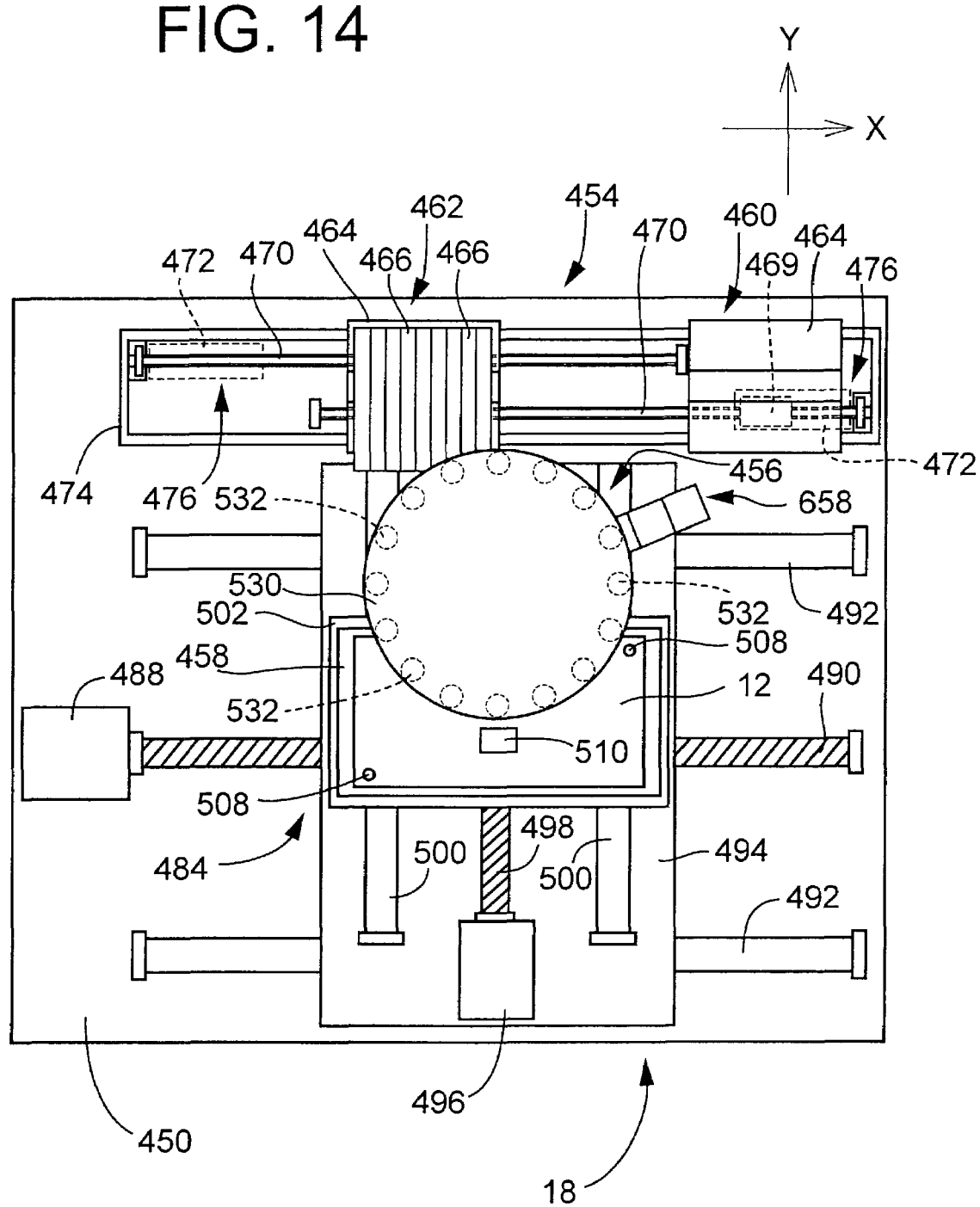
FIG. 14 is a plan view showing a first electronic-component mounting machine in the above-indicated system.

In FIG. 14, reference sign 450 denotes a machine base of the first electronic-component mounting machine 18 serving as an electronic-component mounting system. On the machine base 450, there are mounted a component-supplying device 454, a component-mounting device 456, and a substrate holding device in the form of a printed-wiring-board holding device 458, which constitute the first electronic-component mounting device 18.

The component-supplying device 454 is provided with at least one component supply table, in this embodiments, two component supply tables 460, 462. Each of these component supply tables 460, 462 has a feeder carriage 464, and a plurality of feeders 466 mounted on the feeder carriage 464. In the present embodiment, each feeder 466 is arranged to feed a carrier tape accommodating electronic components in the form of electronic components 468 (shown in FIG. 18), so that the electronic components 468 are supplied from the carrier tape.

The electronic components 468 are accommodated in respective multiple component-accommodating recesses formed in the carrier tape, and the openings of the component-accommodating recesses are closed by a covering tape bonded to the carrier tape. The carrier tape is fed by a tape feeding device (not shown), such that the electronic components 468 are successively fed to a component-supply portion. The plurality of feeders 466 are removably mounted on the feeder carriage 464 such that the component-supply portions of the feeders 466 are arranged along a line, for instance, along a horizontal straight line.

As described below, the first electronic-component mounting machine 18 has an XY coordinate system in which movement data for moving the component-supply tables, the printed-wiring-board holding device 458 and other movable members are defined. The component-supply portions of the above-indicated plurality of feeders 466 are arranged in the X-axis direction (left and right direction as seen in FIG. 14) of the XY coordinate system.

The feeder carriage 464 of each of the component-supply tables 460, 462 is provided with a nut 469 fixed thereto, and each component-supply table 460, 462 is moved in the X-axis direction while being guided by a guiding device including a guide rail 474, when a feedscrew in the form of a ball screw 470 is rotated by a table drive motor 472. Thus, the component-supply portions of the plurality of feeders 466 are selectively moved to a predetermined component-supply position. The ballscrew 470, table drive motor 472, etc. constitute a component-supply-table positioning device 476. Namely, the two component-supply tables 460, 462 are moved independently of each other by the respective two component-supply-table positioning devices 476. It is noted that the guide rail 474 is commonly used for the two component-supply tables 460, 462. Since a manner in which the electronic components 468 are supplied by the two component-supply tables 460, 462 is known as disclosed in JP-B2-8-21791, no further description will be provided. It is noted that FIG. 14 shows the nut 469 of only the component-supply table 460 and the feeders 466 of only the other component-supply table 462, but does not show the feeders 466 of the component-supply table 460 and the nut 469 of the component-supply table 462.

The printed-wiring-board holding device 458 is arranged to hold a circuit substrate in the form of the printed-wiring board 12 in the horizontal attitude, and is movable to a desired position in the XY coordinate system, by a substrate-holding-device positioning device in the form of an XY table 484. The XY table 484 includes an X-axis slide 494 and a Y-axis slide 502 mounted on the X-axis slide 494. The X-axis slide 494 is movable in the X-axis direction while being guided by a guiding device including a guide rail 492, by an X-axis slide drive motor 488 and a feedscrew in the form of a ballscrew 490. The Y-axis slide 502 is movable on the X-axis slide 494 in the Y-axis direction while being guided by a guiding device including guide rails 500, by a Y-axis slide drive motor 496 and a feedscrew in the form of a ballscrew 498.

The printed-wiring-board holding device 458 is disposed on the Y-axis slide 502, and is arranged to support the printed-wiring board 12 in the horizontal attitude in contact with its lower surface. The upper surface of the printed-wiring board 12 has a plurality of component-mounting spots in which the electronic components 468 are to be mounted. These component-mounting spots are sequentially brought to a position corresponding to a predetermined component-mounting position (described below) of the component-mounting device 456, by moving the printed-wiring-board holding device 458.

On the upper surface of the printed-wiring board 12, there are provided a plurality of fiducial marks, in the present embodiment, two fiducial marks 508. When the printed-wiring board 12 is held by the printed-wiring-board holding device 458, images of the fiducial marks 508 are taken by an imaging device in the form of a fiducial-mark camera 510, which is held by a holder member (not shown) provided on a frame 520 of the component-mounting device 456, which will be described. The fiducial-mark camera 510 is held stationary, so as to face downwards, to take the images of the fiducial marks 508 in the downward direction.

The fiducial-mark camera 510 is provided with a solid image sensor in the form of a matrix of CCDs (charge-coupled devices) and a lens system including focusing lens, and is a surface-imaging device capable of taking a two-dimensional image of an object at one time. The CCDs have respective multiple minute photosensitive elements which are arranged in a plane and which generate electric signals depending upon amounts of incident light. The multiple photosensitive elements define an imaging area or surface. It is noted that an illuminating device (not shown) is provided to illuminate the object and its vicinity when the image of the object is taken by the fiducial-mark camera 510.

The component-mounting device 456 will be described by reference to FIG. 15. The component-mounting device 456 in the present embodiment will be only briefly described since it is similar in construction to an electronic-component mounting device as disclosed in JP-A-6-342998, and an electronic-component mounting device as disclosed in U.S. Pat. No. 6,507,997.

Figure 15:
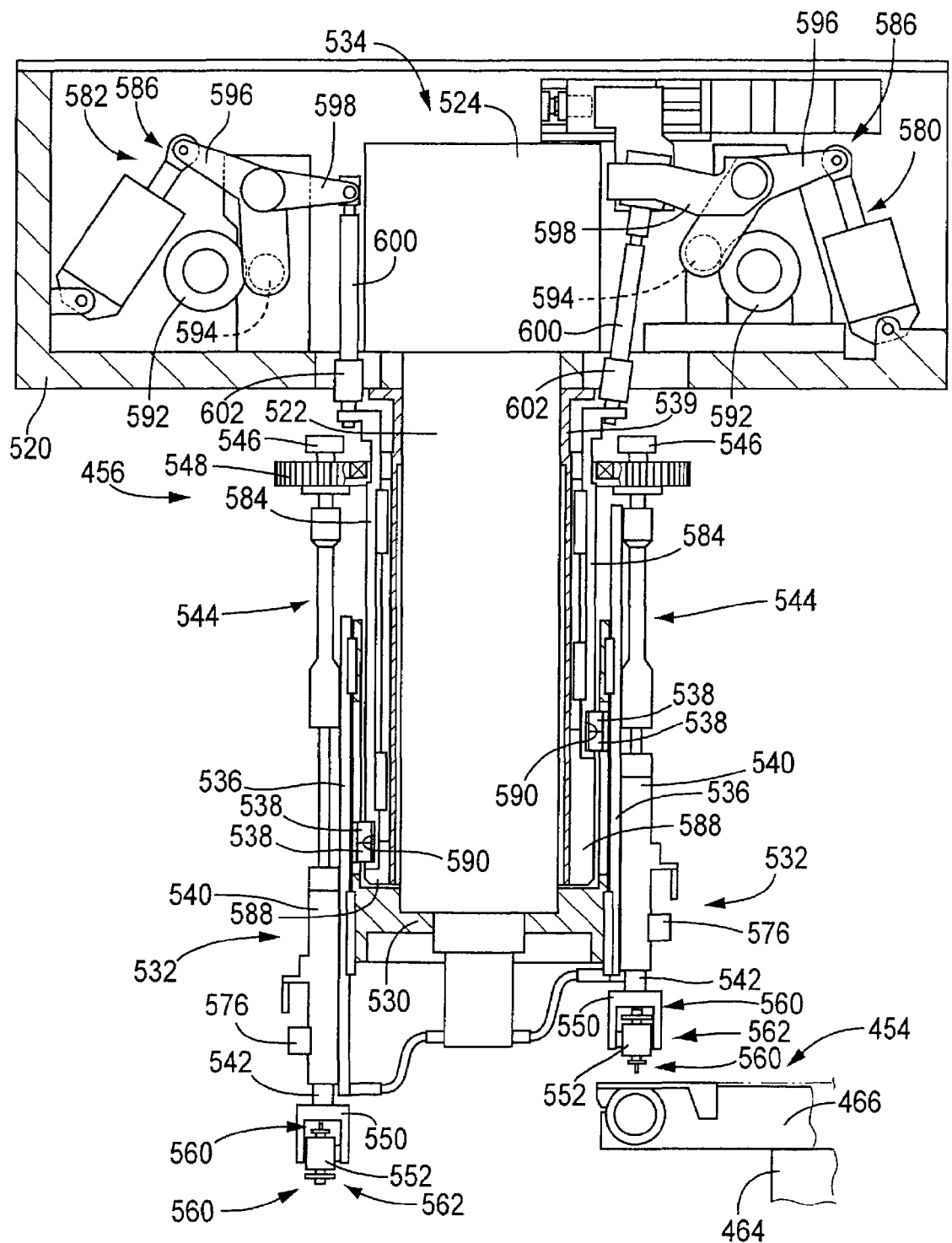
FIG. 15 is a side elevational view (partly in cross section) showing a mounting device in the above-indicated first electronic-component mounting machine.

In FIG. 15, reference sign 520 denotes a frame provided on the machine base 450. A rotary shaft 522 is supported by the frame 520 such that the rotary shaft 522 is rotatable about an axis, in the present embodiment, about a vertically extending axis. The rotary shaft 522 is rotated by a rotary shaft drive device 524, which includes a roller gear and a roller gear cam, which are not shown. When the roller gear cam is rotated by an intermittent rotary drive motor 526 (shown in FIG. 20), in one direction at a constant speed, a plurality of rollers of the roller gear are sequentially brought into engagement with a cam rib of the roller gear cam, so that the rotary shaft 522 is intermittently rotated about the vertical axis, by a predetermined angle.

A rotating member serving as a moving member in the form of an indexing body 530 as an intermittent rotary body is fixed to the lower end portion of the rotary shaft 522 which extends downwardly from the frame 520. The indexing body 530 carries a plurality of component-holding heads 532, in this embodiment, sixteen component-holding heads 532 such that the component-holding heads 532 are equiangularly spaced from each other along a circle having a center on the axis of rotation of the rotary shaft 522, and such that the component-holding heads 532 are movable in a direction parallel to the axis of rotation of the indexing body 532, that is, vertically movable, and are rotatable about their axes of rotation. The component-holding heads 532 serve as component-mounting heads operable to receive the electronic components 468 from the component-supplying device 454 and mounts them on the printed-wiring board 12.

Figure 16:
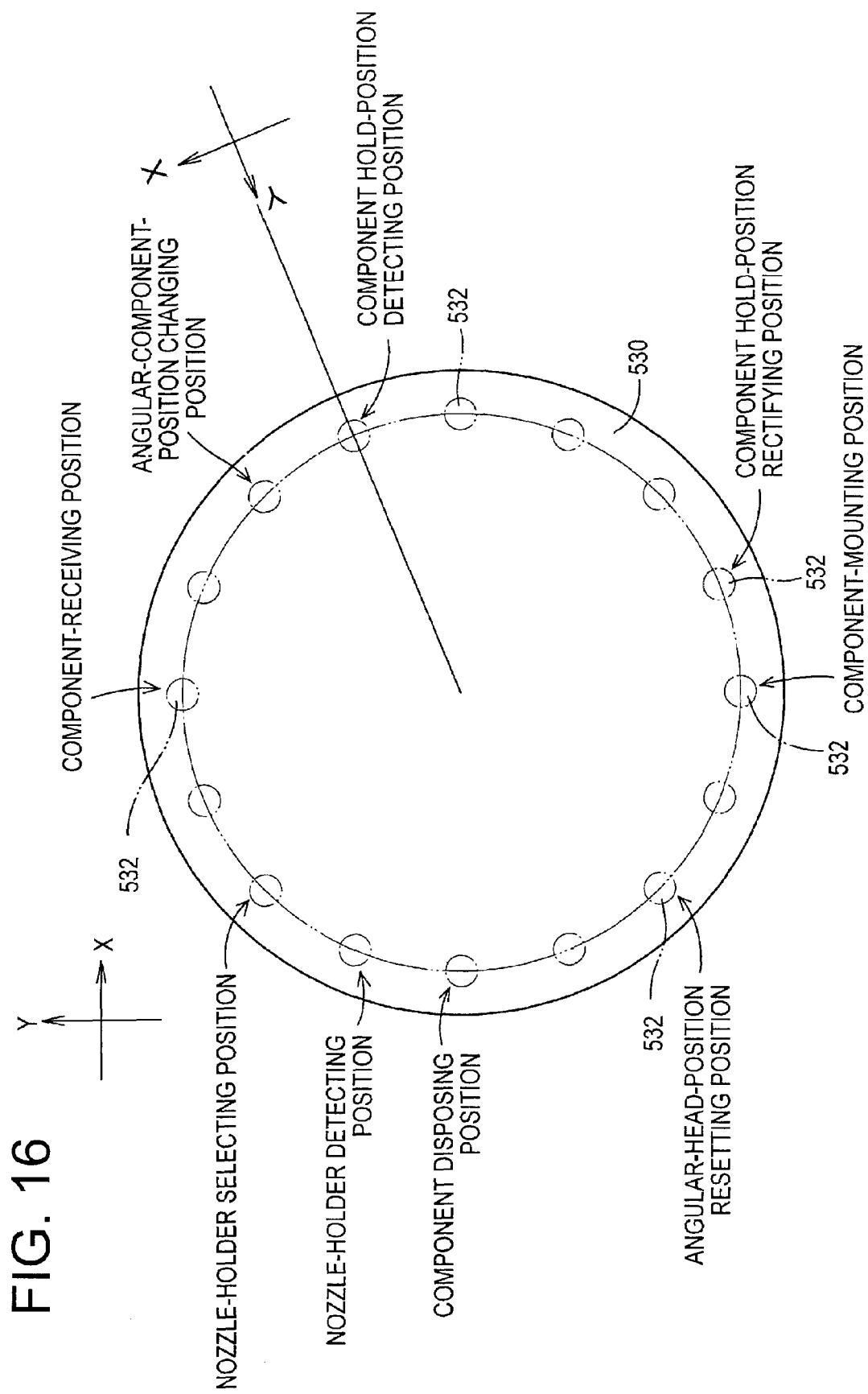
FIG. 16 is a view for explaining working positions of the above-indicated first electronic-component mounting machine.

When the rotary shaft 522 is rotated, the indexing body 530 is intermittently rotated, by a predetermined angle equal to the angular spacing interval of the sixteen component-holding heads 532. Thus, the sixteen component-holding heads 532 are turned about a common axis of rotation, that is, about the vertical axis of rotation of the indexing body 530, so that each component-holding head 532 is moved to and stopped at sixteen working positions, which are arranged along a circular path of turning movement of each component-holding head 532, as schematically indicated in FIG. 16. The sixteen working positions include: a component-receiving position (component-sucking position or component-holding position); an angular-component-position changing position; a component-hold-position detecting position; a component-hold-position rectifying position; a component-mounting position; an angular-head-position resetting position; a component-disposing position; a nozzle-holder detecting position; and a nozzle-holder selecting position. In the present embodiment, the rotary shaft 522, rotary shaft drive device 524, etc. constitute an intermittently rotating device 534, which cooperates with the indexing body 530 to constitute a head-turning device. This head-turning device is an intermittently head-turning device. The X-axis direction is tangent to the circular path of turning of each component-holding head 532 at the component-receiving position.

A supporting member 536 which supports each component-holding head 532 and which is vertically movably supported by the indexing body 530 has cam followers in the form of rollers 538 held in engagement with a cam groove in a cylindrical cam 539 fixed to the frame 520. The height position of this cam groove gradually changes in the circumferential direction, so that when the indexing body 530 is rotated to turn each component-holding head 532, the rollers 538 are moved in the cam groove, in contact with side surfaces of the cam groove, whereby the component-holding head 532 is vertically moved. In the present embodiment, the cam groove is formed so that the component-holding head 532 at the component-receiving position is located at its fully elevated position while the component-holding head 532 at the component-mounting position is located at its fully lowered position, and so that the component-holding heads 532 are moved in the horizontal direction between the component-receiving and component-mounting positions.

To the outer surface of the supporting member 536, there is fixed a support member in the form of a cylindrical sleeve 540 which engages a shaft member 542 having a circular shape in transverse cross section. The shaft member 542 extends in the vertical direction, that is, in a direction parallel to an axis of rotation of a suction nozzle, and is supported by the sleeve 540 such that the shaft member 542 is rotatable about its axis and is not axially movable relative to the sleeve 540. To the shaft member 542, there is attached an engaging 546 through a rotation transmitting shaft 544, such that the engaging member 546 is not rotatable and is axially movable relative to the shaft member 542. When the component-holding head 532 is turned while it is vertically moved by the cylindrical cam 539, the engaging member 546 is not vertically moved, that is, the position of the engaging member 546 is kept unchanged in the direction of rotation of the component-holding head 532.

The engaging member 546 is turned about the axis of rotation of the indexing body 530, at an angular velocity different from that of the indexing body 530, by an engaging-member turning device including an externally threaded ring gear 548, such that the engaging member 546 reaches each working position before the component-holding head 532. This relative movement of the engaging member 546 and the component-holding head 532, which is disclosed in JP-A-6-342998, does not directly relate to the present invention and will not be further described.

As shown in FIG. 15, the lower end portion of the shaft member 542 extends downwards from the lower end of the sleeve 540, and a mounting member 550 is fixed to the lower end of the shaft member 542. The mounting member 550 has a support shaft which extends in the horizontal direction perpendicular to the axis of rotation of the shaft member 542. A rotary holder 552 is mounted on the support shaft such that the rotary holder 552 is rotatable about the horizontal support shaft.

The rotary holder 552 has a plurality of nozzle holders, in the illustrated example, six nozzle holders which are equiangularly spaced apart from each other about the axis of rotation of the rotary holder 552. The nozzle holders support respective suction nozzles 560. Thus, the six suction nozzles 560 are held by the rotary holder 552 such that the suction nozzles 560 extend in the radial direction of the rotary holder 552. With a rotary motion of the rotary holder 552 about the support shaft by a nozzle-holder selecting device (not shown) disposed at the above-indicated nozzle-holder selecting position, a selected one of the plurality of nozzle holders is moved to and held in place at a working or operating position in which the suction nozzle 560 held by the selected nozzle holder extends downwards, with its axis being aligned with the axis of the shaft member 542. With the nozzle holder placed in the operating position, the corresponding suction nozzle 560 is placed in its operating position for holding and releasing the electronic component 468.

In the present embodiment, the shaft member 542, the mounting member 550 and the rotary holder 552 constitute the component-holding head 532 which holds the six suction nozzles 560. The component-holding head 532 is rotatable about the axis of the shaft member 542, that is, about the vertical axis parallel to the axis of rotation of the indexing body 530, and is arranged to hold the suction nozzle 560 placed in its operating position such that this suction nozzle 560 extends in a direction substantially parallel to its axial direction. The component-holding head 532 may be considered to be constituted by the nozzle holder holding the suction nozzle 560 placed in its operating position, the mounting member 550 and the shaft member 542.

Each of the sixteen component-holding heads 532 is provided with an identifier in the form of a code identifying it, and each of the six nozzle holders is also provided with a code identifying it. In addition, the kinds of the suction nozzles 560 are stored in relation to the respective nozzle holders. The kind of the suction nozzle 560 placed in the operating position on the component-holding head 532 is specified by the above-indicated two kinds of code data and the suction nozzle data.

Each component-holding head 532 and the suction nozzles 560 held by the component-holding head constitute a component-mounting unit 562. The component-mounting device 456 has a plurality of equiangularly arranged component-mounting units 562, sixteen component-mounting units 562 in the illustrated example, in which only two of the suction nozzles 560 are shown for each component-holding head 532. The feeders 466 of the component-supplying device 454 are positioned such that the above-indicated component-accommodating recesses are movable to a position right below the suction nozzle 560 placed in the operating position on the component-holding head 532 located at the component-receiving position. That is, the position of the component-supply portion of the feeder 466 right below the selected suction nozzle 560 at the component-receiving position is the component-supplying position.

Figure 18:
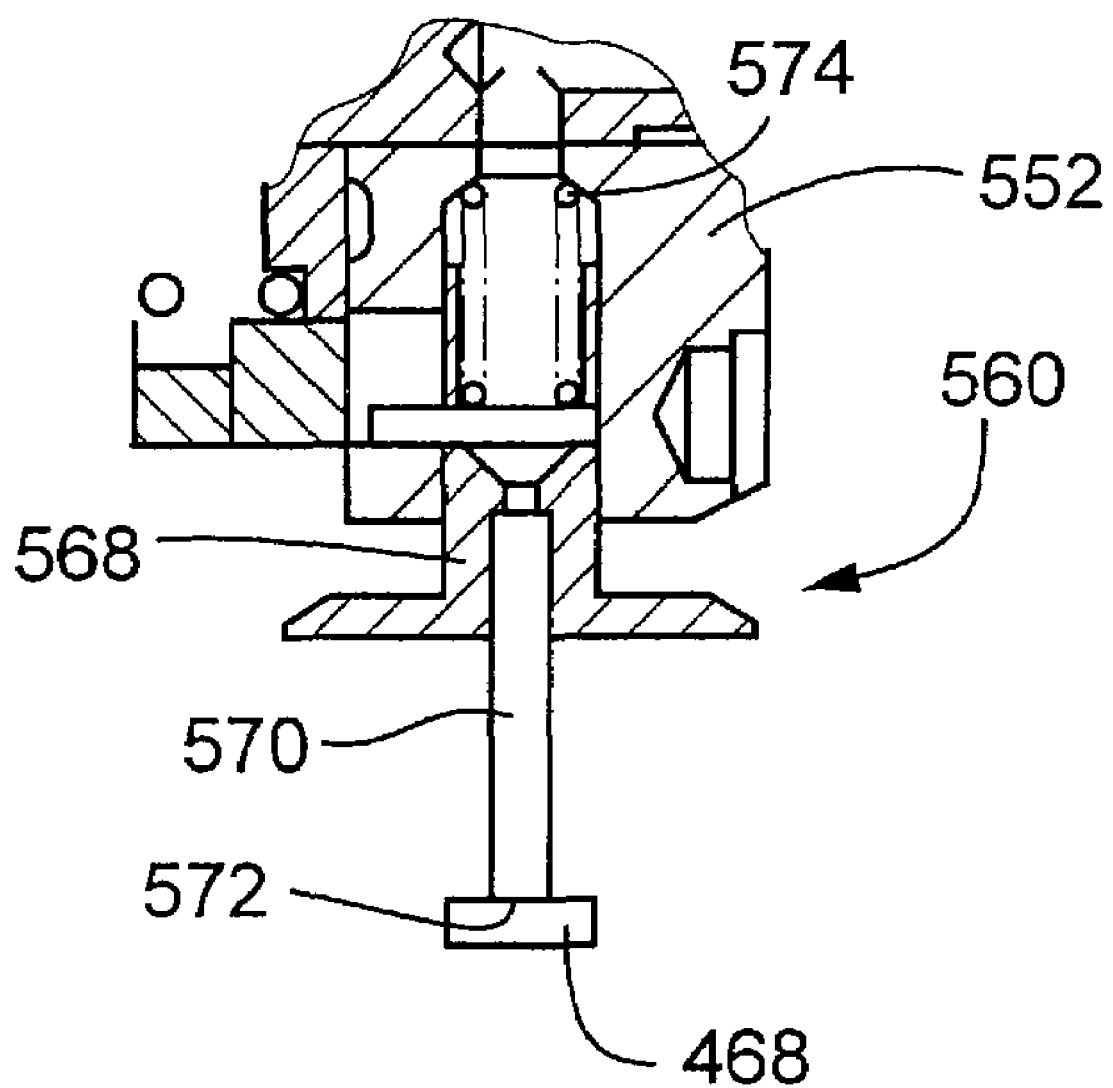
FIG. 18 is a side elevational view in cross section showing a suction nozzle of the above-indicated mounting head.

Each of the suction nozzles 560 is arranged to hold the electronic component 468 by suction under a negative pressure. As shown in FIG. 18 by way of example, each suction nozzle 560 has a nozzle body 568, and a suction tube 570 which has a lower end face serving as a sucking end face 572 on which the electronic component 468 is held by suction. The suction tube 570 is removably held by the nozzle body 568 such that the suction tube 570 is not rotatable and is axially movable relative to the nozzle holder. When the electronic component 468 is held by suction and mounted, the suction tube 570 is permitted to be moved relative to the rotary holder 552 while a spring 574 provided as a biasing device between the rotary holder 552 and the suction tube 570 is compressed, so that this movement of the suction tube 570 reduces an impact of the electronic component 468 against the suction nozzle 560 or the printed-wiring board 12 upon abutting contact of the electronic component 468 with the suction nozzle 560 or the printed-wiring board 12. In the illustrated example, the suction nozzles 560 on each component-holding head 532 are different in kind from each other, but their suction tubes 570 have the same length and the sucking end faces 572 concentric with the rotary holder 552.

When the electronic component 468 is held by suction by the suction nozzle 560 placed in its operating position, the suction nozzle 560 is supplied with a negative pressure generated by a vacuum pump (not shown) provided as a negative pressure source. When the electronic component 468 is released from the suction nozzle 560, the suction nozzle 560 is supplied with a positive pressure generated by an air pump (not shown) provided as a positive pressure source, and is then communicated with the atmosphere. Selective communication of the suction nozzle 560 with the negative and positive pressure sources and the atmosphere is effected mechanically by a control valve in the form of a directional control valve 576 fixed to the sleeve 540.

As shown in FIG. 15, component-holding-head moving devices in the form of head elevating and lowering devices 580, 582 are disposed at respective two portions of the frame 520 and cylindrical cam 539, which correspond to the component-receiving and component-mounting positions, respectively. These head elevating and lowering devices 580, 582 are provided as nozzle moving devices operable to move the component-holding heads 532 in the vertical direction for moving the suction nozzle 560 in the axial direction. The head elevating and lowering device 580 constitutes a relative-movement device for moving the component-supplying device 454 and the component-holding head 532 toward and away from each other in the axial direction of the component-holding head 532.

The head elevating and lowering device 580 disposed at the component-receiving position will be briefly described by reference to FIG. 15.

The head elevating and lower device 580 has a moving member in the form of an elevator member 584 and a moving-member moving device in the form of an elevator moving device 586. The elevator member 584 is held in engagement with a guide groove 588 formed in the cylindrical cam 539 so as to extend in the axial direction of the indexing body 530, such that the elevator member 584 is movable in the axial direction of the indexing body 530. The elevator member 584 has a lower end portion which has an engaging groove 590 formed so as to be continuous with the cam groove formed in the cylindrical cam 539 when the elevator member 584 is located at its fully elevated position. In this fully elevated position, the rollers 538 are movable from the cam groove into the engaging groove 590, so that the component-holding head 532 is supported by the elevator member 584.

The elevator moving device 586 uses the intermittent rotary drive motor 526 as a drive source, a rotary motion of which is converted into a vertical motion by a motion-converting device including a cam in the form of a rotary cam 592, a cam follower in the form of a roller 594, and levers 596, 598. The vertical motion is transmitted to the elevator member 584 by a motion transmitting device including a connecting rod 600 and a spherical joint 602. Thus, the elevator member 584 is vertically movable to vertically move the component-holding head 532 for thereby vertically moving the suction nozzle 560. The vertical movement and turning movement of the suction nozzle 560 are controlled in timed relationship with each other by the configurations of the cam of the rotary shaft drive device 524 and the rotary cam 592. The vertical operating stroke of the elevator member 584 is adjustable to adjust the fully lowered position of the component-holding head 532. This adjustment does not directly relate to the present invention, and will not be further described.

The vertical operating stroke of the elevator member 584 of the head elevating and lowering device 582 is not adjustable but is held constant. That is, the fully lowered position and the fully elevated position of the component-holding head 532 located at the component-mounting position are held constant. In the other aspects, the head elevating and lowering device 582 is identical with the head elevating and lowering device 580, and will not be further described, with the same elements being identified by the same reference signs as used for the head elevating and lowering device 580.

An angular-component-position changing device, a component-hold-position rectifying device and an angular-head-position resetting device 610 (shown in FIG. 17) are disposed at the angular-component-position changing position, the component-hold-position rectifying position and the angular-head-position resetting position, respectively. The angular-component-position changing device is operated when the angular position (angular orientation) of the electronic component 468 as held by the component-holding head 532 is different from the angular position in which the electronic component 468 is mounted. The angular-component-position changing device is arranged to rotate the component-holding head 532 holding the electronic component 468, about its axis, so that the electronic component 468 is rotated to its mounting angular position. The component-hold-position rectifying device is arranged to rotate the component-holding head 532 about its axis for rotating the suction nozzle 560 placed in the operating position, to thereby eliminate an angular positioning error of the electronic component 468 as held by the suction nozzle 560. This angular positioning error is an error of positioning of the electronic component 468 about an axis perpendicular to its surface sucked by the suction nozzle 560. The angular-head-position resetting device 610 is arranged to rotate the component-holding head 532 to its original component-receiving angular position after the component-holding head 532 have been rotated to change the angular position of the electronic component 468 and to eliminate the angular positioning error as described above.

The angular-component-position changing device, the component-hold-position rectifying device and the angular-head-position resetting device 610 are all head rotating devices which are identical in construction with each other, in the present embodiment. The angular-head-position resetting device 610 will be described by way of example, by reference to FIG. 17.

The angular-head-position resetting device 610 includes an engaging member 612, a switching device 614 for moving the engaging member 612 in the axial direction, and a rotating device 616 for rotating the engaging member 612. The engaging member 612 is supported by the above-indicated frame 520 such that the engaging member 612 is axially movable and is not rotatable relative to the frame 520. The switching device 614 is arranged to vertically move the engaging member 612 in the axial direction of the indexing body 530, for selective engagement and disengagement of the engaging member 612 with and from the above-indicated engaging member 546.

The switching device 614 uses the intermittent rotary drive motor 526 as a drive source, a rotary motion of which is converted into a vertical motion and transmitted to the engaging member 612 by a cam, a cam follower and a motion transmitting device, so that the engaging member 612 is moved for engagement and disengagement with and from the engaging member 546. The rotating device 616 has an angular-head-position resetting motor 620 (shown in FIG. 20) as a drive source. A rotary motion of the resetting motor 620 is transmitted to the engaging member 612 by a rotation transmitting device including a timing pulley 622, so that the engaging member 612 is rotated about its vertical axis. The engaging member 612 is rotated in engagement with the engaging member 546 provided on the component-holding head 532, so that a rotary motion of the engaging member 612 is transmitted to the component-holding head 532 through the engaging member 546 and the rotation transmitting shaft 544, whereby the component-holding head 532 is bidirectionally rotatable about its axis to a desired angular position.

Figure 17:
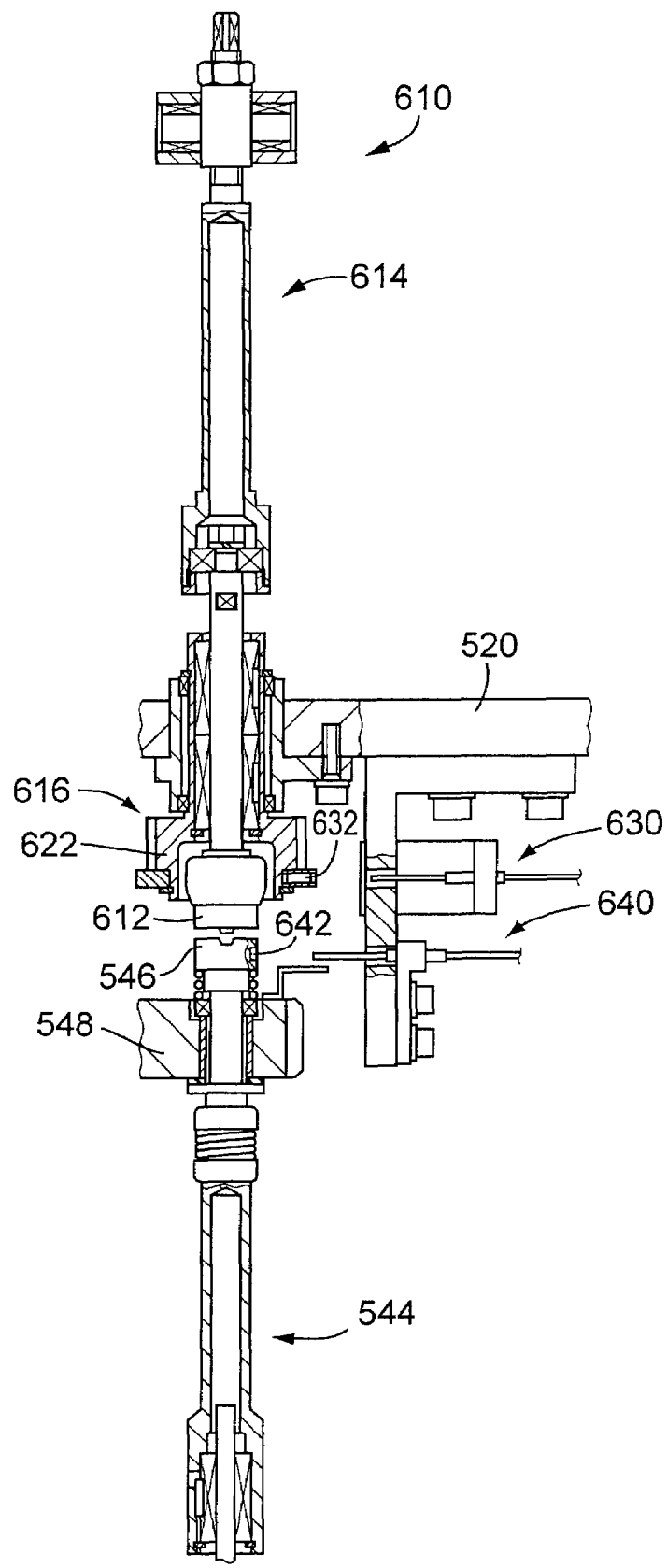
FIG. 17 is a side elevational view (partly in cross section) showing a device for rotating a mounting head of the above-indicated first electronic-component mounting machine.

As shown in FIG. 17, the angular-head-position resetting device 610 is provided with an engaging-member angular-zero-position detecting device 630 for detecting the angular zero position of the engaging member 612. This detecting device 630 is attached to the frame 520. In the present embodiment, the angular-zero-position detecting device 630 is constituted by an optical fiber type sensor arranged to detect the angular zero position of the component-holding head 532 depending upon whether a light emitted to irradiate a reflecting member 632 provided on the timing pulley 622 is reflected by the reflecting member 632. The engaging-member angular-zero-position detecting device 630 is also provided for the angular-component-position changing device and the component-hold-position rectifying device.

The angular-head-position resetting device 610 is also provided with a holding-head angular-zero-position detecting device 640 for detecting the angular zero position of the component-holding head 532. In this embodiment, this detecting device 640 is constituted by an optical fiber type sensor. The engaging portion 546 of the rotation transmitting shaft 544 connected to the component-holding head 532 such that the shaft 544 is not rotatable relative to the component-holding head 532 has a reflecting surface 642 on its outer circumferential surface. The detecting device 640 detects the angular zero position of the component-holding head 532 depending upon whether a light emitted to irradiate the reflecting surface 642 is reflected by the reflecting surface 642. The holding-head angular-zero-position detecting device 640 is provided for only the angular-head-position resetting device 610. The component-holding head 532 is moved to the component-receiving-position to receive the electronic component 468 from the component-supplying device 454 while the component-holding head 532 is placed in its angular zero position, which is the component-receiving angular position. The component-holding head 532 is reset to its angular zero position, that is, to its component-receiving angular position, when the component-holding head 532 is located at the angular-head-position resetting position. Since the angular zero position of the component-holding head 532 is detected by the holding-head angular-zero-position detecting device 640, the component-holding head 532 is placed in its predetermined angular zero position, that is, in its predetermined component-receiving angular position when the component-holding head 532 receives the electronic component. If the component-holding head 532 is not correctly reset to its angular zero position, a suitable treatment such as generation of an alarm signal is implemented.

In the present embodiment, the above-indicated engaging members 612, 546 are engageable with each other when these two engaging members are placed in one of two 180°-spaced-apart relative-angular positions. The engaging-member angular-zero-position detecting device 630 is arranged to detect the reflecting member 632 when the engaging member 612 is placed in one of two 180°-spacedapart angular positions for engagement with the engaging member 546 of the component-holding head 532. This one of the two 180°-spaced-apart angular positions is determined as the angular zero position of the engaging member 612. When the component-holding head 532 is located at the angular-component-position changing position or component-hold-position rectifying position, the angular-position detecting device 630 detects the reflecting member of the engaging member 612 of the angular-component-position changing device or component-hold-position rectifying device when this engaging member 612 is engageable with the engaging member 546 of the component-holding head 532.

Figure 19:
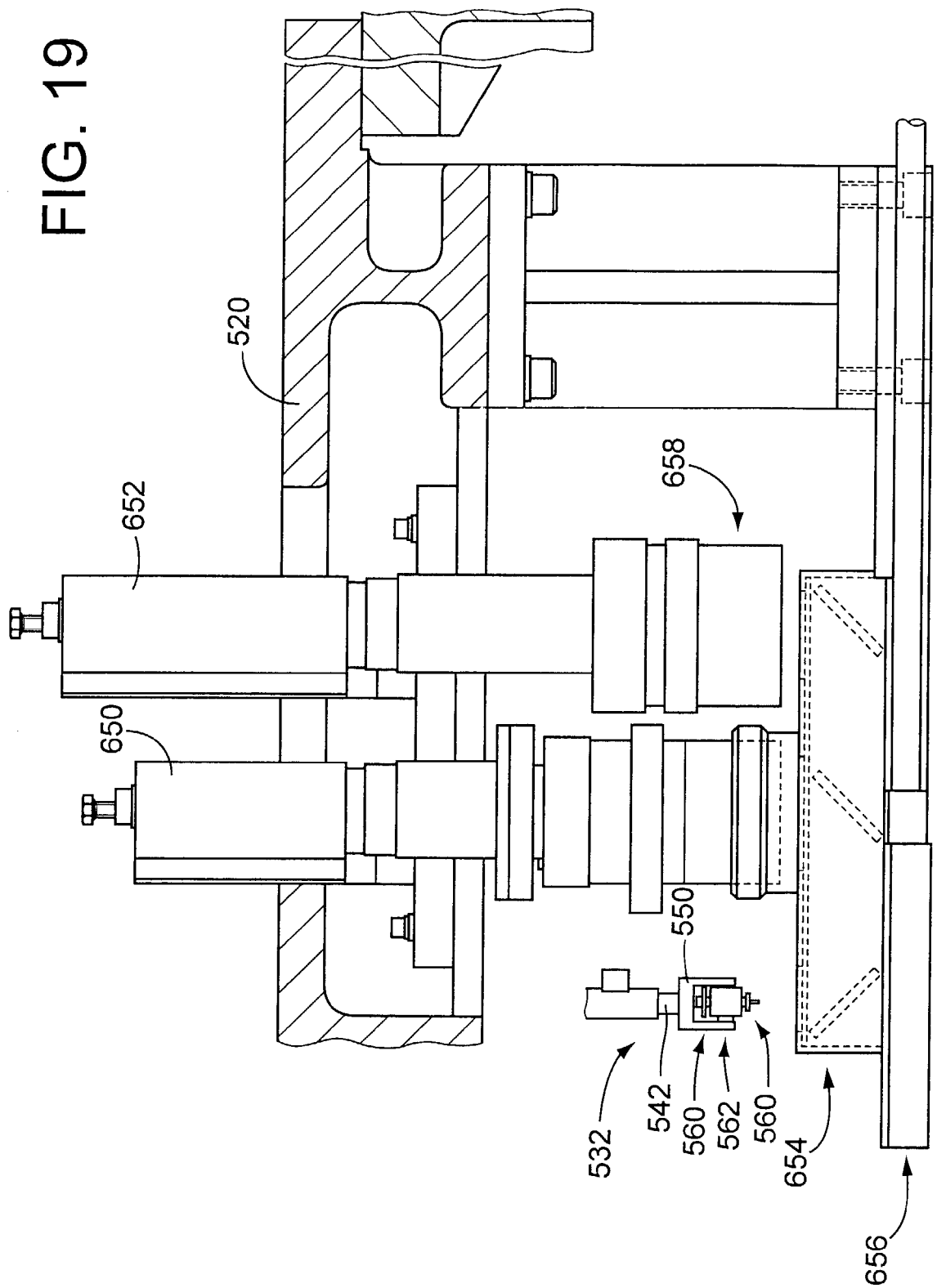
FIG. 19 is a side elevational view (partly in cross section) showing a component-imaging device for taking an image of an electronic component as held by the mounting head.

At the component-hold-position detecting position, there are disposed a plurality of component cameras, in this embodiment, two component cameras 650, 652, a light guiding device 654, and an illuminating device 656, as shown in FIG. 19. The component cameras 650, 652 and the light guiding device 654 constitute an imaging device 658. These component cameras 650, 652, which are similar in construction as those disclosed in JP-A-5-196441, will be only briefly described.

Like the fiducial-mark camera 510 described above, each of the component cameras 650, 652 is a CCD camera which is an imaging device capable of taking a two-dimensional image. Each component camera 650, 652 has an imaging area having a center on its axis and perpendicular to its axis. The two component cameras 650, 652 have respective different times of magnification. Namely, one of the component cameras 650, 652 has a smaller time of magnification and a wider field of view while the other component camera has a larger time of magnification and a narrower field of view. These component cameras 650, 652 are selectively used depending upon the size of the electronic component 468.

The component cameras 650, 652 are both located radially outwardly of the indexing body 530. The component cameras 650, 652 are disposed on the frame 520, so as to face downwards, such that the component cameras 650, 652 lie on a straight line which extends in the radial direction of the indexing body 530, that is, passes the axis of rotation of the indexing body 530 and the axis of rotation of the component-holding head 532 located at the angular-component-position detecting position, and such that the centerlines of the component cameras 650, 652 extend in parallel with each other, in the vertical axis of rotation of the indexing body 530, so that the imaging area of each component camera 650, 652 extends in the horizontal direction.

The light guiding device 654 is disposed below the component-holding head 532 stopped at the angular-component-position detecting position and also below the component cameras 650, 652. The light guiding device 654 is arranged such that a light defining an image of the electronic component 468 as held by the suction nozzle 560 is reflected by reflecting mirrors, so as to be incident upon the component cameras 650, 652. Thus, the component cameras 650, 652 are arranged to take images of the electronic component 468, etc. in the upward direction.

In the present embodiment, the illuminating device 656 indicated above is arranged to irradiate the suction nozzle 560 with a selected one of a visible radiation and a ultraviolet radiation, to take a projection or silhouette image or a front image of the object. When the visible radiation is emitted toward the suction nozzle 560, the visible radiation is reflected by the electronic component 468 held by the suction nozzle 560, so that the front image of the electronic component 468 is formed. When the ultraviolet radiation is emitted, the ultraviolet radiation is absorbed by a light emitting body which is disposed on the suction nozzle 560 and which has a light emitting surface consisting of a coating of a fluorescent material. Namely, the ultraviolet radiation is converted by the light emitting surface into a visible radiation, which irradiates the electronic component 468, so that the projection or silhouette image of the electronic component 468 is formed. The illuminating device 656 cooperates with the component cameras 650, 652 and the light guiding device 654 to constitute a component imaging system.

Figure 20:
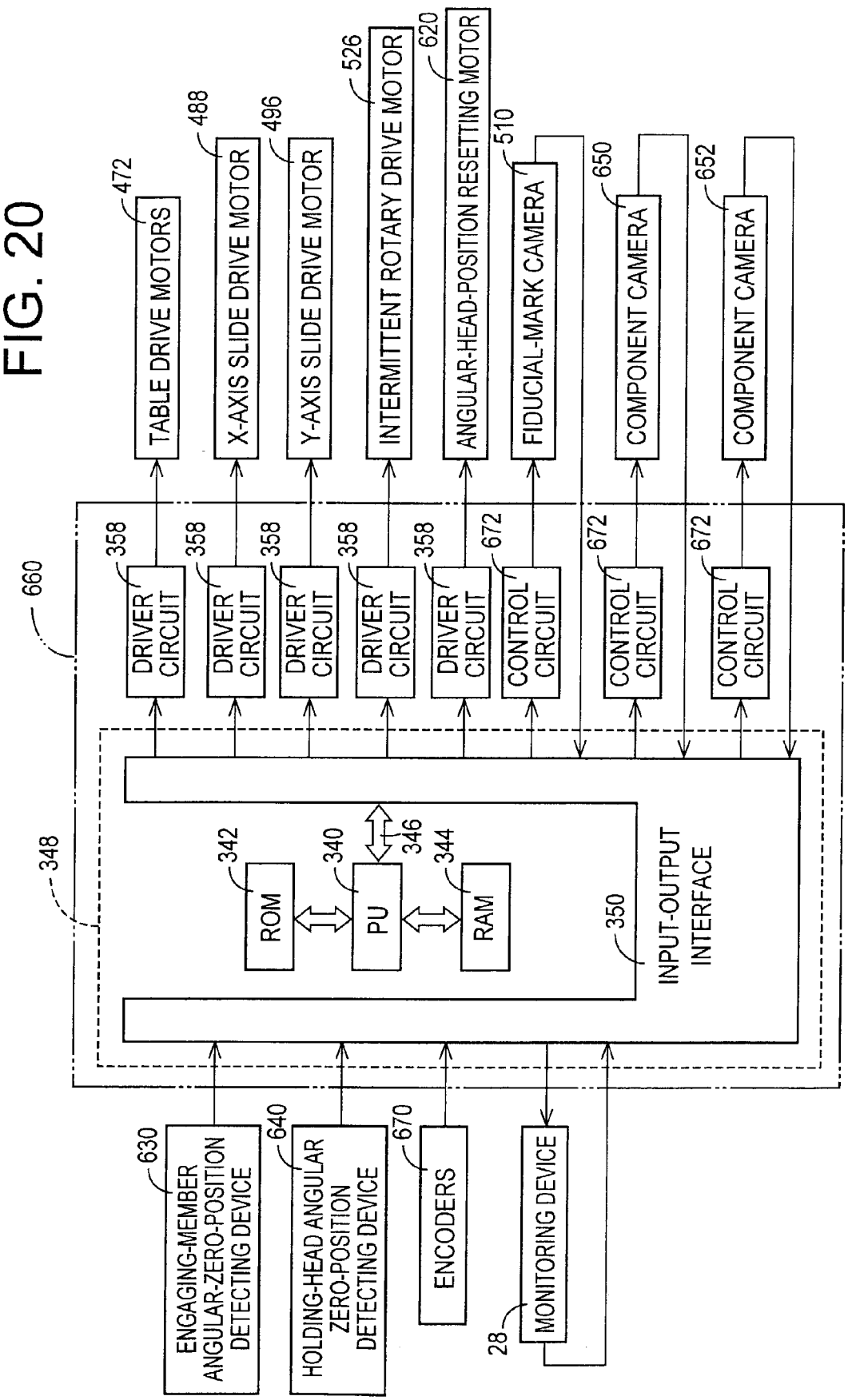
FIG. 20 is a block diagram showing a control device of the above-indicated first electronic-component mounting machine.

The first electronic-component mounting machine 18 is controlled by a control device 660 illustrated in FIG. 20. This control device 660, which is similar in construction to the control device 182 shown in FIG. 10, is principally constituted by the computer 348 incorporating the PU 340, the ROM 342, the RAM 344 and the bus 346 interconnecting these elements. To the bus 346, there is connected the input-output interface 350 to which there are connected the engaging-member angular-zero-position detecting device 630, holding-head angular-zero-position detecting device 640 and various sensors such as encoders 670.

To the input-output interface 350, there are also connected through the respective driver circuits 358 various actuators such as the table drive motors 472. The drive motors such as the table drive motors 472, which are provided as drive sources, are electric motors, more specifically, rotary electric motors in the form of servomotors whose operating angles are controllable with high accuracy. However, stepping motors may be used in place of the servomotors. The operating angles of the motors such as the table drive motors 472 are detected by the encoders 670, and those motors are controlled on the basis of the outputs of the encoders 670. In FIG. 20, only the encoders 670 for the table drive motors 472 are shown by way of example.

To the input-output interface 350, there are also connected through respective control circuits 672 the fiducial-mark camera 510 and component cameras 650, 652. The driver circuits 358, control circuits 672 and computer 348 constitute the control device 660. The RAM 344 stores various programs and data, such as a program for mounting the electronic components 468 on the printed-wiring board 12.

To the input-output interface 350, there is further connected the monitoring device 28, to provide the monitoring device 28 with information relating to the operating states of the various devices of the first electronic-component mounting machine 18, such as data received from the various sensors and control data for the drive devices, and to receive from the monitoring device 28 compensating signals for compensating the control data on the basis of the operating states of the devices as estimated by the monitoring device 28.

Fundamental operations of the first electronic-component mounting machine 18 constructed as described above, to mount the electronic components 468 on the printed-wiring board 12, are well known as disclosed in JP-B2-8-21791, and will be described only briefly.

When the electronic component 468 is mounted on the printed-wiring board 12, the suction nozzle 560 placed in the operating position on the component-holding head 532 located at the component-receiving position is vertically moved by the head elevating and lowering device 580, so as to hold the electronic component 468 by suction. Thus, the suction nozzle 560 receives the electronic component 468 from the component-supplying device 454, and the component-holding head 532 is rotated by the angular-component-position changing device at the angular-component-position changing position, to change the angular position of the electronic component, as needed. In the angular-component-position changing device, the engaging member 612 is lowered by the switching device 616, for engagement with the engaging member 546, and is rotated by the rotating device 616 to rotate the component-holding head 532 so that the suction nozzle 560 placed in the operating position is rotated to rotate the electronic component 468. Then, the component-holding head 532 is moved to the component-hold-position detecting position in which the image of the electronic component 468 is taken by the component camera 650, 652.

The image of the electronic component 468 thus taken is compared with a reference image to calculate horizontal hold-position errors ΔXEn and ΔYEn of the electronic component 468 (errors of positioning of the electronic component with respect to the axis of rotation of the head in the horizontal plane), and an angular hold-position error ΔθEn of the electronic component. After these hold-position errors have been calculated, the component-holding head 532 is rotated by the component-hold-position rectifying device at the component-hold-position rectifying position, to rotate the electronic component 468, for eliminating the angular hold-position error ΔθEn. The engaging member 612 of the component-hold-position rectifying device is brought into engagement with the engaging member 546 of the component-holding head 532, to rotate the component-holding head 532.

The printed-wiring board 12 is moved by the XY table 484 so that the selected component-mounting spot on the board 12 is moved to a position corresponding to the component-mounting position of the component-mounting device 456. At this time, distances of movement of the printed-wiring-board holding device 458 in the X-axis and Y-axis directions are adjusted so as to eliminate the horizontal hold-position errors ΔXEn and ΔYEn of the electronic component 468, so that the electronic component 468 can be mounted at the nominal component-mounting spot on the printed-wiring board 12. Further, the distances of movement of the printed-wiring-board holding device 458 are also adjusted so as to eliminate also horizontal positioning errors ΔXP and ΔYP of the component-mounting spot on the printed-wiring board 12, and center position errors of the electronic component 468 due to its rotation to eliminate the angular positioning error ΔθEn. That is, when the printed-wiring board 12 is initially held by the printed-wiring-board holding device 458, the fiducial-marks 508 provided on the printed-wiring board 12 are imaged by the fiducial-mark camera 510 prior to initiation of the operations of mounting the electronic components 468 on that printed-wiring board 12. On the basis of the image data, the hold-position errors of the printed-wiring board 12 are detected, and the horizontal positioning errors ΔXP and ΔYP of each of the plurality of component-mounting spots on the board 12 are calculated on the basis of the hold-position errors of the board 12.

The suction nozzle 560 at the component-mounting position is vertically moved by the head elevating and lowering device 582, so that the electronic component 468 is mounted on the printed-wiring board 12. After the mounting of the electronic component 468, the component-holding head 532 is rotated at the angular-head-position resetting position, to its original angular position before its rotation to eliminate the angular positioning error ΔθEn and to change the angular position of the electronic component. Namely, the holding head 532 is rotated to its component-receiving angular position. Thus, the operation to mount one electronic component is completed.

In the present first electronic-component mounting machine 18, the sixteen component-holding heads 532 are provided with the respective identification codes, and the six nozzle holders are provided with the respective identification codes, as described above. Further, the plurality of feeders 466 are provided with respective identification codes, the kinds of the electronic components 468 accommodated in the respective feeders 466 are stored in relation to the feeders 466. In the present first electronic-component mounting machine 18, the control device 660 stores: information indicative of the feeders 466 from which the respective electronic components 468 mounted on the printed-wiring board 12 were supplied; information indicative of the suction nozzles 560 of the appropriate component-holding head 532 by which the respective electronic components 468 were held and mounted; and the horizontal hold-position errors ΔXEn and ΔYEn and the angular hold-position errors ΔθP of the respective electronic components. These kinds of information are sequentially transmitted to and stored in the monitoring device 28, and used to estimate the operating states of the various devices of the first electronic-component mounting machine 18.

Then, the first mounted-component inspecting machine 20 will be explained. The first mounted-component inspecting machine 20 is disposed downstream of the first electronic-component mounting machine 18, and is operated to inspect the electronic components 468 as mounted on the printed-wiring board 12 by the first electronic-component mounting machine 18 when this board 12 is loaded onto the first mounted-component inspecting machine 20. This first mounted-component inspecting machine 20 has a stopper member (not shown) for holding the printed-wiring board 12 in its inspecting position, and is provided with a two-dimensional imaging device operable to take images of the electronic components 468 as mounted on the surface of the printed-wiring board 12, and a moving device arranged to hold the two-dimensional imaging device such that this imaging device is movable in the horizontal direction.

The first and second mounted-component inspecting machines 20, 24 are similar in construction to each other, and most of the elements of these inspecting machines 20, 24 are similar in construction and operation to those of the second electronic-component mounting machine 22. The first and second mounted-component inspecting machines 20, 24 will be briefly described after the description of the second electronic-component mounting machine 22, with the same reference signs being used to identify the similar elements in the inspecting machines 20, 24 and the second electronic-component mounting machine 22.

The second electronic-component mounting machine 22 will be described.

Although the component-holding heads 532 provided in the first electronic-component mounting machine 18 are held by the indexing body 530 such that the component-holding heads 532 can be turned about the vertical axis of rotation of the indexing body 530, a component-holding head used in the second electronic-component mounting machine 22 to hold the electronic component 468 by suction is movable by an XY positioning device in a horizontal plane parallel to the surface of the printed-wiring board 12, in mutually perpendicular X-axis and Y-axis directions. This second electronic-component mounting machine 22 will be described by referring to FIG. 23 through FIG. 27. The second electronic-component mounting machine 22 is used primarily to mount the electronic components 468 of relatively large sizes and different configurations on the printed-wiring board 12. This type of electronic-component mounting device is known as disclosed in Japanese Patent No. 2824378, and the second electronic-component mounting machine 22 will be briefly described.

Figure 23:
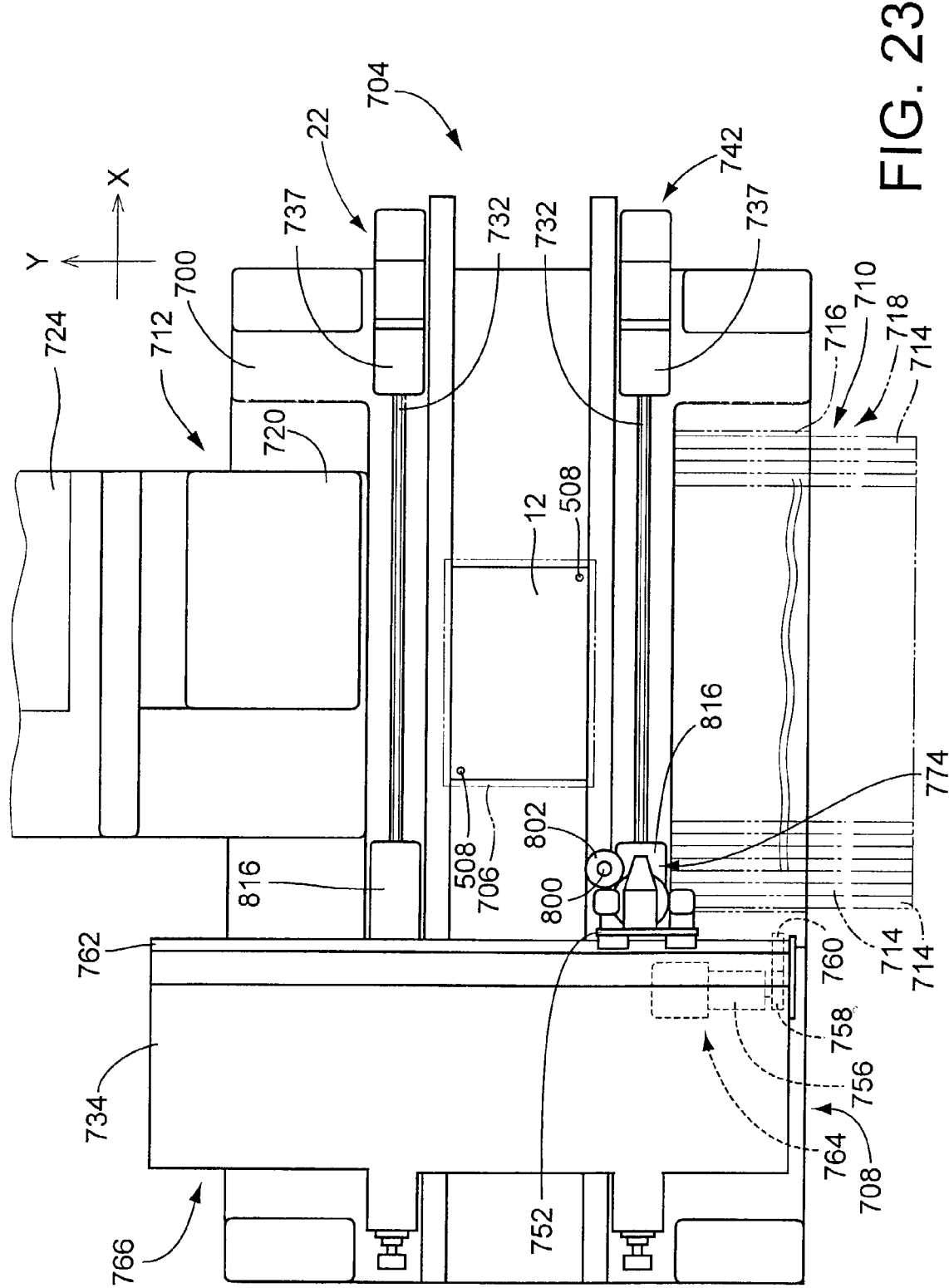
FIG. 23 is a view showing the second electronic-component mounting machine in the above-indicated system.

In FIG. 23, reference sign 700 denotes a machine base serving as a main body of the system of the electronic-component mounting machine 22. On the machine base 700, there are disposed a printed-wiring-board conveyor 704 arranged to transfer a circuit substrate in the form of the printed-wiring board 12 in the X-axis direction (in the right and left direction as seen in FIG. 23), a substrate holding device in the form of a printed-wiring board holding device 706 arranged to hold the printed-wiring board 12, a component-mounting device 708 arranged to mount the electronic components 468 (shown in FIG. 26), and component-supplying devices 710, 712 arranged to supply the component-mounting device 708 with the electronic components 468.

In the present embodiment, the printed-wiring board 12 is transferred by the printed-wiring-board conveyor 704 such that the board 12 maintains a horizontal attitude. The printed-wiring board 12 is stopped by a stopper device (not shown) at a predetermined working position, and held by the printed-wiring-board holding device 706 disposed at a portion of the machine base 700 corresponding to the predetermined working position. In the present embodiment, the printed-wiring board 12 is held such that its component-mounting surface on which the electronic components 468 are to be mounted extends in the horizontal direction.

Figure 24:
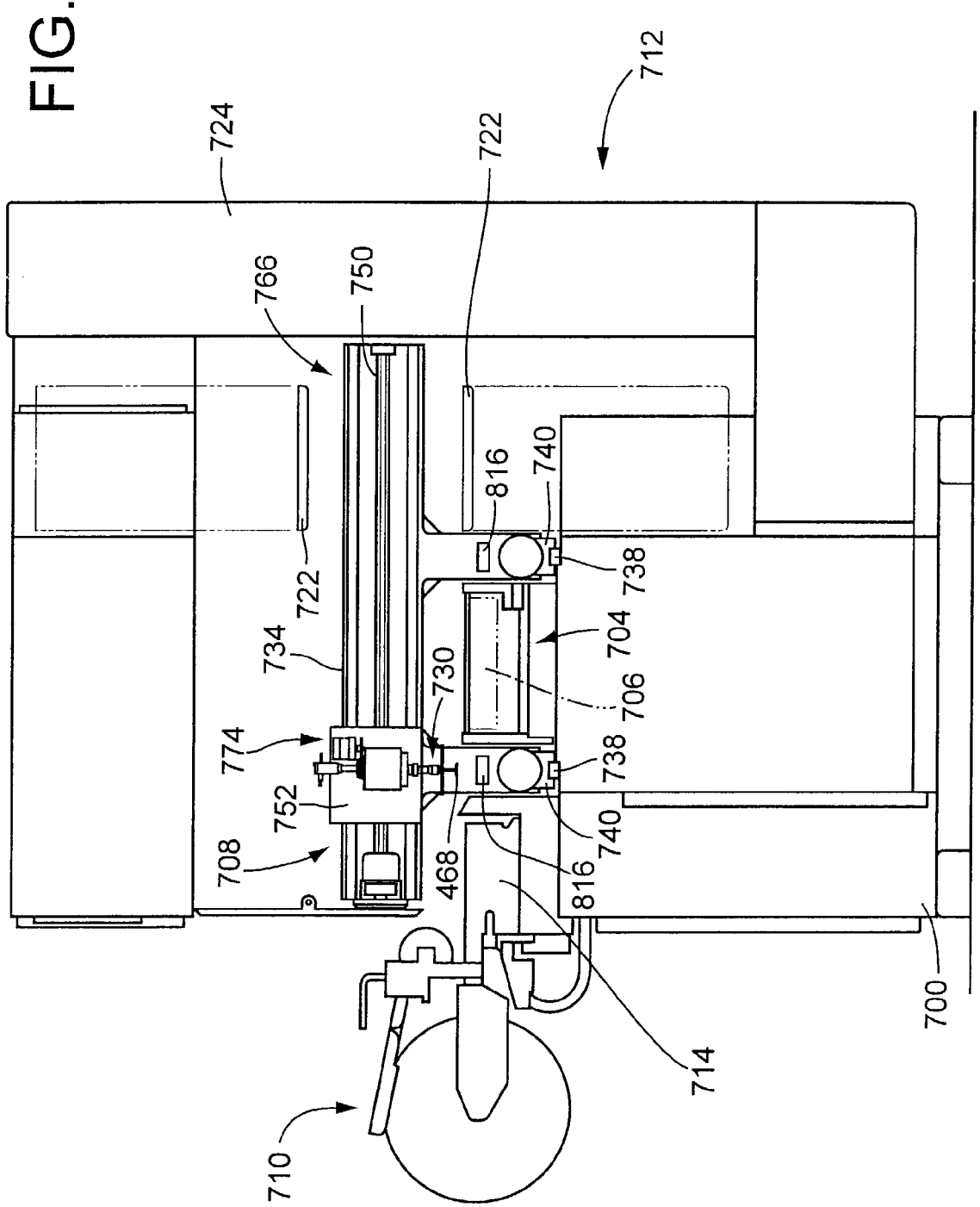
FIG. 24 is a side elevational view showing the above-indicated second electronic-component mounting machine.

As shown in FIGS. 23 and 24, the component-supplying devices 710, 712 are fixedly disposed on respective opposite sides of the printed-wiring-board conveyor 704 such that the component-supplying devices 710, 712 are spaced from each other in the Y-axis direction perpendicular to the X-axis direction in the XY coordinate system. In the illustrated example, the component-supplying device 710 is of feeder type while the component-supplying device 712 is of tray type.

The component-supplying device 710 of feeder type has a component supply table 718 including a feeder carriage 716 on which a multiplicity of feeders 714 are mounted such that component-supply portions of the feeders 714 are arranged along a line, in this example, along the X-axis direction. Like the feeders 466 described above, each of the feeders 714 is arranged to feed a carrier tape accommodating the electronic components 468, so that the electronic components 468 are supplied from the carrier tape.

The component-supplying device 712 of tray type has component trays 720 (shown in FIG. 26) which accommodate the electronic components 468 and which are supported by respective multiple component-tray accommodating boxes 722 that are stacked in the vertical direction. The component-tray accommodating boxes 722 are supported by respective support members and are successively elevated to a predetermined component-supply position, by an elevating and lowering device disposed within a column 724. For a component-holding head 730 (described below) to receive the electronic component 468 from the component tray 720 supported by the uppermost component-tray accommodating box 722 at the component-supply position, there should exist a suitable space above the component-supply position. To this end, the component tray 720 from which all of the electronic components 468 have been supplied must be further elevated through the above-indicated space to a predetermined retracted position when the next component-tray accommodating box 722 is elevated to the component-supply position. Thus, the component-holding head 730 receives the electronic components 468 one at a time from the component tray 720 in the uppermost component-tray accommodating body 722 above which the above-indicated space is provided. The component-supplying device 712 of tray type is similar to a component-supplying device as disclosed in JP-B2-2-57719, and will not be further described.

Figure 25:
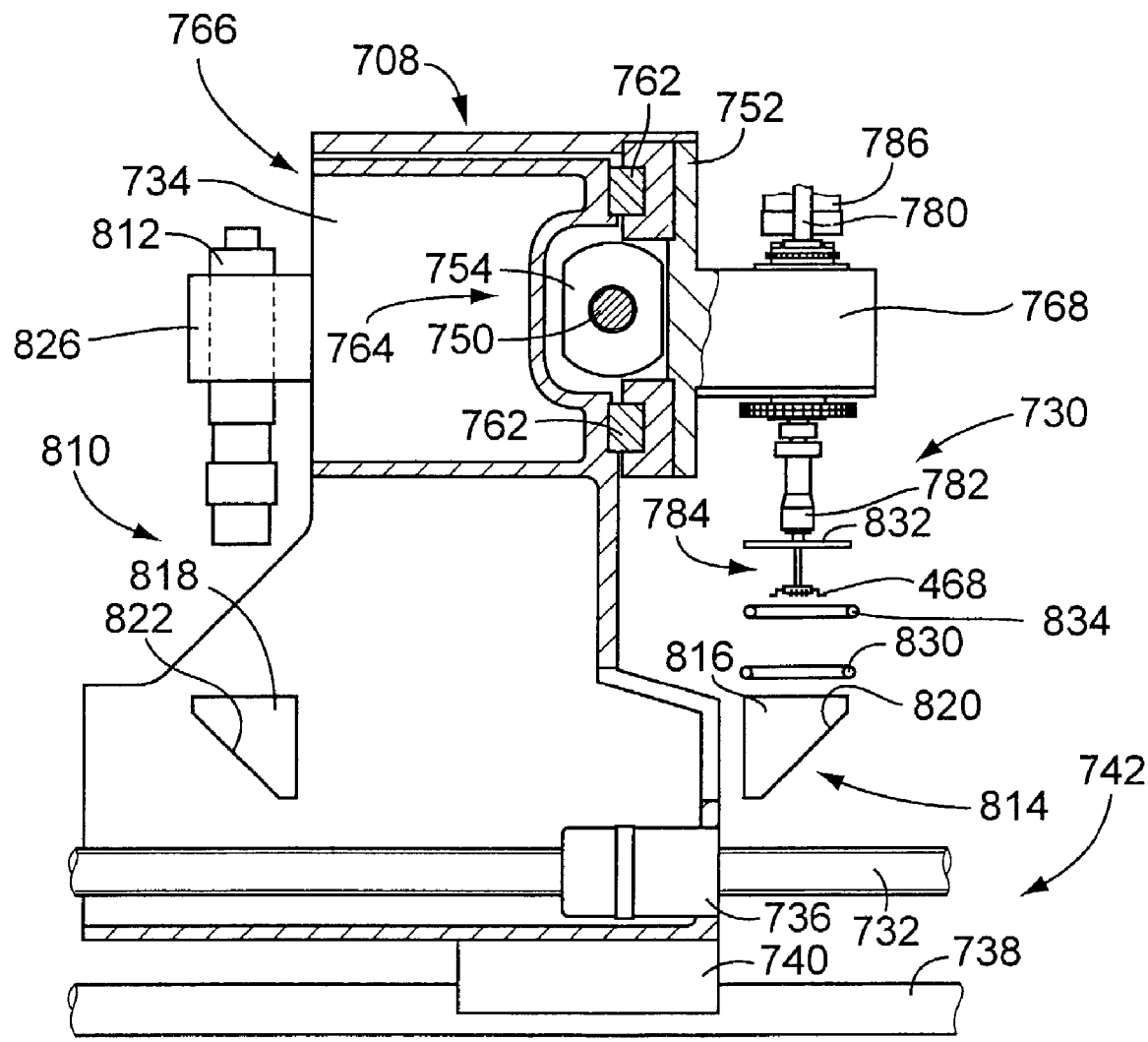
FIG. 25 is a side elevational view (partly in cross section) showing a relevant portion of the above-indicated second electronic-component mounting machine.
Figure 26:
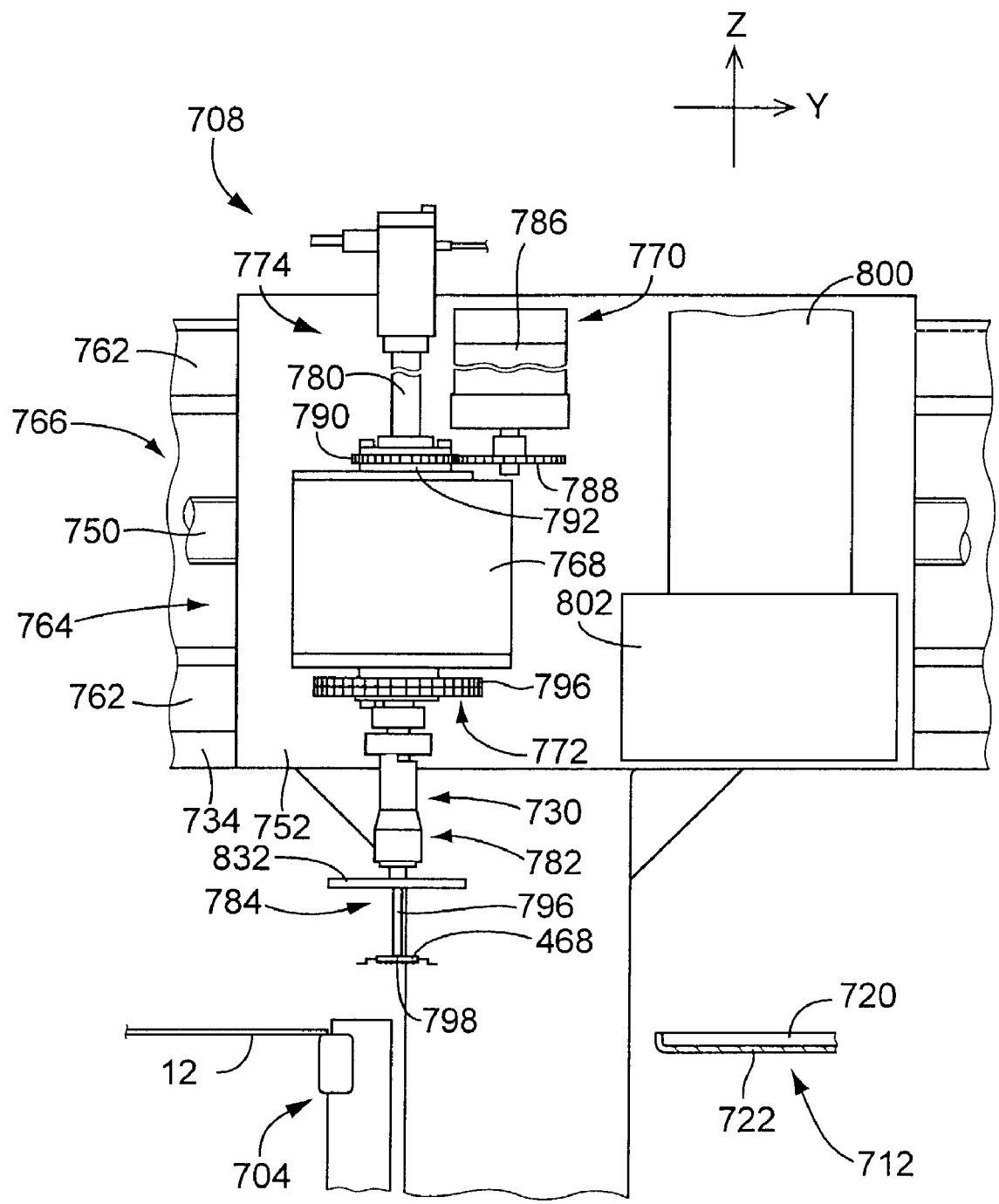
FIG. 26 is a front elevational view showing the above-indicated second electronic-component mounting machine.

In the component-mounting device 708, the component-holding head 730 shown in FIG. 26 is moved along a straight line having components in the mutually perpendicular X-axis and Y-axis directions, to transfer the electronic component 468 onto the upper component-mounting surface of the printed-wiring board 12. To this end, two ballscrews 732 are disposed on the machine base 700, on respective sides of the printed-wiring-board conveyor 704 which are opposite to each other in the Y-axis direction, as shown in FIG. 23. The ballscrews 732 extend in the X-axis direction, and are held in engagement with respective two nuts 736 (only one of which is shown in FIG. 25) disposed on an X-axis slide 734. With these ballscrews 732 being rotated by an X-axis slide drive motor 737, the X-axis slide 734 is moved to a desired position in the X-axis direction.

As shown in FIG. 23, the X-axis slide 734 has a length sufficient to bridge the component-supplying device 710 of feeder type and the component-supplying device 712 of tray type, while extending across the printed-wiring-board conveyor 704. The machine base 700 is provided with guiding members in the form of guide rails 738 (shown in FIG. 25) formed below the respective two ballscrews 732, while the X-axis slide 734 is provided with guided members in the form of guide blocks 740, and is slidably moved on and guided by the guide rails 738 via the guide blocks 740. It will be understood that the nuts 736, ballscrews 732, X-axis slide drive motor 737, etc. constitute an X-axis slide positioning device 742.

On the X-axis slide 734, there is disposed a ballscrew 750 (shown in FIG. 25) extending in the Y-axis direction. A Y-axis slide 752 has a nut 754 held in engagement with the ballscrew 750. With the ballscrew 750 being rotated by a Y-axis slide drive motor 756 (shown in FIG. 23) through gears 758, 760, the Y-axis slide 752 is moved to a desired position in the Y-axis direction while being guided by guiding members in the form of a pair of guide rails 762. It will be understood that the nut 754, ballscrew 750, Y-axis slide drive motor 756, etc. constitute a Y-axis slide positioning device 764, which cooperates with the X-axis slide 734, X-axis slide positioning device 742 and Y-axis slide 752 to constitute an XY positioning device 766 operable to move the component-holding head 730 to a desired position in the horizontal plane.

The Y-axis slide 752 is provided with a support portion 768 which carries the component-holding head 730, an axially head moving device in the form of a head elevating and lowering device 770 for elevating and lowering the component-holding head 730, and a head rotating device 772 for rotating the component-holding head about its axis. The component-holding head 730, head elevating and lowering device 770, head rotating device 772, etc. constitute a component-mounting unit 774. While the present embodiment has only one component-mounting unit 774, two or more component-mounting units 774 may be provided. For instance, a plurality of component-mounting units 774 may be disposed on the Y-axis slide 752 such that the component-mounting units 774 are arranged in the Y-axis direction.

The component-mounting unit 774 in the present embodiment is similar to a component-mounting unit as disclosed in Japanese Patent No. 3093339, and will be described only briefly.

The support portion 768 carries a shaft 780 such that the shaft 780 is movable in the Z-axis direction and rotatable about its axis. The shaft 780 is provided at its lower end portion with a holder 782 to which a suction nozzle 784 is removably attached. In the present embodiment, the shaft 780 and the holder 782 constitute the component holding head 730.

The head elevating and lowering device 770 includes a drive source in the form of an elevating and lowering motor 786 a rotary motion of which is transmitted to a nut 792 through a rotation transmitting device including gears 788, 790. With the nut 792 being rotated by the elevating and lowering motor 786, the shaft 780 engaging the nut 792 is vertically moved to elevate and lower the component-holding head 730. The head elevating and lowering device 770 serves as a relative-movement device. The head rotating device 772 includes a drive source in the form of a rotary drive motor 794 (shown in FIG. 27) a rotary motion of which is transmitted to the shaft 780 through a rotation transmitting device including a gear 796. With the shaft 780 being rotated, the component-holding head 730 is rotated about its vertical axis of rotation.

The suction nozzle 784 is arranged to hold the electronic component 468 by suction under a negative pressure, and mount the electronic component 468 onto the printed-wiring board 12. To this end, the suction nozzle 784 is connected to a negative pressure source and a positive pressure source (not shown) and the atmosphere through a solenoid-operated directional control valve device (not shown), which is switched for selective communication of a suction tube 796 with the negative or positive pressure source or the atmosphere. The suction tube 796 has a sucking end face 798 which faces downwards and on which the electronic components 468 is held by suction.

On the Y-axis slide 752, there is also fixedly mounted a fiducial-mark camera 800 (shown in FIGS. 23 and 26) arranged to take images of a plurality of fiducial marks provided on the printed-wiring board 12. In the present embodiment, the fiducial-mark camera 800 is constituted by a CCD camera capable of taking a two-dimensional image of an object. An illuminating device 802 is provided corresponding to the fiducial-mark camera 800, to illuminate the fiducial marks and their vicinity.

On the X-axis slide 734, there are fixedly disposed two imaging devices 810 at respective two positions corresponding to the two ballscrews 732 provided to move the X-axis slide 734. Namely, one of the imaging devices 810 is disposed between the component-supplying device 710 of feeder type and the printed-wiring board 12, while the other imaging device 810 is disposed between the component-supplying device 712 of tray type and the printed-wiring board 12. One of these two imaging devices 810 which are identical in construction with each other will be described byway of example.

As shown in FIG. 25, the imaging device 810 is provided with a component camera 812 operable to take an image of the electronic component 468, and a light guiding device 814 which includes a reflecting device in the form of reflecting mirrors 816, 818. The reflecting mirrors 816, 818 are fixed on a lower portion of the X-axis slide 734 through respective brackets (not shown). The reflecting mirror 816 has a reflecting surface 820 which is located right below a path of movement of the component-holding head 730 and which is inclined about 45° with respect to a vertical plane including the centerline of the suction nozzle 784, such that one of opposite ends of the inclined reflecting surface 820 which is nearer to the X-axis slide 734 is located below the other end.

The other reflecting mirror 818 has a reflecting surface 822 which is disposed on the other side of the X-axis slide 734 and which is inclined with respect to the vertical plane, symmetrically with the reflecting surface 820 of the reflecting mirror 816. The reflecting surface 822 is inclined such that one of its opposite ends which is nearer to the X-axis slide 734 is located below the other end. The component camera 812 for taking the image of the electronic component 468 as held by the suction nozzle 784 is fixed on a side surface of the X-axis slide 734 opposite to a side surface thereof on which the component-holding head 730 is provided. The component camera 812 is fixed on the X-axis slide 734 such that the component camera 812 faces downwards and is opposed to the reflecting surface 822 of the above-indicated reflecting mirror 818.

Accordingly, when the component-holding head 730 is moved by the XY positioning device 766 to a position which is aligned with the ballscrew 732 in the Y-axis direction and which is right above the reflecting mirror 816, a light defining the image of the electronic component 468 is reflected by the reflecting mirrors 816, 818 and is incident upon the component camera 812 such that the image is reversed by the reflecting mirrors 816, 818. As a result the image of the electronic component 468 can be taken by the component camera 812. Thus, the imaging device 810 is positioned so as to permit the electronic component 468 to be imaged when the electronic component 468 is moved with a movement of the Y-axis slide 752 relative to the X-axis slide 734. Like the fiducial-mark camera 800 provided in the present embodiment, the component camera 812 is a CCD camera capable of taking a two-dimensional image of an object. It is noted that the reflecting mirror 818 may be eliminated. In this case, the component camera 812 is oriented so as to face towards the reflecting mirror 816 in the horizontal direction.

In the vicinity of the reflecting mirror 816, there is provided a ultraviolet irradiating device in the form of a strobe light 830, which is arranged to emit a ultraviolet radiation towards a light emitting plate 832 of the suction nozzle 784. The light emitting plate 832 absorbs the ultraviolet radiation and emits a visible radiation, so that the component camera 812 takes a projection or silhouette image of the electronic component 468 in the upward direction. In the present embodiment, the light emitting plate 832 and the strobe light 830 constitute an illuminating device 833.

Another strobe light 834 is located nearer to the suction nozzle 784 than the strobe light 830. The strobe light 834 is arranged to emit a visible radiation such that the visible radiation is reflected by the bottom surface of the electronic component 468 (mounting surface for contact with the printed-wiring board 12), so that the component camera 812 takes a front image of the electronic component 468 in the upward direction. The imaging device 810 and the illuminating device 833 constitute an imaging system.

Figure 27:
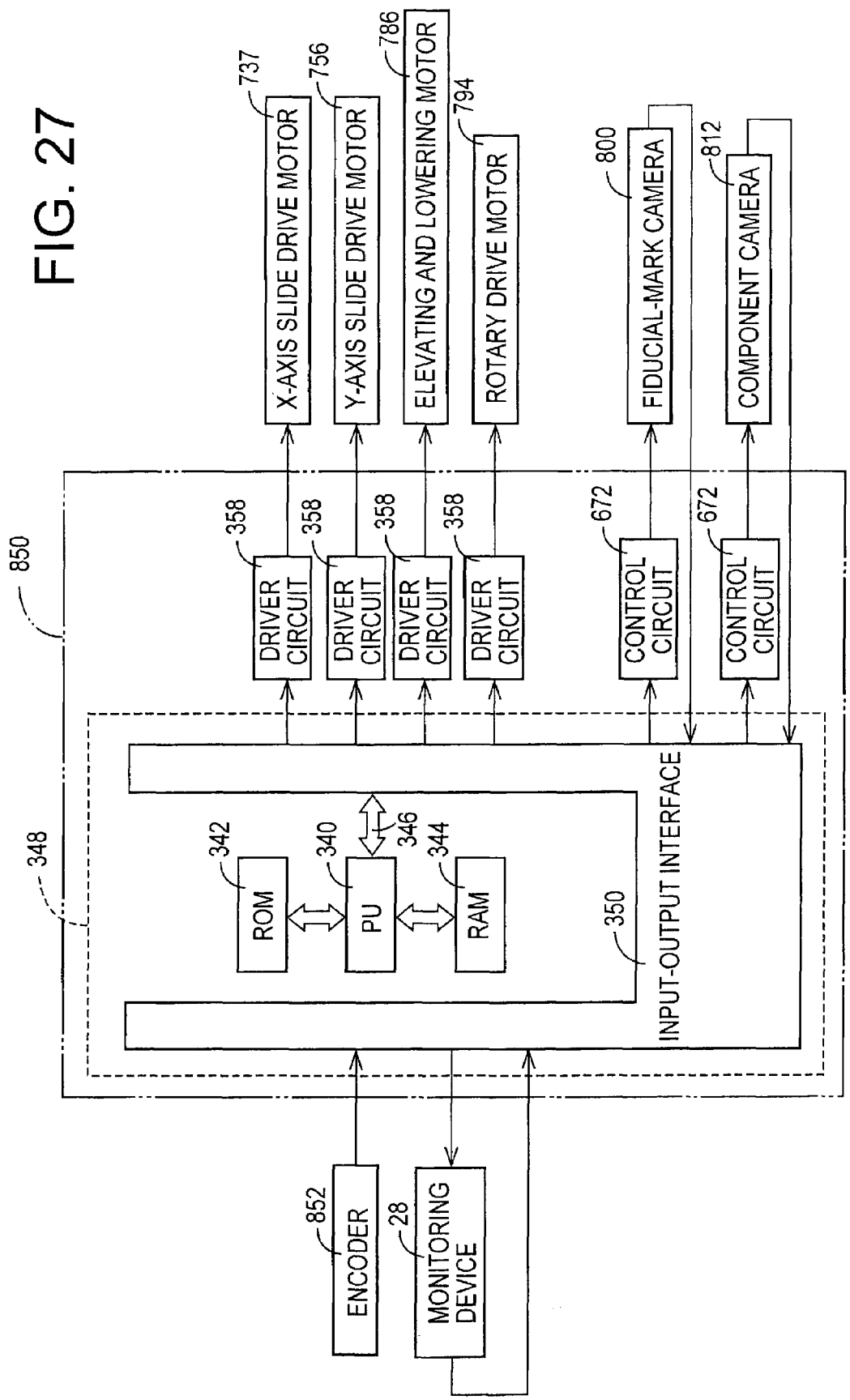
FIG. 27 is a block diagram showing a control device of the above-indicated second electronic-component mounting machine.

The second electronic-component mounting machine 22 is provided with control means in the form of a control device 850 as shown in FIG. 27. Like the control device 182 described above, the control device 850 is principally constituted by the computer 348. The same reference signs as used for the control device 182 will be used for the control device 850, to identify the functionally corresponding elements, which will not be described in detail. In the present embodiment, too, the drive sources such as the X-axis slide drive motor 737 are servomotors, operating angles of which are detected by encoders 852 and fed to the computer 348. In FIG. 27, only the encoder 852 for the rotary drive motor 794 is shown by way of example. The RAM 344 stores various programs such as those for a main routine and an electronic-component mounting program, and various sorts of data necessary for executing those programs.

Then, an operation of the second electronic-component mounting machine 22 will be described. The operation to mount the electronic components 468 on the printed-wiring board 12 is described in Japanese Patent No. 2824378 and JP-A-2001-223500 and will be only briefly described.

When the second electronic-component mounting machine 22 is operated to mount the electronic components 468 on the printed-wiring board 12, the component-mounting unit 774 is moved by movements of the X-axis slide 734 and the Y-axis slide 752 to the component-supply position of the component-supplying device 710 of feeder type or the component-supplying device 712 of tray type. The component-holding head 730 is lowered by the head elevating and lowering device 770, and the suction nozzle 784 holds the electronic component 468 under a negative pressure. At this time, the component-holding head 730 is placed at the predetermined component-receiving angular position. In the present embodiment, the component-receiving angular position is defined by the output of the encoder 852 provided to detect the operating angle of the rotary drive motor 794, and the component-holding head 730 is placed at the thus detected component-receiving angular position each time the component-holding head 730 is operated to hold the electronic component 468 by suction. There will be described an operation in the case where the electronic component 468 received from the feeder 714 of the component-supplying device 710 of feeder type is mounted.

In this case, the component-holding head 730 holding the electronic component 468 is moved from the component-supply position of the feeder 714 or its component-receiving position to the component-mounting position at which the electronic component 468 is mounted on the printed-wiring board 12. At this time, the component-holding head 730 passes over the reflecting mirror 816 fixed at a position of the X-axis slide 734 between the component-receiving position and the component-mounting position. The component-holding head 730 necessarily passes over the reflecting mirror 816 fixed at a portion of the X-axis slide 734 between the component-supply position and the component-mounting position, during the movement of the component-holding head 730 on the X-axis slide 734 in the Y-axis direction from the component-supply position of the component-supplying device 710 of feeder type to the component-mounting position of the printed-wiring board 12, irrespective of these component-supply position and component-mounting position. Accordingly, the electronic component 468 can be imaged by the component camera 812. The position at which the component-holding head 730 is located right above the reflecting mirror 816, for permitting the component camera 812 to image the electronic component will be referred to as the component-hold-position detecting position or component-imaging position.

When the component-holding head 730 has reached the component-hold-position detecting position, the electronic-component 468 is imaged. Although the movement of the component-holding head 730 in the Y-axis direction must be stopped to image the electronic component 468, the imaging can be effected while the component-holding head 730 is moved in the X-axis direction, since the imaging device 810 and the strobe lights 830, 834 are disposed on the X-axis slide 734. The control device 850 compares the thus obtained image data with image data representative of a nominal image of the electronic component 468 without hold-position errors, to thereby calculate horizontal hold-position errors $\Delta XEn$ and $\Delta YEn$ and an angular hold-position error $\Delta\theta En$.

Horizontal positioning errors $\Delta XP$ and $\Delta YP$ of the printed-wiring board 12 have been already calculated on the basis of images of the fiducial marks 508 taken by the fiducial-mark camera 800. To eliminate the horizontal hold-position-errors $\Delta XEn$ and $\Delta YEn$, the horizontal positioning errors $\Delta XP$ and $\Delta YP$, and center position errors of the electronic component 468 caused by rotation of the component-holding head 730 to eliminate the angular positioning error $\Delta\theta En$, distances of movement of the component-holding head 730 to the component-mounting position are adjusted. At the same time, the component-holding head 730 is rotated by the head rotating device 772 to eliminate the angular positioning error $\Delta\theta En$. Accordingly, the electronic component 468 can be mounted at the predetermined component-mounting position on the printed-wiring board 12, in the correct attitude with high positioning accuracy. The positioning errors of the electronic component 468 are calculated during the movement of the component-holding head 730 to a position right above the component-mounting position on the printed-wiring board 12. Then, the component-holding head 730 is lowered to mount the electronic component 468 at the component-mounting position. Thus, one cycle of component-mounting operation is completed.

In the present electronic-component mounting machine 22, too, the image data of the electronic component 468 obtained at the component-hold-position detecting position are transmitted to the monitoring device 28, together with the identification codes used for the component-supplying devices 710, 712. The monitoring device 28 is also provided with the control data for the XY positioning device 766, the horizontal positioning errors $\Delta XEn$, $\Delta YEn$, $\Delta XP$ and $\Delta YP$, and the angular positioning errors $\Delta\theta En$ and $\Delta\theta P$.

Then, the first and second mounted-component inspecting machines 20, 24 will be described. As previously described, the first and second mounted-component inspecting machines 20, 24 are similar in construction to each other, only the first mounted-component inspecting machines 20 will be described by way of example. The first mounted-component inspecting machine 20 is different from the above-described second electronic-component mounting machine 22, in that the first mounted-component inspecting machine 20 is not provided with the component-supplying devices 710, 712 and the component-holding head 730. In the other aspects, however, the first mounted-component inspecting machine 20 is similar to the second electronic-component mounting machine 22. The same reference signs as used for the second electronic-component mounting machine 22 will be used to identify the corresponding elements of the inspecting machine 20, which will not be described.

Figure 21:
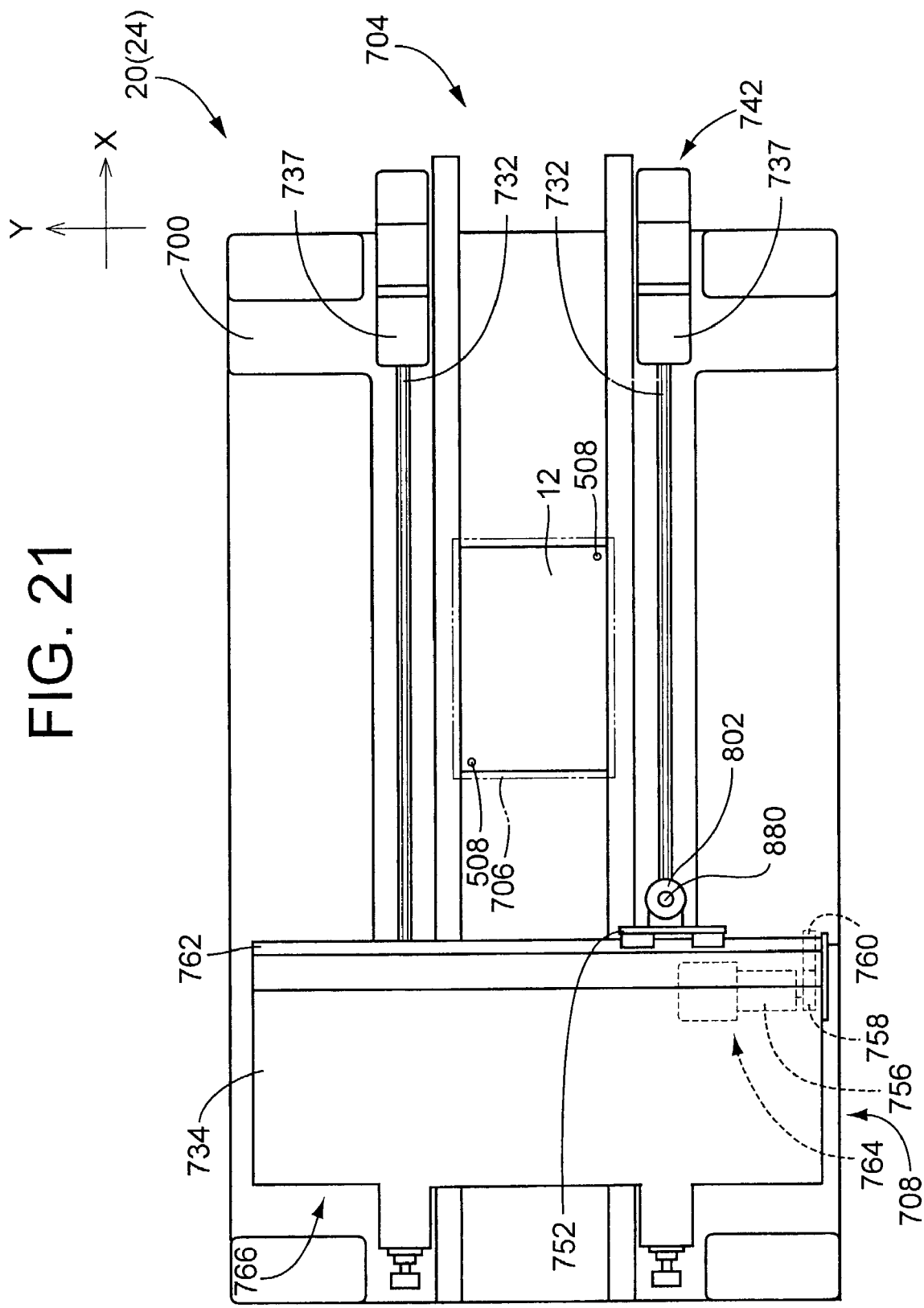
FIG. 21 is a plan view showing a first and a second mounted-component inspecting machine in the above-indicated system.

The XY positioning device 766 is disposed on the machine base 700, and an imaging device in the form of an inspecting camera 880 (shown in FIG. 21) for taking images of the electronic components 468 mounted on the printed-wiring board 12 is fixedly disposed on the Y-axis slide 752 of the XY positioning device 766. In the present embodiment, the inspecting camera 880 is constituted by a CCD camera capable of taking a two-dimensional image of an object. The illuminating device 802 is provided corresponding to the inspecting camera 880, to illuminate the electronic components 468 and their vicinity.

Figure 22:
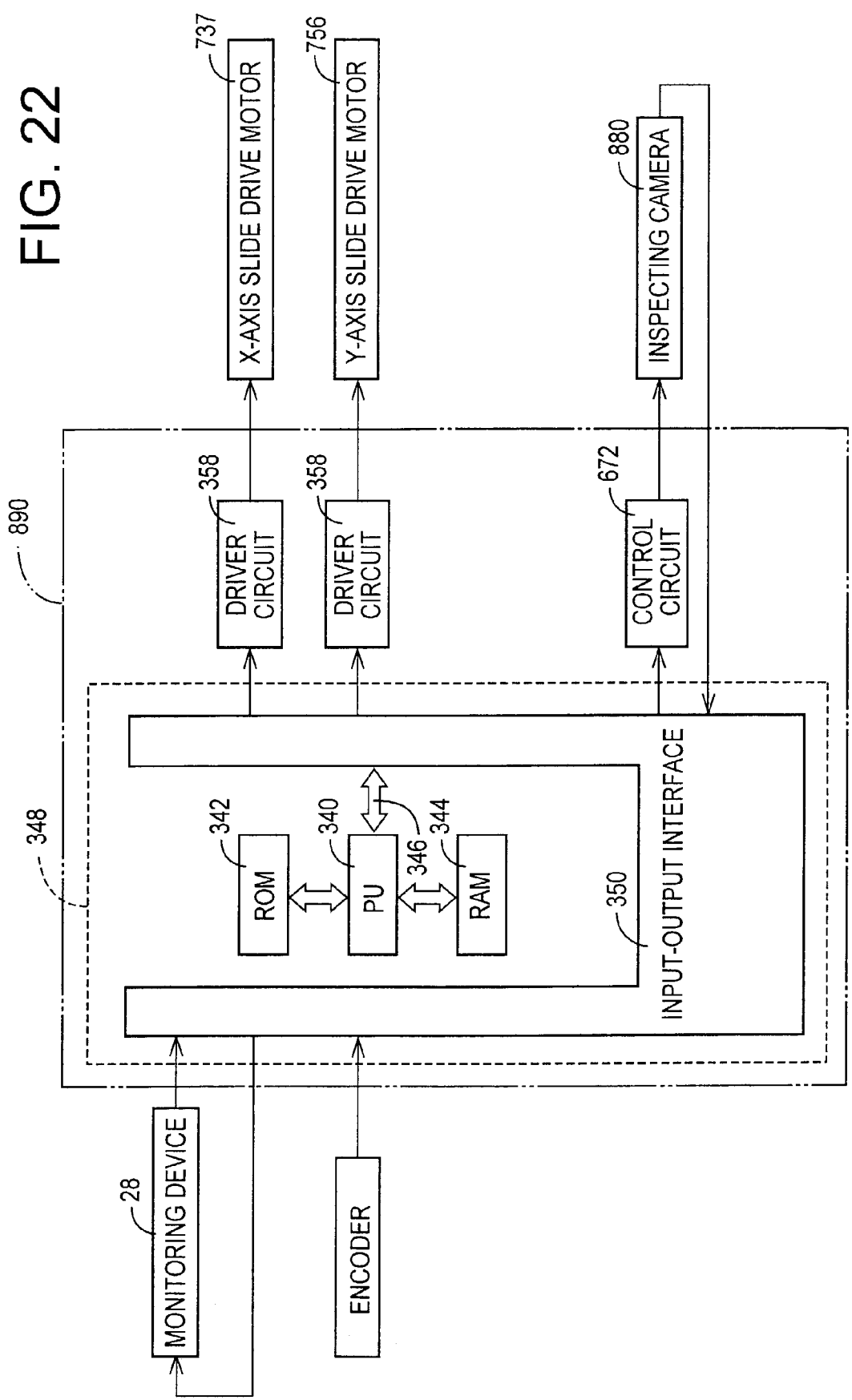
FIG. 22 is a block diagram showing a control device of the above-indicated first and second mounted-component inspecting machines.

The first mounted-component inspecting machine 20 is provided with a control device 890 similar to the control device 182 described above, and the ROM 342 of its computer 348 stores various programs such as a program for executing a main routine and an inspecting program. The control device 890 (shown in FIG. 22) is connected at the input-output interface 350 of the computer 348 to the monitoring device 28, so that information on a result of inspection by the inspecting machine 20 is transmitted to the monitoring device 28. The inspecting operation will be briefly described.

When the printed-wiring board 12 is unloaded from the first electronic-component mounting machine 18, the printed-wiring board 12 is stopped by a stopper device at the imaging position at which the electronic components 468 are imaged. The inspecting camera 880 is moved by the XY positioning device 766, to take the images of the fiducial marks 508 provided on the printed-wiring board 12. In the present mounted-component inspecting machine 20, the inspecting camera 880 also functions as a fiducial-mark imaging device. Horizontal positioning errors $\Delta XP$ and $\Delta YP$ of the printed-wiring board 12 are obtained from the images of the fiducial marks 508, and then the inspecting camera 880 is moved to a position right above the electronic component 468 to be imaged. This electronic component 468 is imaged together with a portion of the printed-wiring board 12 adjacent to the electronic component 468.

An operation to process the image data obtained by imaging the electronic component 468 will not be described in detail. Briefly described, the obtained image of the electronic component 468 is compared with a reference image of the electronic component 468 stored in the ROM 342, to obtain horizontal positioning errors $\Delta Xn$ and $\Delta Yn$ and an angular positioning error $\Delta \theta n$ of the electronic component 468 with respect to the printed-wiring board 12. In the present embodiment, the inspecting camera 880 and the printed-wiring board 12 are positioned relative to each other with high accuracy on the basis of the images of the fiducial marks 508 which are taken when the printed-wiring board 12 is loaded onto the inspecting machine 20. Accordingly, it is possible to detect the positioning errors of the mounted electronic components 468 on the basis of the estimated position of the image of each electronic component 468 formed in the imaging area.

In the present embodiment, all of the electronic components 468 mounted on the printed-wiring board 12 are sequentially imaged to detect the horizontal positioning errors $\Delta Xn$ and $\Delta Yn$ and angular positioning error $\Delta \theta n$ of each electronic component 468. For instance, the electronic components 468 are imaged in the order in which they were mounted. However, the order of imaging of the electronic components 468 may be different from the order of mounting. The imaging of all of the electronic components 468 is not essential, and only the electronic components 468 which are required to be mounted with particularly high positioning accuracy may be imaged. In this case, some of the electronic components 468 whose required positioning accuracy is not so high are desirably inspected for their positioning errors in a suitable order.

Figure 28:
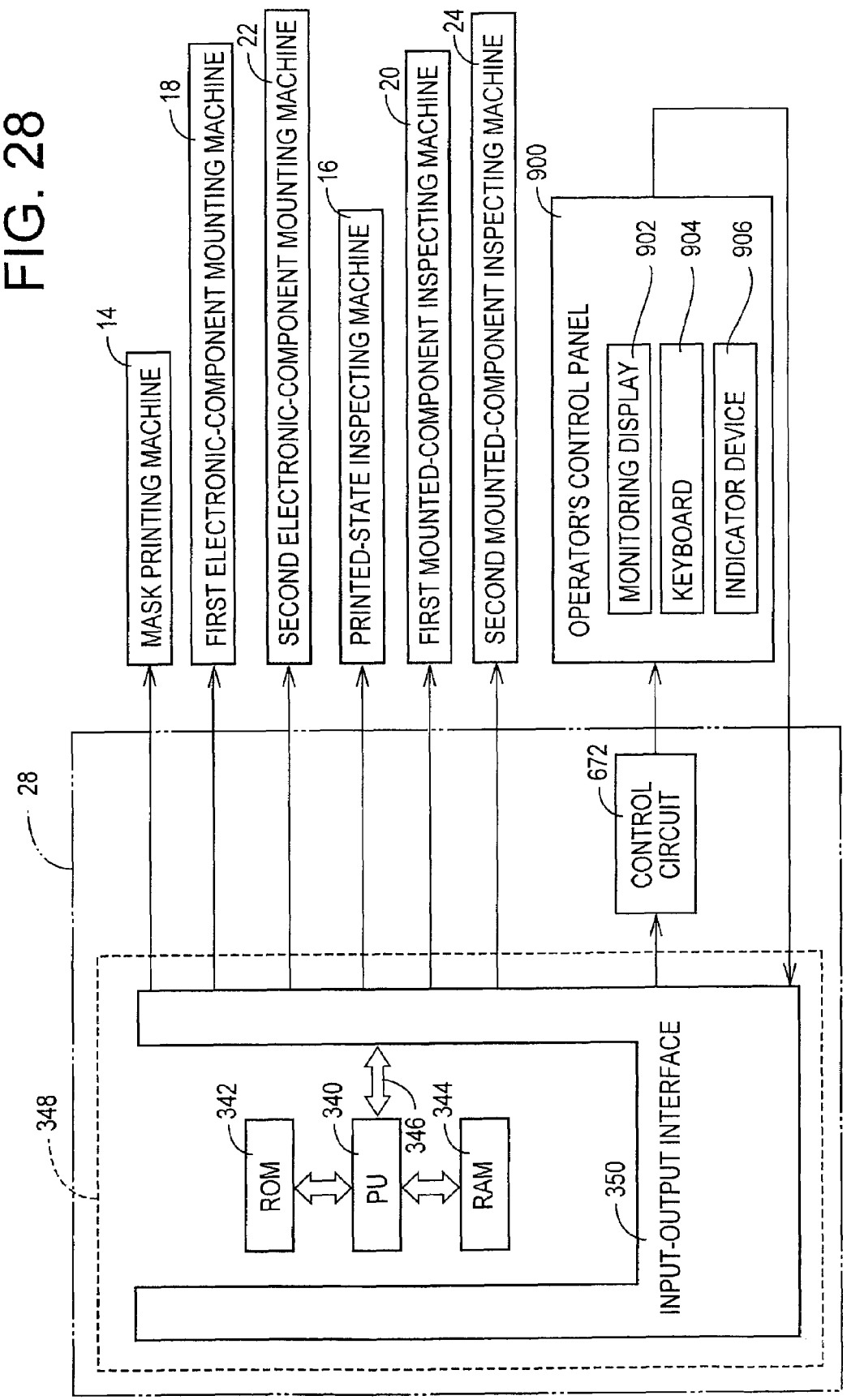
FIG. 28 is a block diagram showing a monitoring device in the above-indicated system.

The monitoring device 28 will be described. Like the control device 182, the monitoring device 28 is principally constituted by the computer 348 incorporating the PU 340, ROM 342, RAM 344 and bus 346 interconnecting those elements, as shown in FIG. 28. The bus 346 is connected to the input-output interface 350, to which there are connected the mask printing machine 14, first and second electronic-component mounting machines 18, 22, printed-state inspecting machine 16, and first and second mounted-component inspecting machines 20, 24. Precisely described, the control devices 182, 660, 850, 400, 890 for those machines are connected to the input-output interface 350. For simplification, those machines are shown in FIG. 28 as being connected to the input-output interface 350. To the input-output interface 350, there is also connected an operator's control panel 900 which is provided with a display device in the form of a monitoring display 902, a manually operable input device in the form of a keyboard 904, and an alarming device in the form of an indicator device 906.

In the present embodiment, the monitoring device 28 is located near the electronic-circuit fabricating system 10, so that the monitoring device 28 is operable by the operator of the system 10, for monitoring the system 10. However, the monitoring device 28 may be connected to the various working machines and inspecting machines through suitable wire or wireless communication means, and located in a centralized control station remote from the electronic-circuit fabricating system 10. In this latter case, at least a portion of the operator's control panel 900, such as the indicator device 906 may be located near the electronic-circuit fabricating system 10. Alternatively, the operator's control panel 900 is located in the centralized control station.

The RAM 344 of the computer 348 is used to store the device information and inspection result data transmitted from the mask printing machine 14, electronic-component mounting machines 18, 22, and inspecting machines 16, 20, 24. The present state of each of the working machines consisting of the mask printing machine 14 and the first and second electronic-component mounting machines 18, 22 is estimated on the basis of the information obtained in relation to the working operation which has been performed. At this time, the present state of each working machine can be estimated with high accuracy, on the basis of not only the information obtained by the inspecting machines 16, 20, 24 but also the device information received from the working machines 14, 18, 22. The RAM 344 of the computer 348 is also used to store data indicative of the state of each working machine estimated from time to time, and data indicative of a tendency of change of the state of each working machine, which is obtained by comparing the present state and the past state. The monitoring device 28 stores a plurality of monitoring programs for estimating the present state of each working machine 14, 18, 22 on the basis of the various data stored in the RAM 344 and the presently obtained data, and if necessary, compensating the related control data and providing an indication prompting the operator to implement a suitable treatment.

Each of the working machines 14, 18, 22 has at least one monitoring-object portion to be monitored, and the monitoring device 28 receives necessary or useful device information from each monitoring-object portion of each working machine, and the inspection result information relating to the monitoring-object portions from the inspecting machines 16, 20, 24. The monitoring device 28 obtains the present state and a tendency of change of the state of each monitoring-object portion on the received information and according to the monitoring programs. The monitoring-object portions of the working machines will be described. On the present state and the tendency of change of the state, the monitoring device 28 estimates a critical point of time at which the state of each monitoring-object portion exceeds a threshold state, and indicates the estimated critical point of time on the display device. The threshold state is determined such that the amount of an operating error or variation of each device of each working machine is larger than the amount of an inevitably caused operating error of each device and the amount of a detecting error of each inspecting machine, and is smaller than a threshold value above which the manufactured circuit board is determined to be defective. The critical point of time is estimated on the basis of the thus determined threshold state. The critical point of time is a point of time at which the state of the monitoring-object portion in question is expected to exceed the threshold state if the present tendency of change of the state will be maintained.

The critical point of time is updated each time the present state is estimated, and may be advanced or retarded with respect to the one estimated last. If the critical point of time has been reached for a given monitoring-object portion, the monitoring device 28 determines that some suitable treatment should be implemented for this monitoring-object portion, and effects automatic compensation of the control data according to the specific type of treatment that should be implemented, or alternatively prompts the operator to implement a necessary treatment for the monitoring-object portion. Where the necessary treatment is implemented by the operator, the working machine having the monitoring-object portion in question is turned off, to permit the operator to implement the necessary treatment. In the present embodiment, the monitoring display 902 is activated to provide suitable information informing the operator of the state of the monitoring-object portion, and the indicator device 906 is activated to draw the attention of the operator if some treatment should be implemented for the monitoring-object portion. In the present embodiment, the monitoring device 28 stores data indicative of the number of times some treatments have been implemented for each monitoring-object portion. Usually, the operator is prompted to inspect and treat the monitoring-object portion if the frequency of automatic implementation to effect a treatment for the monitoring-object portion has exceeded a predetermined threshold. There will be described in detail monitoring operations for the individual working machines.

To begin with, the monitoring operation for the mask printing machine 14 will be described.

In the mask printing machine 14, the contact-load adjusting air cylinder 138, printing-head moving device 132, extruding air cylinder 172, position-adjusting device 80, etc. are selected as the monitoring-object portions to be monitored. Monitoring information of these monitoring-object portions (which are part of the device information) include the contact load and speed of the printing head 134, extrusion pressure of the printing material, control data for positioning the mask plate 36, etc. The monitoring device 28 receives those monitoring information of the monitoring-object portions from the control device 182 of the mask printing machine 14, and further receives from the printed-state inspecting machine 16 printing result information such as the horizontal positions, volumes, and presence or absence of breakage or bridging segments of the solder paste masses 384. The monitoring device 28 also receives from the mask printing machine 14 the number of printing operations performed. On the basis of those kinds of data, the monitoring device 28 performs various monitoring operations such as determination of the adequacy of the various kinds of control data, analysis of the inspection result, determination of the necessity of cleaning the mask, and estimation of the operating state of the printing head 134.

There will be described in detail the manner of estimating the operating state of each monitoring-object portion on the basis of an inspection result of selected portions by the printing-state inspecting machine 16.

Initially, the inspection of the horizontal positions of the solder paste masses 384 will be described.

In the present mask printing machine 14, the images of the fiducial marks provided on the printed-wiring board 12 and the mask 64 are taken by the fiducial-mark imaging devices 44, 46, so that the printed-wiring board 12 and the mask 64 are positioned relative to each other on the basis of the images of the fiducial marks. Accordingly, there is a low possibility that positioning errors of the solder paste masses 384 relative to the printed-wiring board 12 take place. However, the horizontal positioning errors of the solder paste masses 384 may be detected in spite of accurate relative positioning between the printed-wiring board 12 and the mask 64, if there exists a relative positioning error between the printed-wiring-board fiducial-mark imaging device 44 and the mask fiducial-mark imaging device 46, due to errors of positioning of the imaging devices 44, 46 relative to the X-axis slide 300. In view of this, the monitoring device 28 monitors not only the solder paste masses 384 for their printing positions, but also the two imaging devices 44, 46 for their relative positioning error, on the basis of not only the image data of the fiducial marks obtained by the imaging devices 44, 46, or position adjusting data used by the position-adjusting device 80, but also the errors of positioning of the solder paste masses 384 relative to the printed-wiring board 12, which have been obtained by the printed-state inspecting machine 16.

Then, there will be described an operation to detect the volume of each solder paste mass 384, that is, to determine whether the amount of solder paste applied to form the solder paste mass is adequate or not.

The present embodiment is adapted to obtain the actual volumes of the solder paste masses 384 at all of the printing spots on the printed-wiring board 12. The obtained actual volume of the solder paste mass 384 at each printing spot is compared with an optimum value predetermined for each printing spot. Further, an average of the actual volumes at all of the printing spots is obtained. The average volume is obtained as an average of ratios of the actual volumes to the optimum values predetermined for the respective printing spots. A tendency of variation of the actual volume of each solder paste mass 384 with respect to the optimum value, and a tendency of variation of the average volume are also obtained. Where the mask printing operations are effected on two or more printed-wiring boards 12 of the same kind, using the same mask 64, a tendency of variation of the actual volumes of the solder paste masses 384 and a tendency of variation of the average value on the second or following printed-wiring board 12 with respect to those on the preceding board or the predetermined previous board are also obtained on the basis of the actual volumes of the solder paste masses 384 obtained on the above-indicated two boards 12. Further, an upper limit and a lower limit are determined as the threshold state for each of the actual volume of the solder paste mass 384 at each printing spot and for the average volume. The critical point of time is estimated on the basis of differences of the actual volumes and the average volume with respect to the upper and lower limits, and the tendencies of variation of the actual volumes and the average volume. Since the threshold state is determined such that the manufactured circuit board is not defective in the threshold state, as indicated above, it is possible to prevent the manufactured circuit board from being defective, by compensating the control data for controlling the monitoring-object portion in question, when the critical point of time is reached.

Thus, the present embodiment is arranged to monitor both the actual volumes and the average volume of the solder pate mass 384 at each printing spot, and estimate a cause for an excessively large or small volume of the solder paste mass 384, so that the suitable treatment can be implemented depending upon the specific cause. Described in detail, where most of the volumes of the solder paste masses 384 are determined to be excessively large or small, for instance, it is estimated that at least one of the contact load and moving speed of the printing head 134 is inadequate, or that the hardness or any other property of the solder paste is inadequate. Where only some of the volumes of the solder paste masses 384 are excessively large or small, it is estimated that the hardness or any other property of the solder paste and the extrusion pressure do not adequately match each other, or that the outlet-defining members 162 are defective. This aspect will be described more specifically.

When the amount of the solder paste applied to the printed-wiring board 12 tends to be generally excessive, this tendency is estimated to be caused by at least one of an insufficient action of the outlet-defining members 162 to scrape the solder paste away from the mask 64 due to insufficiency of the contact load of the printing head 134, and a failure of the outlet-defining member 162 to scrape the solder paste due to excessively high speed of the printing head 134. Alternatively, the above-indicated tendency is estimated to be caused by excessively high hardness of the solder paste. Where the volumes of the solder paste masses 384 exceed the upper limit, the control data for the printing head 134 are compensated so as to increase the contact load or reduce the moving speed of the printing head 134, for thereby adjusting the volumes of the solder paste masses 384 toward the optimum values. It is noted that an increase of the contact load is effective to significantly reduce the volumes of the solder paste masses 384 formed through the apertures 65 whose width dimension in the X-axis direction (parallel to the longitudinal direction of the printing head 134) is relatively large, but is not so effective to reduce the volumes of the solder paste masses 384 formed through the apertures 65 whose width dimension is relatively small. On the other hand, a decrease in the moving speed of the printing head 134 is effective to improve the function to scrape the solder paste, irrespective of the width dimension of the apertures 65. In view of this, the present embodiment is arranged such that where the volumes of the solder paste masses 384 tend to be generally excessive, the control data for the printing head 134 are adjusted to reduce the moving speed of the printing head 134 as a principle, for reducing the volumes of the solder paste masses 384, and if the reduction of the moving speed is not sufficient, to increase the contact load of the printing head 134, as well, for adjusting the volumes toward the optimum values. If the volumes of the solder paste masses 384 cannot be effectively reduced by a decrease in the moving speed and/or an increase in the contact load of the printing head, which are represented by the data received from the mask printing machine 14, or if the contact load or moving speed of the printing head 134 is changed beyond the normal range of control, it is estimated that the hardness of the solder paste is excessively high. In this case, the monitoring display 902 and the indicating device 906 prompt the operator to check the solder paste for its property.

When the amount of the solder paste applied to the printed-wiring board 12 tends to be generally insufficient, on the other hand, this tendency is estimated to be caused by at least one of an excessive action of the outlet-defining members 162 to scrape the solder paste away from the mask 64 due to an excessively high contact load of the printing head 134, and a low moving speed of the printing head 134 with respect to the contact load, which causes a part of the outlet-defining member 162 to enter the apertures 65 of the mask 64 and scrape an excessively large amount of the solder paste away from the apertures 65. Alternatively, the above-indicated tendency is estimated to be caused by excessively low hardness of the solder paste. In view of this, the present arrangement is arranged such that when the estimated critical point of time has been reached with the volumes of the solder paste masses 384 becoming smaller than the lower limit, the control data for the printing head 134 are adjusted so as to increase its moving speed or reduce its contact load, for thereby preventing an excessive amount of scraping of the solder paste, to increase the volumes of the solder paste masses 384 toward the optimum values. If the volumes of the solder paste masses 384 cannot be effectively increased by an increase in the moving speed and/or a decrease in the contact load of the printing head, which are represented by the data received from the mask printing machine 14, or if the contact load or moving speed of the printing head 134 is changed beyond the normal range of control, it is estimated that the hardness of the solder paste is excessively high. In this case, the monitoring display 902 and the indicating device 906 prompt the operator to check the solder paste for its property.

In the present embodiment arranged to detect the volumes of the solder paste masses 384 at all of the printing spots on the printed-wiring board 12, it is possible to determine whether the tendency of an excessively large or insufficient amount of the solder paste exists in a limited area of the board 12 or throughout the entire area of the board 12. Where the tendency of the excessively large amount of the solder paste exists in the limited area of the board 12, it is estimated that the outlet-defining members 162 are partially broken or chipped. Where the amount of the solder paste is excessively large in a continuous area of the board 12 extending in the direction of movement of the printing head 134, it is considered that the outlet-defining members 162 are partially broken or chipped, and are not capable of effectively scraping the solder paste. In this case, therefore, the mask printing machine 14 is turned off, and the monitoring display 902 provides an indication that the outlet-defining members 162 appear to be broken, while the indicating device 906 informs the operator of this fact. In response to this indication, the operator inspects the mask printing machine 14, and replaces the outlet-defining members 162 if found broken, with the new ones.

When the tendency of the insufficient amount of the solder paste exists in the limited area, it is estimated that the extrusion pressure of the solder paste 384 is insufficient. Where the solder paste is hardened as the time passes, the extrusion pressure becomes insufficient for the hardness of the solder paste, the volumes of the solder paste masses 384 formed through the relatively narrow apertures 65 become insufficient. In view of this, the printing spots corresponding to the relatively narrow apertures 65 are selected as monitoring-object printing spots to be monitored by the monitoring device 28, in the present embodiment. The monitoring device 28 determines that the extrusion pressure is insufficient, if the detected volumes of the solder paste masses 384 formed at the monitoring-object printing spots are insufficient while those formed at the other printing spots are not insufficient. In this case, the control data are compensated so as to increase the extrusion pressure. If the compensation of the control data is not effective, the monitoring display 902 and the indicating device 906 prompt the operator to inspect the solder paste 384 for its property.

The present monitoring device 28 is arranged to monitor the solder paste masses 384 for checking their volumes are adequate or not, and also checks the frequency at which the threshold state is established, and the time interval between the moment when the last treatment was implemented and the present moment. If the time interval between the moments when the threshold state is repeatedly established becomes shorter than a threshold value, the monitoring display 902 and the indicating device 906 inform the operator of this fact. In response to this indication on the monitoring display 902, the operator inspects the mask printing machine 14.

Figure 29:
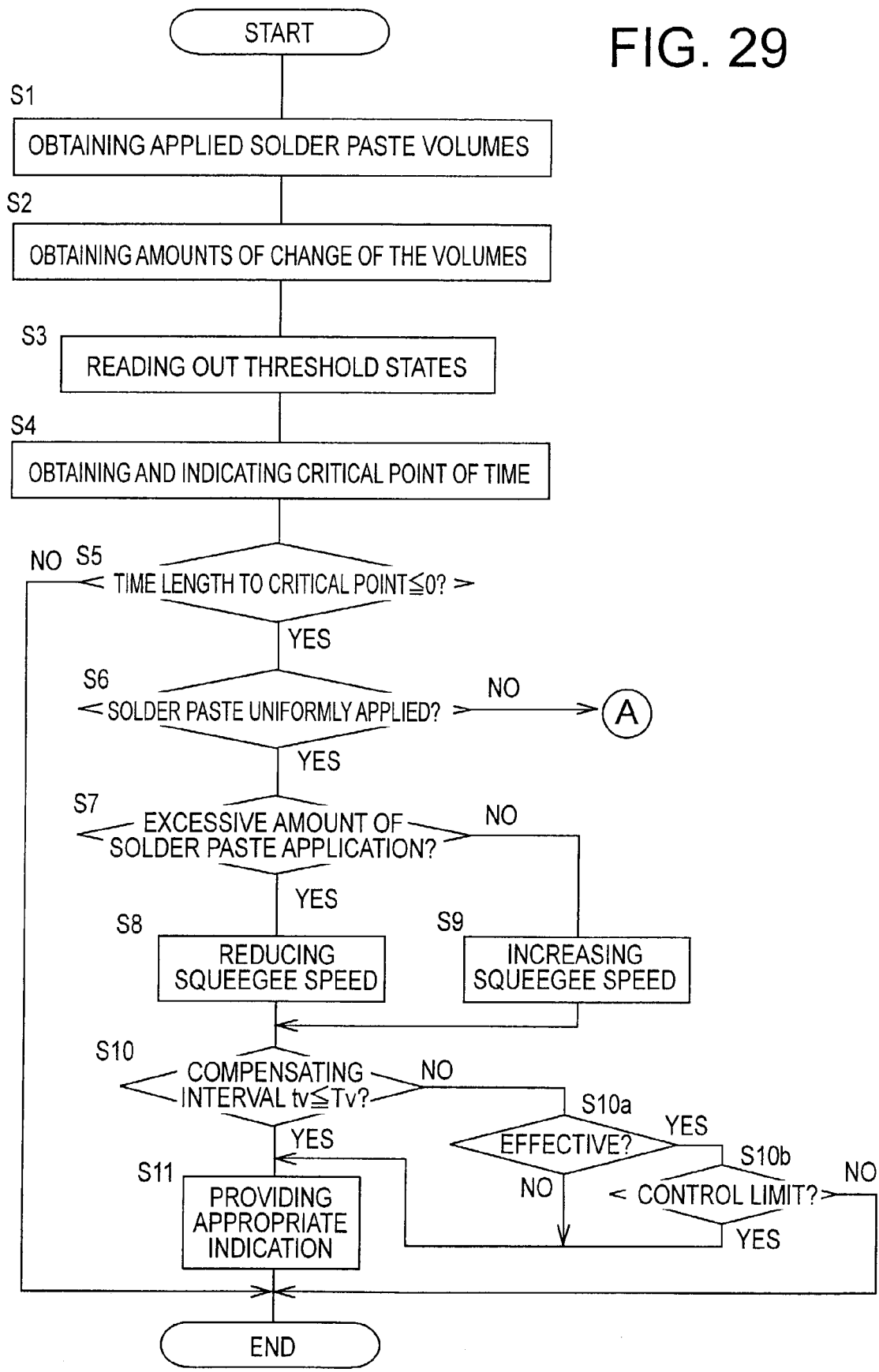
FIG. 29 is a flow chart illustrating a portion of a monitoring program for monitoring the above-indicated mask printing machine.

Referring to the flow chart of FIG. 29, there will be described the inspection in more detail. For simplification, a part of the operations to control the printing machine 134 such as the operation to control its contact load will not be described.

The present program is repeatedly executed during the operation of the electronic-circuit fabricating system 10.

Step S1 (hereinafter referred to simply as "S1"; similar reference applied to the other steps) is first implemented to operate the printed-state inspecting machine 16 to obtain the volumes of the solder paste applied to all of the printing sports, and to obtain the average value of the volumes, and maximum and minimum values of the ratios of the volumes to the optimum values. S2 is then implemented to calculate the amounts of change of the average volume and the maximum and minimum ratio values at the two printing spots obtained in the present cycle, with respect to those obtained in the last cycle or the predetermined previous cycle. S3 is implemented to read out the predetermined threshold states for the average volume and each of the volumes at the respective printing spots. In S4, the critical points of time at which the threshold states are expected to be established are calculated. The critical points of time are represented by time lengths from the present moment to the moment at which the threshold states are expected to be established. The critical points of time are calculated for the average volume and for the maximum and minimum ratio values. Of the time lengths of these three critical points of time, the shortest time length (equal to or smaller than zero, or slightly larger than zero) is obtained as representing the critical point of time in the present mask printing operation, and indicated on the monitoring display 902.

Then, S5 is implemented to determine whether the critical point of time has been reached. Namely, if the time length to the critical point of time is larger than zero, it indicates that the critical point of time has not been reached, and a negative decision (NO) is obtained. In this case, one cycle of execution of the present program is terminated. If the time length to the critical point is equal to or smaller than zero, it indicates that the critical point of time has been reached, and an affirmative decision (YES) is obtained in S5. In this case, the control flow goes to S6 to determine whether the tendency of an excessively large or insufficient amount of the solder paste exists uniformly throughout the entire area or in a limited area. Described in detail, if the critical point of time was obtained in S4 and S5 on the basis of the average volume, it is determined that the tendency of the excessively large or insufficient amount of the solder paste exists throughout the entire area, and an affirmative decision (YES) is obtained in S6. In this case, the control flow goes to S7 to determine whether the amount of the applied solder paste is excessive or insufficient. If the amount of the applied solder paste is excessive, an affirmative decision (YES) is obtained in S7, and the control flow goes to S8 to reduce the moving speed of the printing head 134. If the amount of the applied solider paste is insufficient throughout the entire area, on the other hand, a negative decision (NO) is obtained in S7, and the control flow goes to S9 to increase the moving speed of the printing head 134.

In either case, the control flow goes to S10 to determine whether a compensating interval tv which is a time length after the moment of the last compensation of the control data for the moving speed is equal to or shorter than a predetermined time Tv. If the compensating interval tv is equal to or shorter than the predetermined time Tv, an affirmative decision (YES) is obtained in S10, and the control flow goes to S11 to inform the operator of this fact. If the compensating interval tv is longer than the predetermined time Tv, on the other hand, a negative decision (NO) is obtained in S10, and the control flow goes to S10*a* to determine whether the compensation of the moving speed is effective. If the compensation is determined in S10*a* to be effective, the control flow goes to S11 to inform the operator of this fact. If the compensation is effective, the control flow goes to S10*b* to determine whether the moving head of the printing speed 134 has reached a control limit. If the control limit has been reached, S11 is implemented to inform the operator of this fact. If the control limit has not been reached, one cycle of execution of the present program is terminated.

Figure 30:
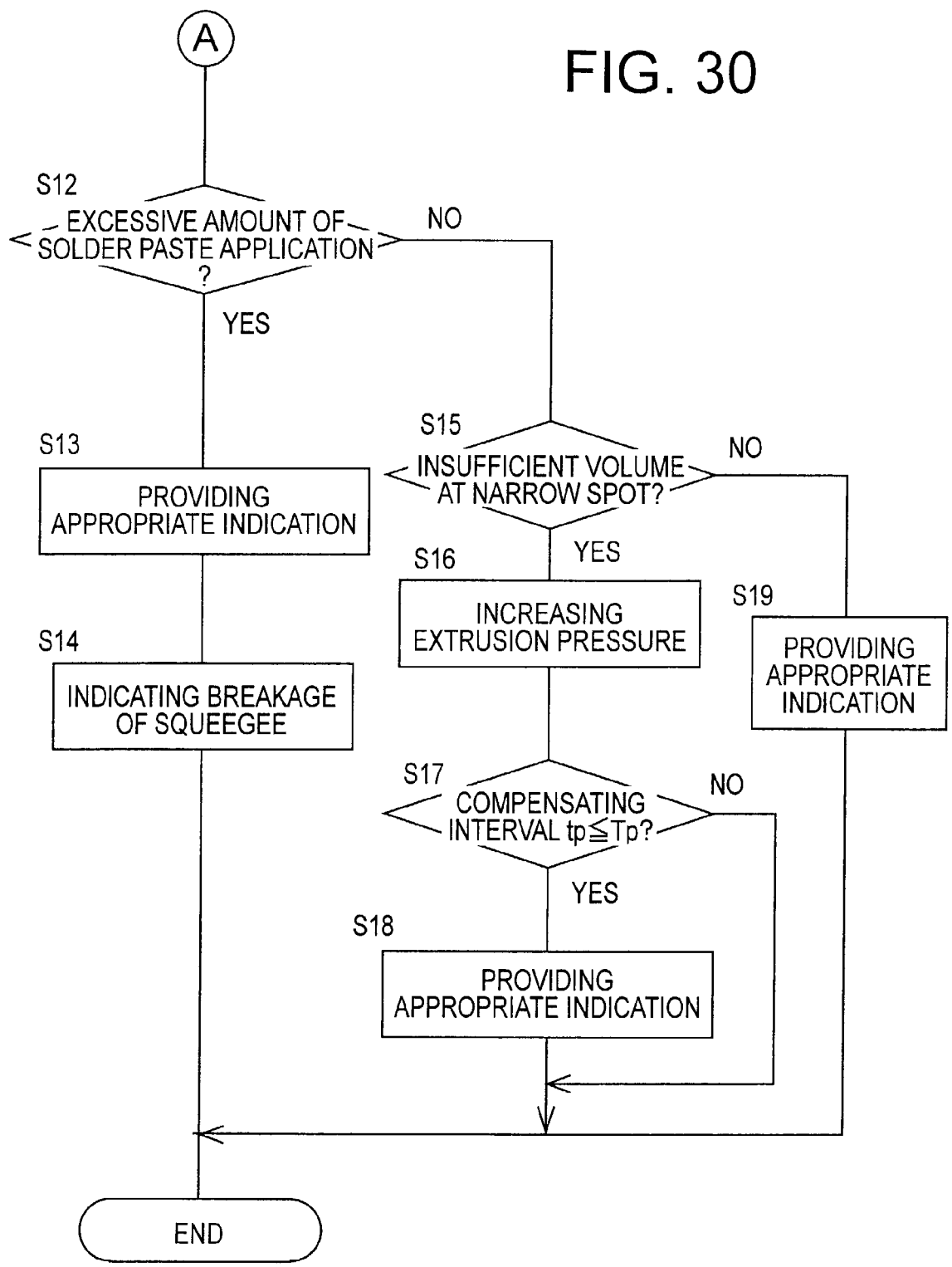
FIG. 30 is a flow chart illustrating another portion of the above-indicated monitoring program.

If the critical point of time was obtained on the basis of the maximum or minimum ratio value, it is estimated that the tendency of the excessively large or insufficient amount of the solder paste locally exists at some of the printing spots. In this case, a negative decision (NO) is obtained in S6, and the control flow goes to S12 of FIG. 30, as indicated by reference character "A". In S12, a determination is made as to whether the volumes of the solder paste applied to the printing spots in the limited area are excessive or not. If the volumes in the limited area are excessive, an affirmative decision (YES) is obtained in S12, and the control flow goes to S13 and S14 to inform the operator that the squeegee is broken or chipped. If the volumes in the limited area are insufficient, a negative decision (NO) is obtained in S12, and the control flow goes to S15 to determine whether the printing spot at which the minimum ratio value was detected is a narrow spot. Where the printed-wiring board 12 has narrow printing spots whose width dimensions are relatively small, these printing spots are selected as the objective spots to be monitored. In S15, a determination is made as to whether the printing spot at which the minimum ratio value was detected is one of these objective sports. If the volume of the solder paste applied to at least one of the objective spots is insufficient, an affirmative decision (YES) is obtained in S15, the control flow goes to S16 to compensate the control data for increasing the extrusion pressure of the solder paste 384, and goes further to S17 and S18 similar to S10 and S11, to determine whether a compensating interval tp after the last compensation of the control data for the extrusion pressure is equal to or shorter than a predetermined time Tp. If the volume of the solder paste 384 is not insufficient at the objective spots, the control flow goes to S19 to inform the operator of this fact. Thus, one cycle of execution of the present program is terminated.

It is noted that at least one objective spot may be selected, or no objective spots may be selected. Where the printing spots do not include any narrow spot, S15 through S18 may be skipped. In this case, if the negative decision (NO) is obtained in S12, the control flow goes to S19 to inform the operator of this fact.

According to the present program, the control data for the mask printing machine 14 are automatically compensated on the basis of the result of inspection of the solder paste applied by printing. This arrangement permits reduction of the defective products and improves the ease of handling of the system, without requiring the operator's manipulation. In addition, continuous monitoring of the printing result and the mask printing machine 14 to store and utilize the past data makes it possible to improve the accuracy of estimation of the present state of the mask printing machine 14. Further, a fact that a change of the control data for the mask printing machine 14 is not effective is found on the basis of an amount of change of the control data which is received from the mask printing machine 14, and an amount of change of the printing result which is received from the printed-state inspecting machine 16. In addition, a fact that the controllable value has reached the control limit is found on the basis of the control data received from the mask printing machine 14. In such events, the operator is prompted to inspect the solder paste 384 for its property.

Then, there will be described an operation to inspect the solder paste masses 384 for the presence of breakage and bridging segments.

The breakage of the solder paste masses 384 is considered to be caused due to plugging of the apertures 65 of the mask 64, while the bridging segments of the solder paste masses 384 are considered to be formed due to contamination of the back surface of the mask 64. To prevent the breakage and the bridging segments of the solder paste masses 384, the present embodiment is arranged to effect a cleaning operation each time a predetermined cleaning interval T0 (a predetermined working interval) has passed. When the solder paste masses 384 suffer from the breakage or formation of the bridging segments, in spite of the cleaning operations at the predetermined cleaning interval, the mask 64 is cleaned to avoid the breakage and the bridging segments, upon detection of the breakage or bridging segment. To this end, a working time t (number of printing operations performed, time length, etc.) after the moment at which the mask 64 was cleaned last is obtained, and the cleaning interval T0 at which the mask 64 is periodically cleaned is compensated on the basis of the working time t. This arrangement permits improved efficiency of printing by the mask printing machine 14, and further reduction of the printed-wiring boards 12 suffering from poor printing of the solder paste. If the working time t when the breakage or formation of the bridging segment of the solder paste masses 384 takes place is shorter than a predetermined time T, the operator is informed that the defect has occurred in a comparatively short time after the last occurrence. The predetermined time T is determined to be shorter than the predetermined cleaning interval T0.

Figure 31:
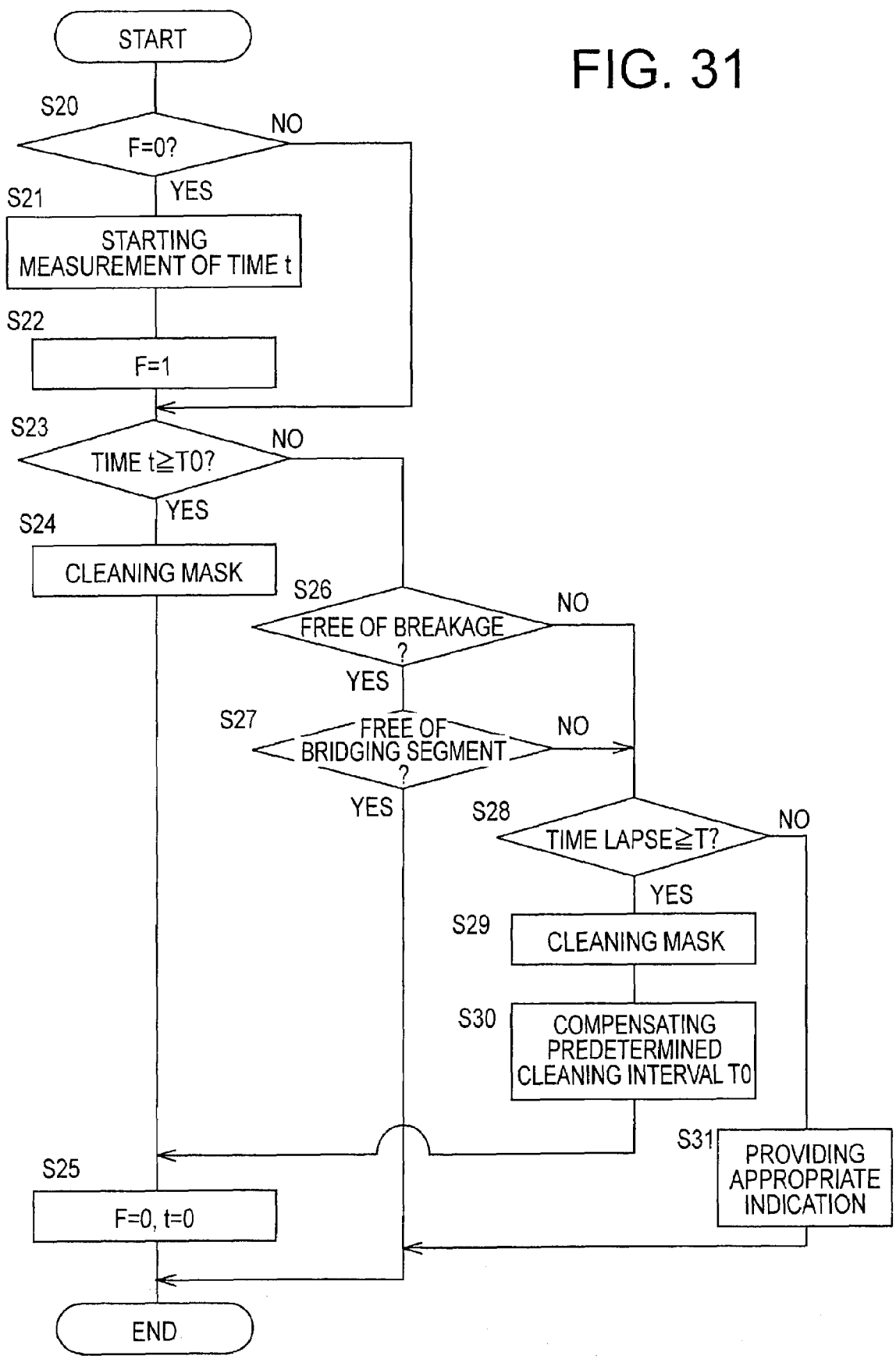
FIG. 31 is a flow chart illustrating another monitoring program of the above-indicated mask printing machine.

Reference is now made to the flow chart of FIG. 31 showing a program which is repeatedly executed during the printing operation of the mask printing machine 14.

Initially, S20 is implemented to determine whether a flag F is set at "0". If the flag F0 is set at "0", an affirmative decision (YES) is obtained in S20, and the control flow goes to S21 to start measuring the time t, and to S22 to set the flag F to "1". Thereafter, steps S21 and S22 are skipped. Then, S23 is implemented to determine whether the time t which has passed has reached or exceeded the predetermined cleaning interval T0. If the time t is equal to or longer than the predetermined cleaning interval T0, an affirmative decision (YES) is obtained in S23, and the control flow goes to S24 to effect the cleaning of the mask 64, and to S25 to reset the flag F to the original state "0". Thus, one cycle of execution of the present program is terminated. If the time t is shorter than the predetermined cleaning interval T, on the other hand, a negative decision (NO) is obtained in S23, and the control flow goes to S26 and S27 to determine whether the solder paste masses 384 on the printed-wiring board 12 inspected by the printed-state inspecting machine 16 are free of breakage and bridging segment. If the solder paste masses 384 are free of both the breakage and the bridging segment, an affirmative decision (YES) is obtained in S26 and S27, and one cycle of execution of the present program is terminated. If at least one of the breakage and bridging segment is detected, on the other hand, the control flow goes to step S28 in which the time t after the moment of the last cleaning is compared with the predetermined time T. If the time t is longer than the predetermined time T, an affirmative decision (YES) is obtained in S28, and the control flow goes to S29 to effect the cleaning of the mask 64, and to S30 to compensate the predetermined cleaning interval T0 on the basis of the time t. Then, S25 is implemented to reset the flag F to "0", and one cycle of execution of the present program is terminated.

If the time t is equal to or shorter than the predetermined cleaning interval T0, a negative decision (NO) is obtained in S28, and the control flow goes to S31 to inform the operator that the printing defect has occurred in a comparatively short time after the moment of the last cleaning of the mask. In this case, the mask printing machine 14 is turned off, and is inspected by the operator.

According to the present program, the mask is automatically cleaned on the basis of a result of inspection of the solder paste masses 384 for the presence of the breakage and bridging segments. Further, the present embodiment arranged to compensate the predetermined mask cleaning interval T0 makes it possible to effective prevent a printing defect while minimizing reduction of the printing efficiency.

It is not essential to inspect all of the printed solder paste masses 384 for their volumes and the presence of their breakage and the formation of bridging segments. That is, only selected ones of the solder paste masses 384 may be inspected. In this case, it is desirable to always inspect the solder paste masses 384 corresponding to the apertures that are likely to be plugged or suffer from other defects, and effect sampling inspection of the other solder paste masses 384 as needed. For example, all of the solder paste masses 384 formed at an extremely short spacing interval in an area of connection of lead wires of flat-package type electronic components are inspected, while the other solder paste masses 384 are subjected to sampling inspection, even where those solder paste masses 384 have some printing defects that are not serious. The sampling inspection may be effected to randomly selected ones of the solder paste masses 384, or to predetermined specific ones of the solder paste masses 384, for example, to the solder paste masses 384 formed to extend in the direction perpendicular to the direction of movement of the squeegee. In the latter case, the outlet-defining members 162 constituting the squeegee can be easily inspected for the presence of breakage or chipping.

There will next be described an operation to estimate the present state of the first electronic-component mounting machine 18.

The monitoring device 28 estimates the present state of each of the selected monitoring-object portions of the first electronic-component mounting machine 18, such as the feeders 466, component-holding heads 532 (or indexing body 530) and printed-wiring-board holding device 458, on the basis of the information relating to these monitoring-object portions, the control data for the monitoring-object portions, and the result of inspection by the first mounted-component inspecting machine 20, which result indicates the positioning errors of the mounted electronic components 468 and the presence or absence of the electronic components 468 at the respective mounting spots. The above-indicated information and control data are received from the first electric-component mounting machine 18. Further, the monitoring device 28 obtains the tendency of change of the state of each monitoring-object portion, estimates the critical point of time at which the predetermined threshold state of each monitoring-object portion is expected to be established, and automatically implement a suitable treatment such as compensation of the control data, or activation of the monitoring display 902 and the indicating device 906 to prompt the operator to eliminate a defect of the monitoring-object portion, if the critical point of time has been reached.

Where the horizontal hold-position errors or mounting-position errors of the electronic components 468 as held or as mounted are found relatively large, for instance, the monitoring device 28 estimates whether the hold-position or mounting-position errors are caused by positioning errors of the feeders 466, positioning error of the component-holding heads 532 or positioning errors of the printed-wiring-board holding device 458, and effects automatic compensation so as to eliminate the estimated cause for the horizontal hold-position or mounting-position errors of the electronic components 468, or informs the operator of the estimated cause. Thus, the monitoring device 28 operates to maintain a high degree of component mounting accuracy of the electronic-component mounting machine 18.

First, there will be described the case where the horizontal hold-position errors $\Delta XEn$ and $\Delta YEn$ (hereinafter referred to simply as "hold position errors $\Delta XEn$ and $\Delta YEn$") are relatively large.

An increase of the hold-position errors $\Delta XEn$ and $\Delta YEn$ is considered to be caused by at least one of a deviation of the component-supply position of the feeders 466, and a deviation of the component-receiving position of the component-holding head 532. If the hold position errors $\Delta XEn$ and $\Delta YEn$ are caused by the deviation of the component-receiving position of the component-holding head 532, it is generally considered that the mounting-position errors $\Delta Xn$ and $\Delta Yn$ of the electronic components 468 are also comparatively large. In this respect, it is noted that the deviation of the component-receiving position of the component-holding head 532 is caused by an angular positioning error of the indexing body 530 holding the component-holding heads 532, so that the other working positions of the indexing body 530 highly possibly have deviations, that is, the component-mounting position of the component-holding head 532 has a deviation. Therefore, if the mounting-position errors $\Delta Xn$ and $\Delta Yn$ of the electronic components 468 are found relatively large even with the adjustment of the component-mounting spot by the printed-wiring-board holding device 458 so as to eliminate the hold-position errors $\Delta XEn$ and $\Delta YEn$ detected at the component-hold-position detecting position, the indexing body 530 is considered to have the angular positioning error.

If the mounting-position errors $\Delta Xn$ and $\Delta Yn$ of the electronic components 468 are sufficiently small even where the hold-position errors $\Delta XEn$ and $\Delta YEn$ are relatively large, the hold position errors $\Delta XEn$ and $\Delta YEn$ are considered to be caused by the deviation of the component-supply position of the feeders 466. If the hold-position errors $\Delta XEn$ and $\Delta YEn$ are not caused by the angular positioning error of the indexing body 530, the mounting-position errors $\Delta Xn$ and $\Delta Yn$ must be reduced by adjustment of the mounting spot by the printed-wiring-board holding device 458 so as to eliminate the hold-position errors $\Delta XEn$ and $\Delta YEn$ as detected at the component-hold-position detecting position. Therefore, if the hold-position errors $\Delta XEn$ and $\Delta YEn$ are relatively large while the mounting-position errors $\Delta Xn$ and $\Delta Yn$ are relatively small, the hold-position errors $\Delta XEn$ and $\Delta YEn$ are considered to be caused by the deviation of the component-supply position of the feeders 466.

Figure 32:
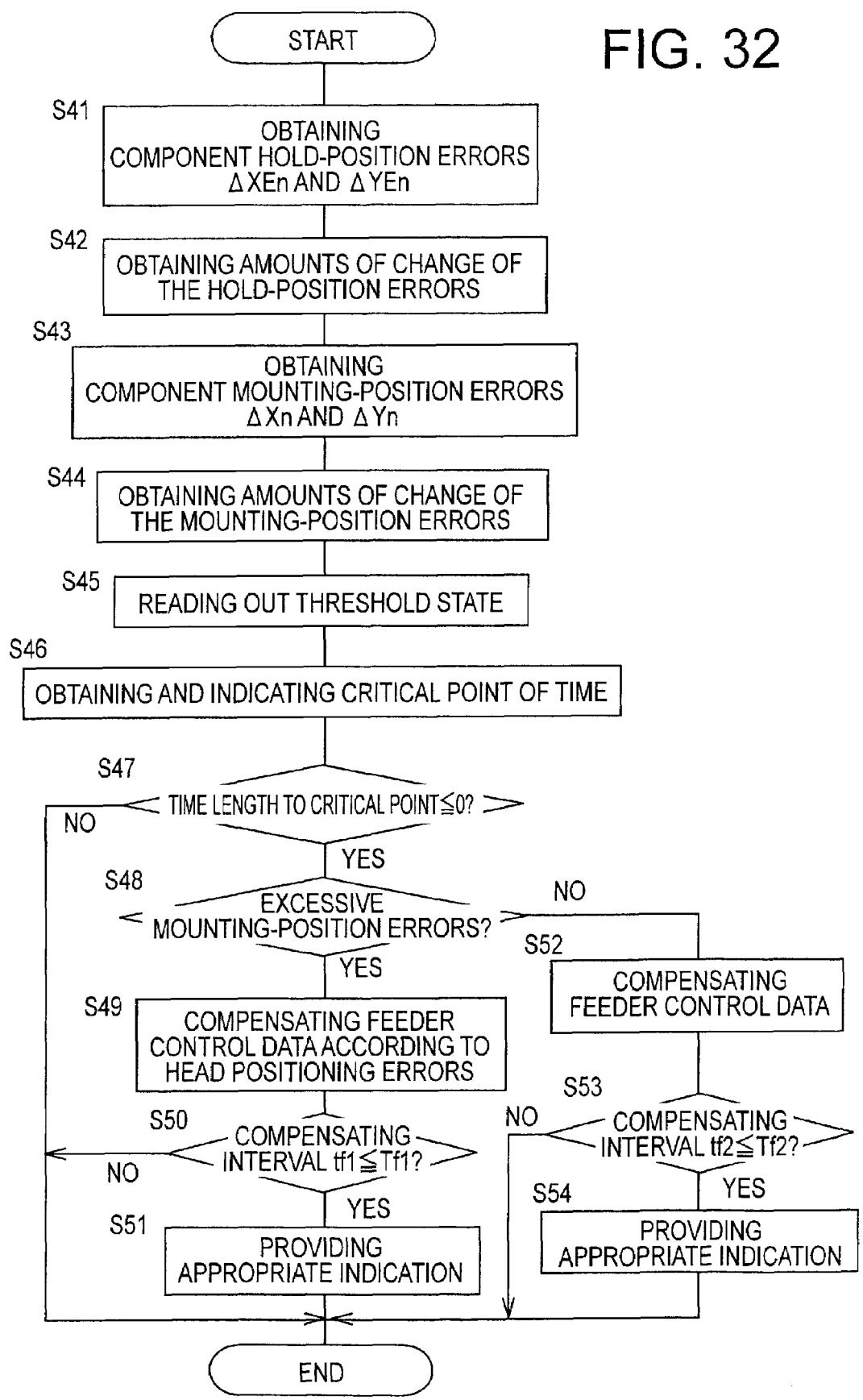
FIG. 32 is a flow chart illustrating a monitoring program for monitoring the above-indicated first electronic-component mounting machine.

Thus, the cause for the hold-position errors can be estimated to implement a suitable treatment for eliminating the cause, on the basis of the hold-position error data received from the first electronic-component mounting machine 18, in combination with the mounting-position error data received from the first mounted-component inspecting machine 20. This aspect will be described in detail by reference to the flow chart of FIG. 32.

Initially, S41 is implemented to obtain the horizontal hold-position errors $\Delta XEn$ and $\Delta YEn$ of the electronic components 468 as held by the suction nozzle 560, which have been detected at the component-hold-position detecting position in the first electronic-component mounting machine 18. It is desirable to obtain average values of the horizontal hold-position errors $\Delta XEn$ and $\Delta YEn$ of a selected plurality of electronic components 468, for example, average values of the horizontal hold-position errors $\Delta XEn$ and $\Delta YEn$ of all of the electronic components 468 which have been mounted on a predetermined number of printed-wiring boards 12. Then, S42 is implemented to read the horizontal hold-position errors $\Delta XEn-1$ and $\Delta YEn-1$ which were obtained in the last cycle or in a predetermined previous cycle, and obtain amounts of change of the presently obtained hold-position errors $\Delta XEn$ and $\Delta YEn$ with respect to the preceding or previous hold-position errors $\Delta XEn-1$ and $\Delta YEn-1$.

Then, S43 is implemented to obtain the mounting-position errors $\Delta Xn$ and $\Delta Yn$ of the electronic components 468 as mounted on the printed-wiring board 12, which have been detected in the first electronic-component mounting machine 18. It is also desirable to obtain average values of the mounting-position errors $\Delta Xn$ and $\Delta Yn$ of a selected plurality of electronic components 468, for example, average values of the mounting-position errors $\Delta Xn$ and $\Delta Yn$ of all of the electronic components 468 which have been mounted on a predetermined number of printed-wiring boards 12. The present monitoring device 28 stores the hold-position error data of the electronic component 468 obtained in the first electronic-component mounting machine 18, together with the identification codes of the feeders 466 from which the electronic components 468 were supplied, the identification codes of the suction nozzles 560 used to hold the electronic components 468, and the identification codes of the component-holding heads 532 used to move those suction nozzles 560 in the horizontal direction. The monitoring device 28 also stores the data of the mounting-position errors $\Delta Xn$ and $\Delta Yn$ of the electronic components 468 as mounted on the printed-wiring board 12 by the suction nozzles 560, in relation to the hold-position data and the above-indicated identification codes. Accordingly, the data sets of the hold-position errors $\Delta XEn$ and $\Delta YEn$ of the respective electronic components 468 can be correlated to the data sets of the mounting-position errors $\Delta Xn$ and $\Delta Yn$ of those electronic components 468. Then, in S44, the amounts of change of the mounting-position errors are obtained. That is, differences of the presently obtained mounting-position errors $\Delta Xn$ and $\Delta Yn$ with respect to the mounting-position errors $\Delta Xn-1$ and $\Delta Yn-1$ obtained in the last cycle or in a predetermined previous cycle were obtained as the amounts of change of the mounting-position errors (S44).

Then, S45 is implemented to read out the threshold state of the hold-position errors, which is determined to hold the hold-position errors within a range in which the sucking end face 572 of the suction nozzle 560 is entirely located within the corresponding surface of the electronic component 468 when the electronic component 468 is held by suction by the suction nozzle 560. Then, the control flow goes to S46 to obtain a difference of the presently detected hold-position errors with respect to the threshold state, and calculate a critical point of time on the basis of the obtained difference and the above-indicated amounts of change of the hold-position errors. This critical point of time is represented by a time length from the present moment to the moment at which the threshold state is expected to be established. The critical point of time is calculated each time the hold-position errors are obtained, and displayed on the monitoring display 902 of the operator's control panel 900. Then, S47 is implemented to determine whether the time length to the critical point of time is equal to or shorter than zero, that is, whether the hold-position errors exceed the threshold state. If the calculated time length to the critical point of time is longer than zero, a negative decision (NO) is obtained in S47, and one cycle of execution of the present program is terminated. If the time length is equal to or shorter than zero, on the other hand, an affirmative decision (YES) is obtained in S47, and the control flow goes to S48 to determine whether the mounting-position errors are larger than predetermined thresholds, which may or may not be a threshold state of the mounting-position errors, which will be described. However, the threshold values are desirably equal to or smaller than the values of the threshold state.

If the mounting-position errors are larger than the predetermined thresholds, an affirmative decision (YES) is obtained in S48, and the control flow goes to S49. As described above, the indexing body 530 has an angular positioning error where the hold-position errors and the mounting-position errors are both relatively large. In this case, therefore, the control data for positioning the feeders 466 are adjusted for compensation for the angular positioning error. Described in detail, the component-supply position of each feeder 466 is adjusted depending upon the amounts and directions of the positioning errors of the component-holding head 532 due to the angular positioning error of the indexing body 530.

S50 is then implemented to obtain a compensating interval tf1 which is a time length after the moment at which the control data was adjusted for compensation for the positioning errors of the component-holding head 532, and to determine whether this compensating interval tf1 is equal to or shorter than a predetermined time Tf1. If the compensating interval tf1 between the moments at which S49 were implemented in the present and preceding cycles is longer than the predetermined value Tf1, a negative decision (NO) is obtained in S50, one cycle of execution of the present program is terminated. If the compensating interval tf1 is equal to or shorter than the predetermined time Tf1, an affirmative decision (YES) is obtained in S50, and the control flow goes to S51 to activate the monitoring display 902 and the indicating device 906 to inform the operator that the compensating interval tf1 is short. In response to the indication on the monitoring device 902, the operator inspects the feeders 466, in particular, the component-supply-table positioning device 476. Thus, one cycle of execution of the present program is terminated.

If the mounting-position errors are smaller than the predetermined thresholds, a negative decision (NO) is obtained in S48, and the control flow goes to S52 to adjust the control data for the component-supply-table positioning device 476, for compensation for the positioning error of the feeders 466. As described above, the hold-position errors are considered to have been caused due to a deviation of the component-supply position of the feeders 466, if the hold-position error are relatively large while the mounting-position errors are sufficiently small. The positioning error of the feeders 466 are highly possibly caused by deformation of various elements of the component-supply-table positioning device 476 due to thermal expansion thereof. In this case, the ballscrews 470 have different amounts of positioning errors at their portions relatively near and relatively distant from the table drive motors 472. Unlike the adjustment of the control data for the feeders 466 in S49, the adjustment of the control data for the component-supply-table positioning device 476 in S52 is made for only the portions at which the positioning error is relatively large, so that the adjustment does not affect the portions at which the positioning error is relatively small.

The control flow then goes to S53 and S54 to determine whether a compensating interval tf2 between the moments at which S52 were implemented in the present and preceding cycles is equal to or shorter than a predetermined time Tf2. If the compensating interval tf2 is equal to or shorter than the predetermined time Tf2, the indicating device 906 is activated to inform the operator of this fact. Thus, one cycle of execution of the present program is terminated.

According to the present program, the cause for the hold-position errors of the electronic components 468 exceeding the threshold state is estimated on the basis of the information relating to the mounting-position errors of the electronic components 468 in combination with the hold-position error data. The control data for the component-supply-table positioning device 476 are adjusted depending upon the estimated cause for the hold-position errors.

Then, there will be described the causes for the horizontal mounting-position errors $\Delta Xn$ and $\Delta Yn$ (hereinafter referred to simply as "mounting-position errors").

The mounting-position errors $\Delta Xn$ and $\Delta Yn$ are primarily caused by the angular positioning error of the indexing body 530, or the positioning error of the printed-wiring-board holding device 458. If the mounting-position errors $\Delta Xn$ and $\Delta Yn$ are caused by the angular positioning error of the indexing body 530, the mounting-position errors $\Delta Xn$ and $\Delta Yn$ tend to have substantially the same amounts throughout the entire area of the same printed-wiring board 12. The angular positioning error of the indexing body 530 tends to have substantially the same influence on the component-mounting position for all of the component-holding heads 532, more specifically, tends to cause the same amounts of mounting-position errors at any mounting spots on the printed-wiring board 12, which take place in the direction parallel to the direction of tangency to the circular path of movement of the component-holding heads 532 at the component-mounting position (in the X-axis direction as seen in FIG. 14). On the other hand, the mounting-position errors $\Delta Xn$ and $\Delta Yn$ caused by the positioning errors of the printed-wiring-board holding device 458 have different amounts at different mounting spots on the same printed-wiring board 12. When the ballscrews 490, 498 of the XY table 484 for positioning the printed-wiring-board holding device 458 in the horizontal direction are subject to deformation due to their thermal expansion, the feeding errors of the ballscrews 490, 498 increase with an increase in the distance from the corresponding drive motors 488, 496 provided as the drive sources, so that the amounts of the mounting-position errors ΔXn and ΔYn tend to vary on the printed-wiring board 12, in the direction of extension of the ballscrews 490, 498.

In view of the above analysis, the present embodiment is arranged such that when the mounting-position errors ΔXn and ΔYn are relatively large, the mounting-position errors ΔXn and ΔYn of the electronic components 468 at the different mounting spots on the printed-wiring board 12 are calculated, and compared with each other. Further, the monitoring device 28 is arranged to store these mounting-position error data of the printed-wiring boards 12 on which the electronic components 468 have been mounted in the past. The monitoring device 28 compares the amounts and directions of the average mounting-position errors of selected two or more electronic components 468 obtained in the present cycle, with those of the average mounting-position errors obtained in the past, to thereby obtain a tendency of change of the mounting-position errors of each component-mounting spot.

If the obtained tendencies of change of the mounting-positioning errors of the electronic components 468 indicate that the mounting-position errors of all the electronic components 468 on the same printed-wiring board 12 tend to have substantially the same amounts and directions, the mounting-position errors are considered to have been caused by the horizontal positioning errors of the component-holding head 532, that is, by the angular positioning error of the indexing body 530. If the mounting-position errors of the electronic components 468 tend to have different amounts and directions depending on the board 12, the mounting-position errors are considered to have been caused by the positioning error of the printed-wiring-board holding device 458. Thus, the causes for the mounting-position errors are estimated, and the tendency of change of the mounting-position errors is obtained, so that when the mounting-position errors exceed the threshold state, the control-data for the XY table 484 are adjusted so as to eliminate the mounting-position errors, in a manner similar to that when the hold-position errors exceed the threshold state.

Figure 33:
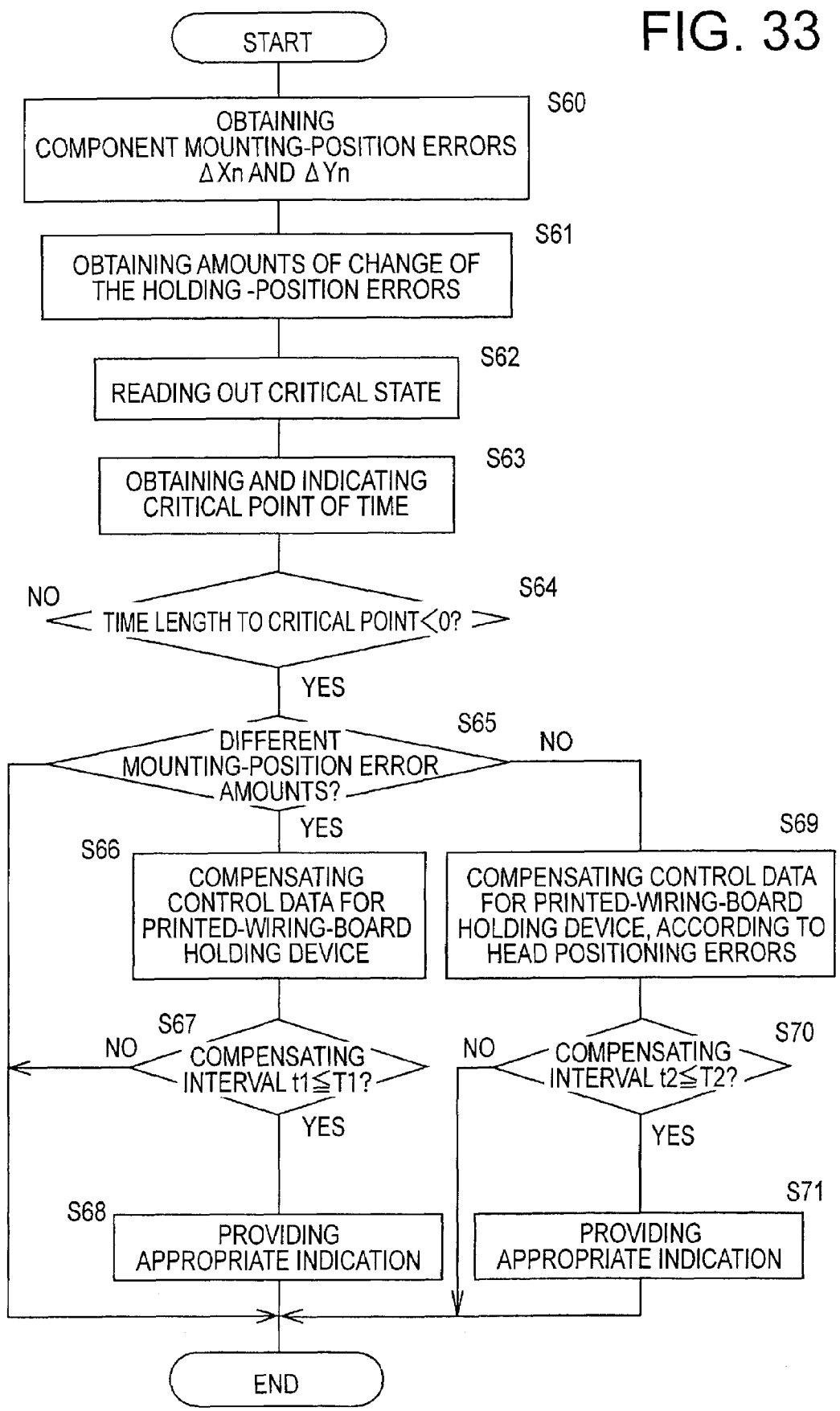
FIG. 33 is a flow chart illustrating another monitoring program for monitoring the above-indicated first electronic-component mounting machine.

This aspect will be described by reference to the flow chart of FIG. 33.

Initially, S60 through S63 are implemented to obtain the mounting-position errors ΔXn and ΔYn, and obtain the critical point of time on the basis of the amounts of change of the mounting-position errors and a predetermined threshold state. It is preferable to obtain average values of the mounting-position errors ΔXn and ΔYn of each of all the electronic components 468 on a predetermined number of printed-wiring boards 12. If it is determined in S64 that the time length to the critical point of time is equal to or shorter than zero, the control flow goes to S65 to compare the mounting-position errors ΔXn and ΔYn of the electronic components 468 at the component-mounting spots which are spaced apart from each other on the printed-wiring board 12. In the present embodiment wherein the mounting-position errors ΔXn and ΔYn of all the electronic components 468 mounted on the same printed-wiring board 12 are obtained, the average values of the mounting-position errors ΔXn and ΔYn at the two component mounting spots which are most distant from each other along a diagonal line of the board 12 are compared with each other. If the amount of a difference of the mounting-position errors at these two component-mounting spots which are most distant from each other is larger than a predetermined threshold, the mounting-position errors of the electronic components 468 are considered to have different amounts at different mounting-spots on the printed-wiring board 12. Differences of the mounting-position errors may be obtained at the other component-mounting spots. For example, the mounting-position errors of the electronic components at the two component-mounting spots which are most distant from each other in the X-axis direction are compared with each other to obtain a difference, and those at the two component-mounting spots which are most distant from each other in the Y-axis direction are compared with each other to obtain a difference. In this case, the mounting-position errors are considered to have different amounts at different component-mounting spots, if at least one of the above-indicated differences in the X-axis and Y-axis directions is larger than the predetermined threshold.

If the difference between the compared mounting-position errors is larger than the predetermined threshold, an affirmative decision (YES) is obtained in S65, and the control flow goes to S66 to compensate the control data for the XY table 484. As described above, the mounting-position errors are considered to have been caused by the deformation of the XY table 484 due to thermal expansion, if the mounting-position errors have different amounts at different component-mounting spots on the same printed-wiring board 12. In this case, therefore, the compensation of the control data for the XY table 484 is made according to a local difference in the mounting-position errors, that is, the compensation is made for only the component-mounting spots at which the mounting-position errors are relatively large, so that the adjustment does not affect the component-mounting spots at which the mounting-position errors are relatively small. Then, the control flow goes to S67 and S68 to obtain a compensating interval t1 between the moments at which S66 was implemented in the present and preceding cycles. If the compensating interval t1 is equal to or shorter than a predetermined time T1, the operator is informed of this fact. Thus, one cycle of execution of the present program is terminated.

If the above-indicated difference between the compared mounting-position errors is equal to or smaller than the predetermined threshold, a negative decision (NO) is obtained in S65, and the control flow goes to S69. When the mounting-position errors tend to have substantially the same amounts, these mounting position errors are considered to have been caused by the angular positioning error of the indexing body 530. In this case, therefore, the control data for positioning the XY table 484 are adjusted according to the positioning errors of the component-holding head 532 due to the angular positioning error of the indexing body 530. Described in detail, the control data for positioning the XY table 484 to establish each component-mounting spot are adjusted so as to eliminate the presently obtained mounting-position errors. The control flow then goes to S70 and S71 to obtain a compensating interval t2 between the moments at which S69 was implemented in the present and preceding cycles. If the compensating interval t2 is equal to or shorter than a predetermined time T2, the operator is informed of this fact. Thus, one cycle of execution of the present program is terminated.

The first electronic-component mounting machine 18 is provided with the fiducial-mark camera 510 to take the images of the fiducial marks 508 provided on the surface of the printed-wiring board 12, for detecting the horizontal positions of the board 12, so that the electronic components 468 are mounted on the board 12 while eliminating the errors of positioning of the board by the XY table 484. In this respect, there is a negligibly low possibility that the electronic components have mounting-position errors due to the errors of positioning of the printed-wiring board 12 by the XY table 484.

The present embodiment is further arranged to check if the electronic-components 468 are present on the printed-wiring board 12, for thereby inspecting the first electronic-component mounting machine 18 for abnormality. If image data obtained by the first mounted-component inspecting machine 20 indicate that any of the electronic components 468 that should be mounted, is not actually mounted (hereinafter referred to as "component-mounting failure") on the printed-wiring board 12, this board 12 is disposed as a defective product, by a board disposing device not shown. In this case, the suction nozzle 560 which was used to hold the electronic component 468 in question is considered to have an abnormality. This aspect will be described in detail by reference to the flow chart of FIG. 34. This program is repeatedly executed during the operation of the electronic-circuit fabricating system 10.

In the present embodiment, each suction nozzle 560 selected as one of the monitoring-object portions to be monitored is inspected, at the component-hold-position detecting position in the first electronic-component mounting device 18 provided as a working machine, to check if the electronic component 468 is correctly held by the component-holding head 532, before the first mounted-component inspecting machine 20 provided as an inspecting device is operated to check if the electronic component 468 is present. A result of this inspection of the suction nozzle 560 is transmitted to the monitoring device 28, as a part of the information relating to the selected monitoring-object portions.

Initially, S80 is implemented to read out information relating to the suction nozzle 560 to be inspected, from a stored batch of information of the selected monitoring-object portions, and check if the electronic component 468 was held by this suction nozzle 560 at the component-hold-position detecting position. If the electronic component 468 was not held by the suction nozzle 560 at the component-hold-position detecting position (hereinafter referred to as "component-holding failure"), a negative decision (NO) is obtained in S80, and the control flow goes to S81 to determine whether the feeder 466 assigned to supply the corresponding component-holding head 532 with the electronic component 468 at the component-receiving position accommodates the electronic component or components 468.

Described in detail, if a result of detection of the hold-position of the electronic component 468 as held by the preceding suction nozzle 560 which was assigned to receive the electronic component 468 from the same feeder 466 immediately before the detection of the component-holding failure indicates that this preceding suction nozzle 560 also suffered from the component-holding failure, it is considered that no electronic components 468 are present in the feeder 466 in question, and that this is the cause for the detected component-holding failure. In this case, the control flow goes to S82 to activate the indicating device 906 for prompting the operator to replace the feeder 466. Thus, one cycle of execution of the present program is terminated. The number of the electronic components 468 presently accommodated in each feeder 466 is counted by the control device 672 or monitoring device 28, and the component-supply table 460, 462 is retracted to a predetermined component-replenishing position before the counted number of the electronic components 468 is zeroed, so that the feeder 466 is reloaded with the electronic components 468, by splicing of a new carrier tape, for example. However, the feeder 466 may be exhausted of the electronic components 468 due to erroneous counting of the number of the remaining electronic components 468, or for any other reason. In this case, the operator is informed of this fact at a relatively early opportunity, according to the present program.

If the electronic component 468 was held by the preceding suction nozzle 560, an affirmative decision (YES) is obtained in S81, and the control flow goes to S83. In this case, the component-holding failure of the present suction nozzle 560 is considered to have been caused due to reduction of the sucking force which acted on the electronic component 468.

The suction force of the suction nozzle 560 may be reduced due to suction of dust and dirt thereinto. In the present embodiment, the monitoring device 28 is arranged to count the number Cn of operations of each suction nozzle 560, and to automatically clean the suction nozzle 560 by injection of compressed air, for example, when the number Cn of operations of the suction nozzle 560 has exceeded a predetermined cleaning interval Tc (as represented by the number of operations). According to this arrangement, there is only a low possibility that the sucking force of each suction nozzle 560 is considerably reduced due to suction of dust and dirt. However, the suction nozzle 560 is cleaned in S83 irrespective of the number of operations of the suction nozzle 560 since the last cleaning, if the suction force is considered to have been reduced. Then, S84 is implemented to read an actual cleaning interval as represented by the number Cn of operations of the suction nozzle 560 performed between the last and present cleaning operations, and determine whether the number Cn is larger than a predetermined lower limit Cmin. If the number Cn is smaller than the lower limit Cmin, a negative decision (NO) is obtained in S84, and the control goes to S85 to inform the operator that the frequency of plugging of the suction nozzle 560 is abnormally high. Thus, one cycle of execution of the present program is terminated. In this case, it is desirable to replace the suction nozzle 560 with a new one, since the expected service life of this suction nozzle 560 has been reached.

If the number Cn is larger than the lower limit Cmin, on the other hand, an affirmative decision (YES) is obtained in S84, and the control flow goes to S86 to compensate the predetermined cleaning interval Tc on the basis of the present number Cn. In this case, the mounting operation is continued. Thus, one cycle of execution of the present program is terminated.

It is noted that the present embodiment is adapted to count the cumulative number of operations of each suction nozzle 560 since the initiation of its use, and inform the operator to replace the suction nozzle when the cumulative number has exceeded a predetermined value indicating that the expected service life of the suction nozzle has been reached.

There will next be described the component-mounting failure in the case where the electronic component 468 was detected at the component-hold-position detecting position. In this case, the electronic component 468 may be considered to have been removed during its movement from the component-hold-position detecting position to the component-mounting position, or to have been carried away from the board by the suction nozzle 560 after the electronic component 468 had been once brought into contact with the printed-wiring board 12. When the electronic component 468 held by the suction nozzle was detected, an affirmative decision (YES) is obtained in S80, and the control flow goes to S87 to read a result of inspection by the first mounted-component inspecting machine 20 to detect the presence or absence of the electronic component 468, and determine whether the electronic component 468 has been mounted. If the electronic component 468 has been mounted, an affirmative decision (YES) is obtained in S87, and one cycle execution of the present program is terminated. If it is detected that the electronic component 468 has not been mounted, a negative decision (NO) is obtained in S87, and the control flow goes to S88 in which the monitoring device 28 reads in the hold position data of the electronic component 468 in question.

There will be considered the removal of the electronic component 468 during its movement from the component-hold-position detecting position to the component-mounting position. Since the first electronic-component mounting machine 18 is primarily used to mount the electronic components 468 of relatively small sizes, it is not rare that the inside diameter of the sucking end face 572 of the suction nozzle 560 is not smaller than a half of the smallest dimension of the corresponding surface of the electronic component 468. Accordingly, horizontal positioning errors of the suction nozzle 560 with respect to the electronic component 468 to be sucked may cause local projection of the sucking nozzle 560 from the periphery of the electronic component 468 sucked by the suction nozzle 560, or abutting contact of the suction nozzle 560 with a portion of the electronic component 468 the shape of which is not suitable for holding by suction by the suction nozzle 560, resulting in a reduced suction force acting on the electronic component 468. In such cases, the electronic component 468 which was detected by imaging at the component-hold-position detecting position may be removed during its movement from the component-hold-position detecting position to the component-mounting position. In view of this, S89 is implemented to determine whether the electronic component 468 was held by suction by the suction nozzle 560 without considerable amounts of positioning errors. This determination is effected on the basis of data indicative of a result of analysis of the image data obtained at the component-hold-position detecting position. If a negative decision (NO) is obtained in S89, it is considered that the electronic component 468 was removed due to an insufficient suction force, before it was mounted. In this case, the control flow goes to S90 in which the monitoring display 902 and the indicating device 906 inform the operator that the electronic component 468 was removed during its movement. Thus, one cycle of execution of the present program is terminated.

However, there is a very low possibility of removal of the electronic component 468 due to a sucking abnormality as described above, since the present embodiment is arranged to adjust the control data so as to eliminate the positioning errors of the electronic components 468 as held by the suction nozzle 560, as described above, if the amounts of the positioning errors detected at the component-hold-position detecting position were larger than the predetermined threshold state.

If the component-mounting failure occurred even in the absence of abnormality of the image data obtained at the component-hold-position detecting position, an affirmative decision (YES) is obtained in S89, and the control flow goes to S91 in which the monitoring display 902 and the indicating device 906 inform the operator that the electronic component 468 was carried away from the board 12 by the suction nozzle 560, for some reason or other, for example, due to inadequate timing of the switching action from the component-sucking state for sucking the electronic component 468 under a negative pressure, to the component-releasing state for releasing the electronic component 468 by application of the atmospheric pressure, or due to contamination of the suction nozzle 560 with the solder paste. In this case, the operator is informed of such abnormality. Thus, one cycle of execution of the present program is terminated.

Figure 34:
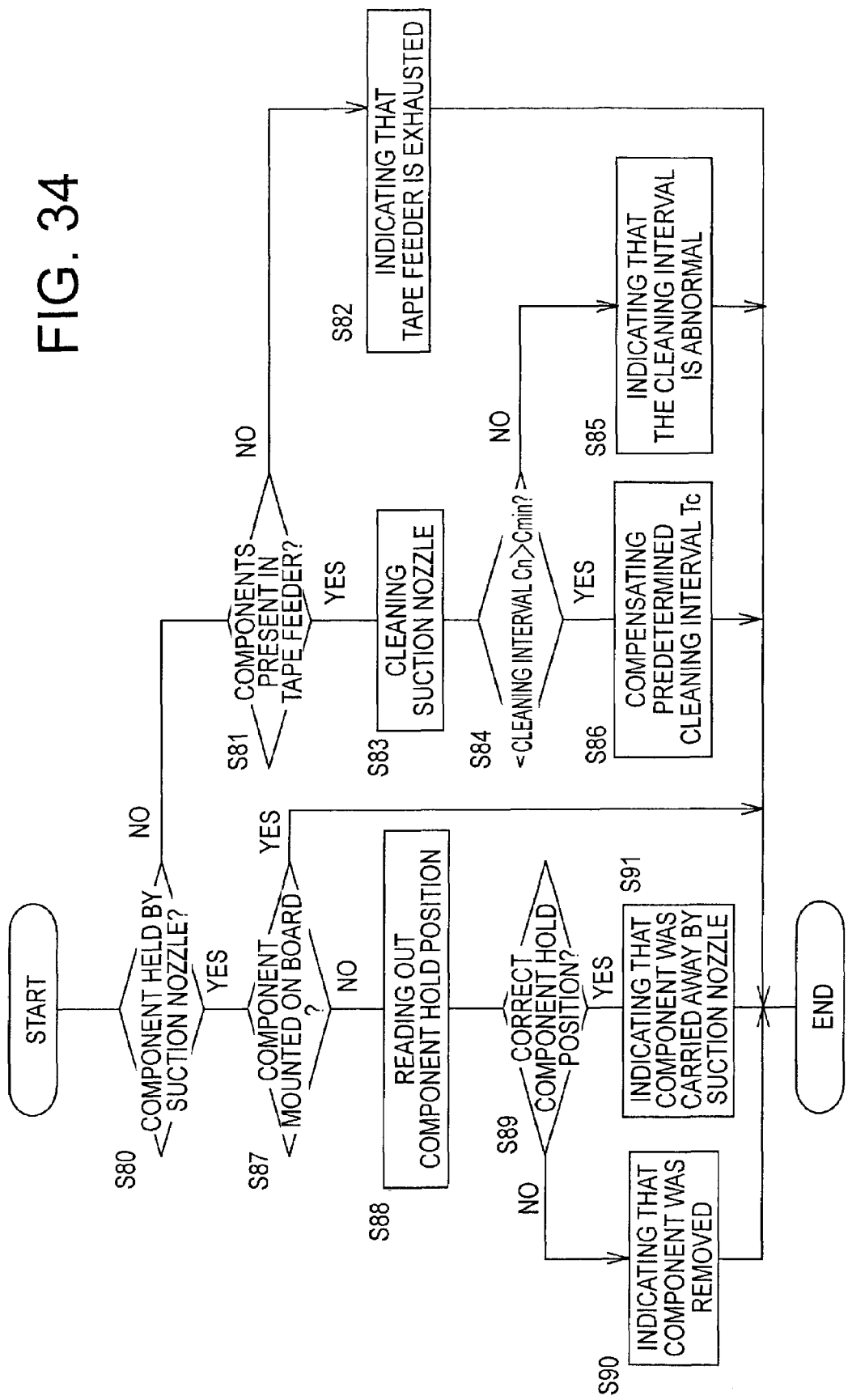
FIG. 34 is a flow chart illustrating another monitoring program for monitoring the above-indicated first electronic-component mounting machine.

It is noted that the monitoring program illustrated in the flow chart of FIG. 34 can also be used to inspect the electronic components for their presence or absence on the printed-wiring board in the second electronic-component mounting machine 22, and to inspect the suction nozzle 784 held by the component-mounting head 730 provided in the second electronic-component mounting machine 22.

The foregoing description refers to the operations to estimate the positioning errors of the selective monitoring-object portions in the form of the feeders 466, component-holding heads 532 and printed-wiring-board holding device 458 of the working machine in the form of the first electronic-component mounting machine 18. This description is based on an assumption that the fiducial-mark camera 510 for imaging the fiducial marks 508 provided on the printed-wiring board 12 does not have positioning errors. Where the fiducial-mark camera 510 may have positioning errors, it is desirable to detect the positioning errors by operating the fiducial-mark camera 510 to take an image of the sucking end face 572 of the suction nozzle 560 by using a suitable light guiding device, and to effect suitable compensation so as to eliminate the positioning errors of the camera 510, as described in co-pending U.S. patent application Ser. No. 10/159,008. No further description is provided regarding the light guiding device and the operation to detect the positioning errors of the fiducial-mark camera 510.

The suction force of the suction nozzle 560 may be reduced due to positioning errors caused by flexure or bending of the suction nozzle 560.

Next, the operation to estimate the present state of the second electronic-component mounting machine 22 will be described.

The monitoring device 28 estimates the present state of each of the selected monitoring-object portions of the second electronic-component mounting machine 22, such as the component-holding head 730 and XY positioning device 766, on the basis of the information relating to these monitoring-object portions, the control data for the monitoring-object portions, and the result of inspection by the second mounted-component inspecting machine 24, which result indicates the positioning errors of the mounted electronic components and the presence or absence of the electronic components at the respective mounting spots. The above-indicated information and control data are received from the second electronic-component mounting machine 22. Described in detail, the hold-position errors of the electronic component 468 as held by the component-holding head 730 are detected in the second electronic-component mounting machine 22, ant the second mounted-component inspecting machine 24 detects the mounting-position errors of the electric component 468 as mounted on the printed-wiring board 12, and checks if the electronic component 468 is present or absent on the board 12. On the basis of the results of these detections, the present state of the second electronic-component mounting machine 22 is estimated.

Initially, the hold-position and mounting-position errors will be described.

For the second electronic-component mounting machine 22, the component-holding head 730 is inspected on the basis of the above-indicated hold-position and mounting-position errors. In the first electronic-component mounting machine 18 wherein the electronic components 468 are mounted on the printed-wiring board 12, by movements of the feeders 466, component-holding heads 532 and printed-wiring-board holding device 458, there are a relatively large number of possible causes for the hold-position and mounting-position errors. In the second electronic-component mounting machine 22, however, the component-holding head 730 is moved by the XY positioning device 766, but the component-supplying devices 710, 712 and the printed-wiring-board holding device 706 are held stationary, so that the hold-position errors and the mounting-position errors are considered to be caused by deformation of the XY positioning device 766 due to its thermal expansion or for any other reasons. Further, the present embodiment is arranged such that the positioning errors of the printed-wiring board 12 as positioned and held by the printed-wiring-board holding device 706 are eliminated on the basis of the images of the fiducial marks 508 provided on the surface of the board 12. Accordingly, the positioning errors of the printed-wiring board 12 need not be taken into account.

Figure 35:
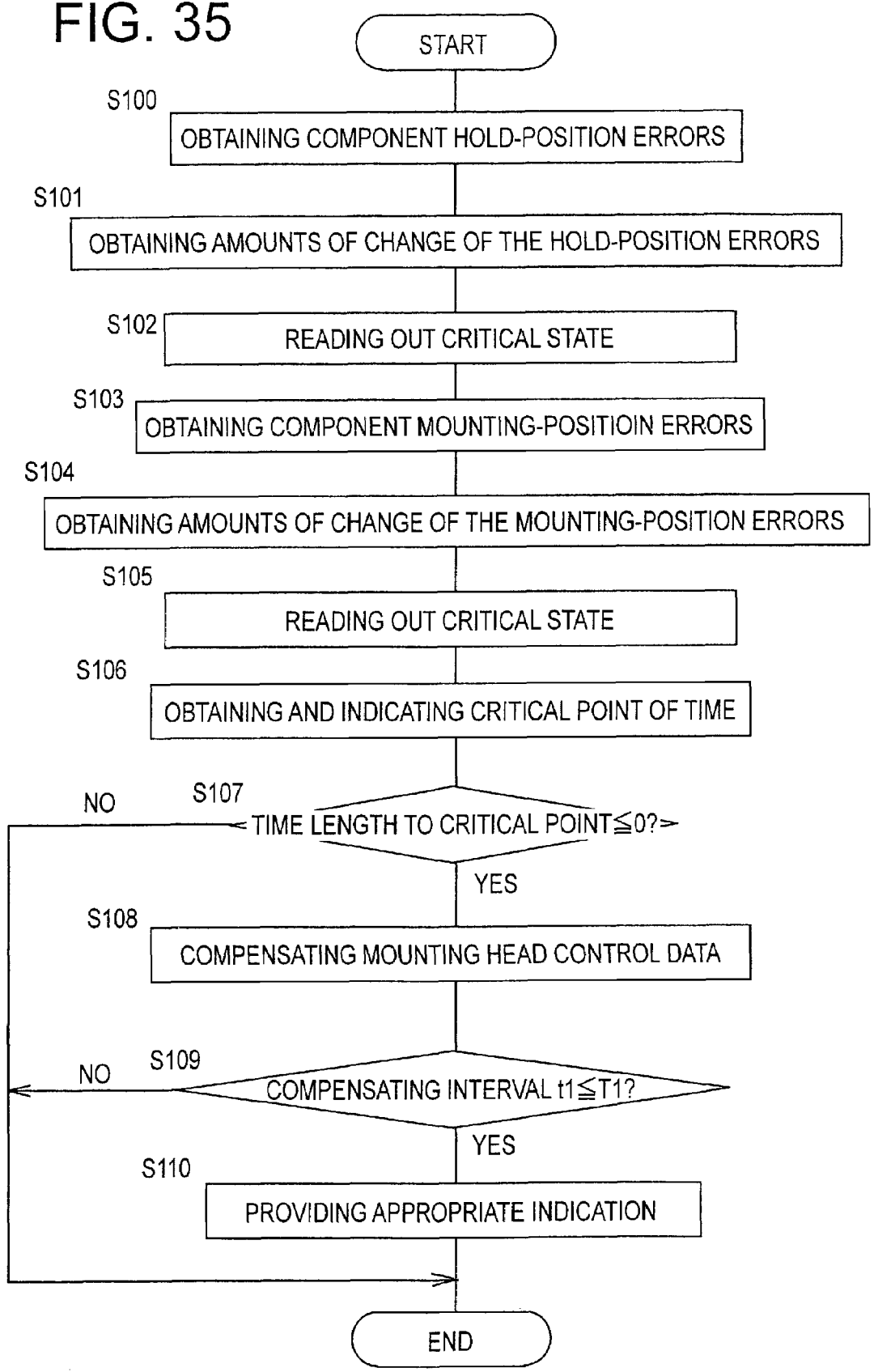
FIG. 35 is a flow chart illustrating a monitoring program for monitoring the above-indicated second electronic-component mounting machine.

The hold-position and mounting-position errors will be described by reference to the flow chart of FIG. 35.

In S100 through S105, the hold-position errors ΔXEn and ΔYEn and the mounting-position errors ΔXn and ΔYn of the electronic component 468 to be inspected are obtained, and amounts of change of these errors are obtained. Further, corresponding threshold states are read out. In the present flow chart, too, it is desirable to obtain average values of the hold-position and mounting-position errors ΔXEn, ΔYEn, ΔXn and ΔYn of all of the electronic components 468 for each printed-wiring board 12, by obtaining the values of each error of the plurality of electronic components 468 corresponding to a predetermined number of the boards 12. S105 is followed by S106 to calculate critical points of time for both the hold-position errors and the mounting-position errors. One of these two critical points of time the time length of which is shorter than the other is indicated on the monitoring display 902. S107 is implemented to determine whether the time length to the critical point of time is equal to or shorter than zero. If the time length is longer than zero, a negative decision (NO) is obtained in S107, and one cycle of execution of the present program is terminated.

If the time length to the critical point of time is equal to or shorter than zero, an affirmative decision (YES) is obtained in S107, that is, it is determined that the critical point of time of the monitoring-object portion to be monitored has been reached. In this case, the control flow goes to S108 to adjust the control data for the XY positioning device 766. S109 and S110 similar to S67 and S68 described above are implemented to determine whether a compensating interval t1 between the moments at which the control data were adjusted in the present and preceding cycles is equal to or shorter than a predetermined time T1. If the compensating interval t1 is shorter than the time T1, the monitoring display 902 and the indicating device 906 are activated to inform the operator of this fact.

According to the present program, the hold-position errors and the mounting-position errors are both monitored, to permit early detection of the positioning errors of the component-holding head 730, making it possible to improve the operating reliability of the second electronic-component mounting machine 22.

If the second electronic-component mounting machine 22 detects the component-mounting failure, the printed-wiring board 12 in question is disposed as a defective product, by a disposing device not shown, and the state of the second electronic-component mounting machine 22 is estimated, in a manner similar to those described with respect to the first electronic-component mounting machine 18 and the first mounted-component inspecting machine 20. This estimation of the state is effected according to the monitoring program as illustrated in the flow chart of FIG. 34, and will not be further described.

It will be understood from the foregoing description of the present embodiment that the electronic-circuit fabricating system 10 constitutes a circuit-substrate working system, and the mask printing machine 14 and the first and second electronic-component mounting machines 18, 22 constitute working machines, while the printed-state inspecting machine 16 and the first and second mounted-component inspecting machines 20, 24 constitute inspecting machines. It will also be understood that the portions of the monitoring device 28 assigned to implement steps S5, S26, S27, S47, S64, S107, etc. constitute a treatment-necessity detecting portion.

The present electronic-circuit fabricating system 10 permits estimation of the present state of each monitoring-object portion of each working machine, on the basis of the information of each monitoring-object portion and the information obtained by the inspecting machines provided for inspecting the working machines, and easy finding of the causes for defects of the monitoring-object portions.

The inspecting machines are disposed downstream of the respective working machines, so that the present state of each working machine can be estimated at a relatively early point of time, to permit a suitable treatment for dealing with a defect without a delay.

Further, the stored past information are effectively utilized to estimate the present state of each working machine, thereby improving its operating reliability.

The present embodiment is arranged such that when some treatment by the operator is required for a given monitoring-object portion, at least the working machine including this monitoring-object portion is turned off, and the monitoring display 902 is activated to inform the operator of the monitoring-object portion for which the treatment should be implemented. This arrangement permits the operator to initiate the required treatment immediately. However, the operator may recognize a necessity of implementing the treatment, from at least one of a fact that the working machine has been turned off, and/or the activation of the monitoring display 902 to inform the operator of the necessity.

Where the critical point of time for a given monitoring-object portion has been reached and this monitoring-object portion should be treated by the operator, the operator may be informed of any other monitoring-object portions for which the critical points of time are expected to be reached in the near future and for which some treatments should be implemented. This arrangement is effective to reduce the frequency of operational interruption of the working machines and to thereby improve their operating efficiency.

Although the critical point of time is always displayed, it may be displayed only after the time length to the critical point of time has become shorter than a predetermined positive value, that is, only after the critical point of time is expected to be reached in a short time.

In the present embodiment, the working machines in the form of the mask printing machine 14 and the first and second electronic-component mounting machines 18, 22, and the inspecting machines in the form of the printed-state inspecting machine 16 and the first and second mounted-component inspecting machines 20, 24 are disposed independently of each other. However, each inspecting machine may be replaced by an inspecting machine incorporated in the corresponding working machine. In this case, the required overall space required for installation of the electronic-circuit fabricating system can be reduced. Each inspecting machine or device may be operated after each operation of the corresponding working machine, or alternatively, after a predetermined number of operations of the working machine. Further, the inspecting machines or devices may be operated after the operations of all of the working machines have been completed on the same printed-wiring board 12. For example, the fiducial-mark camera 44 mounted on the X-axis slide 300 to image the fiducial marks on the printed-wiring board 12 in the mask printing machine 14 may be utilized to image the solder paste masses 384, while the fiducial-mark cameras 510, 800 provided in the respective first and second electronic-component mounting machines 18, 22 may be utilized to image the electronic components 468 as mounted on the printed-wiring board 12.

An adhesive-applying machine for applying an adhesive agent in the form of spots and an applied-adhesive inspecting machine for inspecting the adhesive agent applied by the adhesive-applying machine may be disposed downstream of the printed-state inspecting machine 16 and upstream of the first electronic-component mounting machine 18. An example of the adhesive-applying machine is shown in FIGS. 36 and 37.

Figure 36:
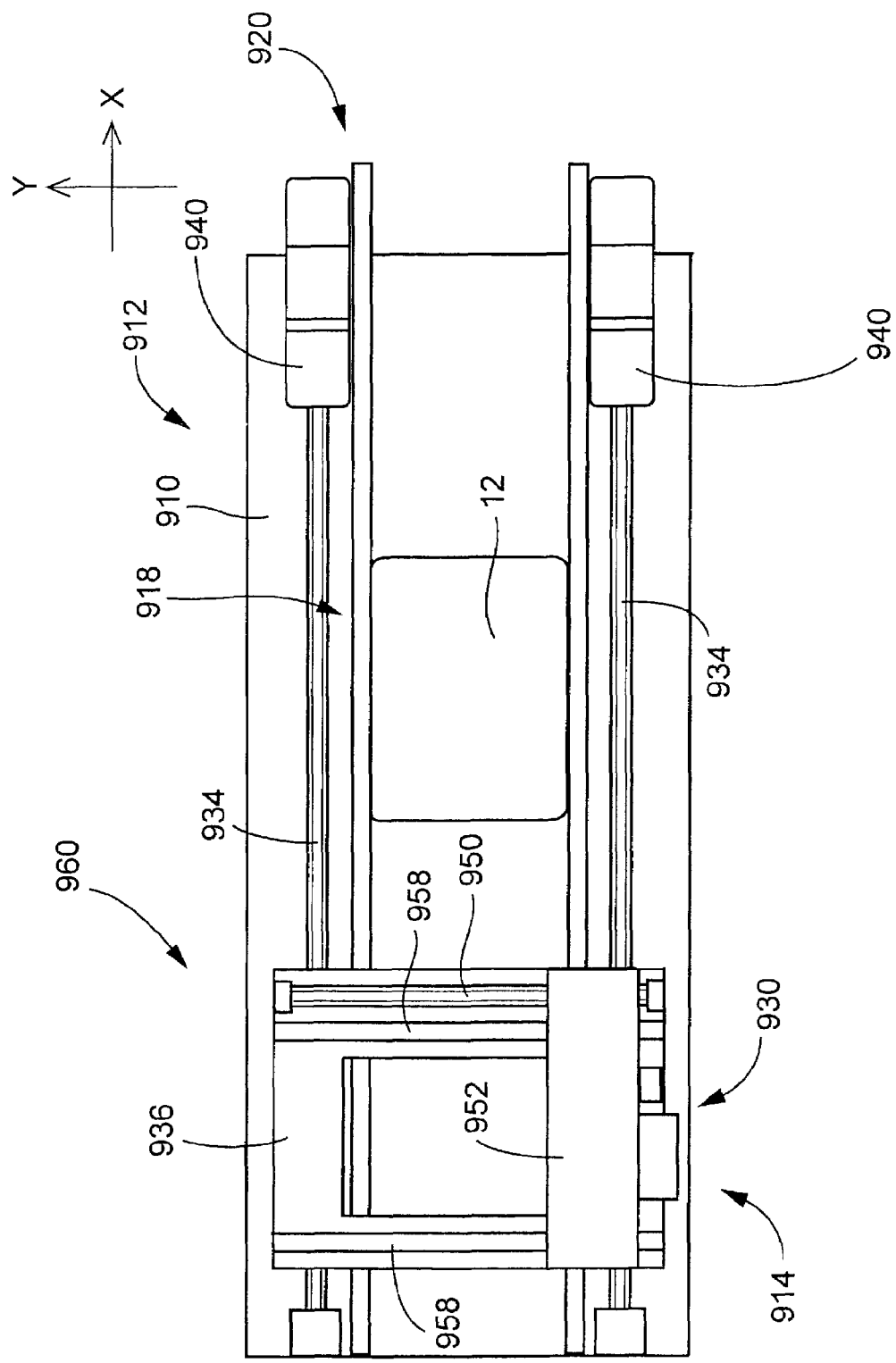
FIG. 36 is a plan view showing an adhesive coating machine provided in an electronic-circuit fabricating system according to another embodiment of the invention.

In FIG. 36, reference sign 910 denotes a machine base of an adhesive-applying machine 912. On the machine base 910, there are mounted a device for applying a high-viscosity fluid in the form of an adhesive-applying device 914, and a substrate feeding and supporting device in the form of a printed-wiring-board feeding and supporting device 918 arranged to feed, position and support the workpiece, namely, a circuit substrate in the form of the printing-wiring board 12 to which the adhesive agent is applied. The printed-wiring-board feeding and supporting device 918 has a printed-wiring-board conveyor 920 extending in a X-axis direction (in the right and left direction as seen in FIG. 36), a printed-wiring-board supporting device (not shown) disposed within the length of the printed-wiring-board conveyor 920, and a printed-wiring-board clamping device (not shown). The printed-wiring board 12 is transferred by the printed-wiring-board conveyor 920, located at a predetermined adhesive-applying position, supported by the printed-wiring-board supporting device, and clamped by the printed-wiring-board clamping device. In the clamped state, the printed-wiring board 12 is supplied with the high-viscosity fluid in the form of the adhesive agent.

The adhesive-applying device 914 has a coating unit 930, which is linearly movable in a direction having components of the mutually perpendicular X-axis and Y-axis directions, to apply the adhesive agent onto the component-mounting surface of the printed-wiring board 12 on which the electronic components 468 are to be mounted. To this end, feedscrews in the form of ballscrews 934 are disposed on the machine base 910, on respective opposite sides of the printed-wiring-board conveyor 920, as viewed in the Y-axis direction, as shown in FIG. 36, such that the ballscrews 934 extend in parallel with the X-axis direction. The ballscrews 934 are held in engagement with respective nuts 938 (shown in FIG. 37), and are rotated by respective X-axis slide drive motors 940, so that the X-axis slide 936 is moved in the X-axis direction. As shown in FIG. 37, guiding members in the form of guide rails 942 are formed on the machine base 910, such that the guide rails 942 are located below the respective two ballscrews 934, while the X-axis slide 936 has guided members in the form of guide blocks 944 which are slidable on the guide rails 942. The X-axis slide 936 is slidably moved while being guided by the guide rails 942.

On the X-axis slide 936, a feedscrew in the form of a ballscrew 950 is disposed so as to extend in the Y-axis direction, as shown in FIGS. 36 and 37, such that the ballscrew 950 is not axially movable but is rotatable. The ballscrew 950 is held in engagement with a nut (not shown) of a Y-axis slide 952. With the ballscrew 950 being rotated by a Y-axis slide drive motor 956 (shown in FIG. 37), the Y-axis slide 952 is moved in the Y-axis direction while being guided by guiding members in the form of a pair of guide rails 958. An XY robot 960 is constituted by the nuts 938, ballscrews 934, X-axis slide 936, X-axis slide drive motors 940, ballscrew 950, nut engaging the ballscrew 950, Y-axis slide 952, Y-axis slide drive motor 956, etc. In the present embodiment, the printed-wiring-board 12 is supported by the printed-wiring-board supporting device, such that the board 12 extends in the horizontal direction, and the coating unit 930 is moved by the XY robot 960 to a desired position in the horizontal plane parallel to the surface of the board 12.

The Y-axis slide 952 carries a fiducial-mark imaging device 962 arranged to image the fiducial marks 508 provided on the printed-wiring board 12. The fiducial-mark imaging device 962 is held so as to extend in the vertical direction and face downwards. The fiducial-mark imaging device 962 is disposed on the Y-axis slide 952 such that the imaging device 962 is not movable relative to the Y-axis slide 952, and is movable with the coating unit 930 in the horizontal direction.

The coating unit 930 is vertically movable on the Y-axis slide 952 toward and away from the printed-wiring board 12. To this end, the Y-axis slide 952 is provided with a pair of guiding members in the form of guide rails (not shown), which extend in the vertical direction. A Z-axis slide 970 is provided with guide blocks (not shown) which are slidably movable on the guide rails. The Z-axis slide 970 is vertically movable by a Z-axis slide drive device 972, which uses a fluid-operated cylinder as a fluid-operated actuator in the form of an air cylinder 974, as a drive source. With a movement of a piston rod 976 of the air cylinder 974, the Z-axis slide 970 connected to the piston rod 976 is vertically moved, so that the coating unit 930 disposed on the Z-axis slide 970 is movable in the direction perpendicular to the surface of the printed-wiring board 12. The air cylinder 974 provided in the present embodiment is provided with a throttling mechanism arranged to reduce a rate of flow of air into its air chambers when its piston has been moved to positions near its stroke ends, so that the Z-axis slide 970 is decelerated and stopped without a shock. The Z-axis slide 970 and the Z-axis slide drive device 972 constitute a coating-unit elevating and lowering device 978, which functions as a relative-movement device operable to move the coating unit 930 and the workpiece, in the direction perpendicular to the surface of the workpiece. The coating-unit elevating and lowering device 978 also functions as a coating-nozzle elevating and lowering device for elevating and lowering a coating nozzle which is an element of the coating unit 930. In the present embodiment, the Z-axis slide 970 constitutes a major part of the adhesive-agent applying device 914, and the XY robot 960 and the Z-axis slide drive device 970 constitute a relative-movement device for moving the Z-axis slide 970 and the printed-wiring board 12 in the directions perpendicular and parallel to the surface of the printed-wiring board 12. It is noted that the coating-unit elevating and lowering device 978 may an electric motor in the form of a servomotor, as a drive source, for moving the coating unit 930 to a desired position in the vertical direction.

The coating unit 930 is provided with the coating nozzle, a nozzle rotating device, a screw pump, a screw rotating device, and a material-supplying device or high-viscosity-fluid supplying device in the form of an adhesive-agent supplying device. These coating nozzle and other elements will not be described in detail.

The operation to apply the adhesive agent to the printed-wiring board 12 will be only briefly described.

When the adhesive agent is applied onto the printed-wiring board 12, the board 12 is loaded by the printed-wiring-board conveyor 920, and stopped at the adhesive-applying position. The printed-wiring board 12 is supported by the printed-wiring-board supporting device located below the board 12. With the printed-wiring board 12 clamped by the printed-wiring-board clamping device, the coating unit 930 is moved by the XY robot 960, to apply the adhesive agent to adhesive-agent applying spots on the printed-wiring board 12. In the present embodiment, the adhesive agent is applied to a plurality of spots on the board 12.

In the present adhesive-agent applying machine 912, the coating unit 930 is selected as one monitoring-object portion to be monitored, and the XY robot 960 is selected as another monitoring-object portion. The coating unit 930 is monitored for the delivery pressure, time and temperature of the adhesive agent, etc., while the XY robot 960 is monitored for the accuracy of positioning of the coating unit 930.

The applied-adhesive inspecting machine (not shown) is disposed on the downstream side of the adhesive-agent applying machine 912. This applied-adhesive inspecting machine is similar in construction and operation to the printed-state inspecting machine 16 described above, and is neither described nor shown in the drawings.

In this embodiment, too, the monitoring device 28 receives from the adhesive-agent applying machine 912 information on the selected monitoring-object portions described above, and information relating to a result of inspection by the applied-adhesive inspecting machine. On these information, the monitoring device 28 estimates the present state of each monitoring-object portion, and an amount of change of the state. The monitoring device 28 calculates critical points of time at which the state exceeds a predetermined threshold state, and automatically adjusts the control data if the critical point of time for at least one of the monitoring-object portions has been reached. The critical points of time are calculated on the basis of the position and amount of the actually applied adhesive agent, and the delivery pressure, time and temperature of the adhesive agent, and their amounts of change.

While the several embodiments of this invention have been described in detail, for illustrative purpose only, it is to be understood that the present invention may be embodied with various changes and improvements, such as those described in the SUMMARY OF THE INVENTION, which may occur to those skilled in the art:

What is claimed is:

1. A circuit-substrate working system comprising:

at least one working machine each operable to perform a predetermined operation on a circuit substrate and to transmit object information relating to at least one monitoring-object portion of said at least one working machine to be monitored;

at least one result-detecting device each operable to detect a result of the operation performed by said at least one working machine; and a monitoring device operable on the basis of the result detected by said each result-detecting device and said object information received from said at least one working machine, to estimate a state of each of said at least one monitoring-object portion.

2. A circuit-substrate working system according to claim 1, wherein said monitoring device includes a treatment-necessity detecting portion operable to detect a necessity to implement a treatment for at least one of said at least one monitoring-object portion, before said at least one of said at least one monitoring-object portion causes an abnormality of said predetermined operation.

3. A circuit-substrate working system according to claim 2, wherein said monitoring device includes an operation stopping portion operable to automatically stop the operation of said working machine when said treatment-necessity detecting portion has detected the necessity to implement the treatment for said at least one monitoring-object portion.

4. A circuit-substrate working system according to claim 2, wherein said monitoring device includes an indicating portion operable to inform an operator of the system, in an operator-recognizable manner, that said treatment-necessity detecting portion has detected the necessity to implement the treatment for said at least one monitoring-object portion.

5. A circuit-substrate working system according to claim 2, further comprising an automatically treating device operable when said treatment-necessity detecting portion has detected the necessity to implement the treatment for said at least one monitoring-object portion, to automatically implement said treatment.

6. A circuit-substrate working system according to claim 1, wherein said at least one result-detecting device includes an imaging device operable to image the result of said operation.

7. A circuit-substrate working system according to claim 1, wherein said at least one working machine includes an electronic-component mounting machine operable to mount electronic components on said circuit substrate.

8. A circuit-substrate working system according to claim 7, wherein said at least one monitoring-object portion includes at least one of a mounting head operable to hold said electronic components and mount said electronic components on said circuit substrate, a relative-movement device operable to move said mounting head and a substrate-holding device holding said circuit substrate, relative to each other, and a component-supplying device operable to supply said electronic components.

9. A circuit-substrate working system according to claim 8, wherein said at least one monitoring-object portion includes a plurality of mounting heads holding the respective electronic components by suction with respective suction nozzles under the negative pressure, and said electronic-component mounting machine includes a hold-position-error detecting device operable to detect hold-position errors of said electronic components as held by said suction nozzle, said at least one result-detecting device including a mounting-position-error detecting device operable to detect mounting errors of said electronic components as mounted on said circuit substrate, said monitoring device including a state-estimating portion operable to estimate the state of each of said at least one monitoring-object portion, on the basis of both said hold-position errors detected by said hold-position-error detecting device and said mounting-position errors detected by said mounting-position-error detecting device.

10. A circuit-substrate working system according to claim 8, wherein said at least one monitoring-object portion includes a plurality of said mounting heads holding the respective electronic components by suction with respective suction nozzles under the negative pressure, and said electronic-component mounting machine includes a nozzle-information supplying portion operable to supply said monitoring device with nozzle information indicative of each of the suction nozzles which was used to mount the corresponding electronic component on said circuit substrate and each of the suction nozzles which was assigned to mount the corresponding electronic component on said circuit substrate but failed to mount the electronic component on said circuit substrate, said monitoring device monitoring each of the suction nozzles on the basis of at least said nozzle information.

11. A circuit-substrate working system according to claim 8, wherein said at least one monitoring-object portion includes said component-supplying device, and said component-supplying device includes a plurality of feeders each accommodating the electronic components of a corresponding one kind and having a component-supply portion from which the electronic components are supplied one after another, and said electronic-component mounting machine includes a feeder-information supplying portion operable to supply said monitoring device with feeder information indicative of each of said plurality of feeders which was used to supply the corresponding electronic component mounted on said circuit substrate, said monitoring device monitoring each of said plurality of feeders on the basis of at least said feeder information.

12. A circuit-substrate working system according to claim 8, wherein said at least one monitoring-object portion includes said relative-movement device, and said relative-movement device includes positioning-data compensating portion operable to compensate relative-positioning data for positioning said mounting head and said substrate-holding device relative to each other, said monitoring device including a positioning-data-compensation commanding portion operable to generate a positioning-data compensating command commanding said positioning-data compensating portion to compensate said relative-positioning data, and a commanding-interval monitoring portion operable to monitor a commanding interval at which said positioning-data compensating command is generated.

13. A circuit-substrate working system according to claim 7, wherein said at least one result-detecting device includes an imaging device operable to image said electronic components mounted on said circuit substrate before the electronic components are fixed on said circuit substrate.

14. A circuit-substrate working system according to claim 7, wherein said at least one result-detecting device includes a detecting machine disposed downstream of said electronic-component mounting machine, and said detecting machine is operable after said plurality of electronic components have been mounted on one circuit substrate by said electronic-component mounting machine, to effect at least one of detection as to whether at least one of the electronic components is present or absent at a predetermined mounting spot on said circuit substrate, and detection of mounting-position errors of at least one of the electronic components as mounted on said circuit substrate.

15. A circuit-substrate working system according to claim 7, wherein said at least one result-detecting device includes a detecting device incorporated in said electronic-component mounting machine and operable after said plurality of electronic components have been mounted on one circuit substrate by said electronic-component mounting machine, to effect at least one of detection as to whether at least one of the electronic components is present or absent at a predetermined mounting spot on said circuit substrate, and detection of mounting-position errors of at least one of the electronic components as mounted on said circuit substrate.

16. A circuit-substrate working system according to claim 7, wherein said at least one result-detecting device includes a detecting device incorporated in said electronic-component mounting machine and operable during mounting of said plurality of electronic components on one circuit substrate by said electronic-component mounting machine, to effect at least one of detection as to whether at least one of the electronic components is present or absent at a predetermined mounting spot on said circuit substrate, and detection of mounting-position errors of at least one of the electronic components as mounted on said circuit substrate.

17. A circuit-substrate working system according to claim 1, wherein said at least one working machine includes a high-viscosity-fluid applying machine operable to applying to said circuit substrate a high-viscosity fluid for provisionally fixing said electronic components on said circuit substrate.

18. A circuit-substrate working system according to claim 17, wherein said high-viscosity-fluid applying machine includes a screen printing machine operable to apply by printing said high-viscosity fluid to said circuit substrate through a plurality of apertures formed through a screen.

19. A circuit-substrate working system according to claim 18, wherein said at least one monitoring-object portion includes at least one of said screen, a position-adjusting device operable to adjust a position of said screen in a direction parallel to a surface of said screen, and a squeegee device movable on said screen and operable to fill said plurality of apertures with said high-viscosity fluid.

20. A circuit-substrate working system according to claim 17, wherein said high-viscosity-fluid applying machine comprises a dispenser including:

a substrate-holding device operable to position and hold said circuit substrate;

a coating head operable to apply said high-viscosity fluid in the form of spots at respective predetermined positions on said circuit substrate held by said substrate-holding device; and a relative-movement device operable to move said coating head and said substrate-holding device relative to each other, and wherein said at least one monitoring-object portion includes at least one of said substrate-holding device, said coating head and said relative-movement device.

21. A circuit substrate working system according to claim 1, wherein said monitoring device includes a treatment-time estimating portion operable on the basis of past data and present data of said object information relating to at least one of said at least one monitoring-object portion, to estimate a point of time at which a treatment for said at least one monitoring-object portion is expected to become necessary.

22. A circuit-substrate working system according to claim 21, wherein said monitoring device includes:

a treatment commanding portion operable on the basis of the estimation by said treatment-time estimating portion, to generate a treatment command commanding said at least one working machine to implement the treatment for at least one of said at least one monitoring-object portion; and a commanding-interval monitoring portion operable to monitor a commanding interval at which said treatment command is generated by said treatment commanding portion for each of said at least one monitoring-object portion.

23. A circuit-substrate working system according to claim 1, wherein said monitoring device includes:

a treatment commanding portion operable to generate a treatment command for implementing a treatment in relation to at least one of said at least one monitoring-object portion of at least one of said at least one working machine; and an effect-obtaining portion operable to obtain an effect provided by said treatment implemented according to said treatment command generated by said treatment commanding portion.

24. A circuit-substrate working system according to claim 23, wherein said monitoring device includes a determining portion operable to determine that said treatment command is inadequate, if said effect obtained by said effect-obtaining portion is smaller than a predetermined effect.

25. A circuit-substrate working system according to claim 1, wherein said monitoring device includes:

a compensation commanding portion operable to generate a command requiring compensation of control data relating to at least one of said at least one monitoring-object portion of at least one of said at least one working machine; and an inspection prompting portion operable when said control data as compensated according to said command of said compensation commanding portion have reached a limit of a permissible range, to prompt an operator of the system to inspect said control data of the working machine.

26. A circuit-substrate working system according to claim 17, wherein said monitoring device includes:

a treatment commanding portion operable to generate a treatment command for implementing a treatment in relation to at least one of said at least one monitoring-object portion of at least one of said at least one working machine;

an effect-obtaining portion operable to obtain an effect provided by said treatment implemented according to said treatment command generated by said treatment commanding portion; and a high-viscosity-fluid-inspection prompting portion operable when said effect obtained by said effect-obtaining portion is smaller than a predetermined effect, to prompt an operator of said high-viscosity-fluid applying machine to inspect said high-viscosity fluid for its property.

27. A circuit-substrate working system according to claim 17, wherein said monitoring device includes:

a compensation commanding portion operable to generate a command requiring compensation of control data relating to at least one of said at least one monitoring-object portion of at least one of said at least one working machine; and a high-viscosity-fluid-inspection prompting portion operable when said control data as compensated according to said command of said compensation commanding portion have reached a limit of a permissible range, to prompt an operator of said high-viscosity-fluid applying machine to inspect said high-viscosity fluid for its property.

28. A circuit-substrate working system according to claim 1, wherein said at least one working machine includes a plurality of working machines, and said monitoring device includes a computer commonly used for said plurality of working machines.

29. A process of mounting electronic components on circuit substrates, to fabricate electronic circuits, by using a circuit-substrate working system including (a) at least one electronic-component mounting machine each operable to mount the electronic components on the circuit substrates and to transmit object information relating to at least one monitoring-object portion thereof to be monitored, (b) at least one result-detecting device each operable to detect a result of an operation of said at least one electronic-component mounting machine to mount said electronic components, and (c) a monitoring device operable on the basis of the result detected by said each result-detecting device and said object information received from said at least one electronic-component mounting machine, to estimate a state of each of said at least one monitoring-object portion, wherein said at least one result-detecting device includes a detecting machine disposed downstream of a corresponding one of said at least one electronic-component mounting machine and operable after said plurality of electronic components have been mounted on one circuit substrate by said corresponding one electronic-component mounting machine, to effect at least one of detection as to whether each of at least one of the electronic components is present or absent at a predetermined mounting spot on said circuit substrate, and detection of mounting-position errors of at least one of the electronic components as mounted on said circuit substrate, the electronic circuits being fabricated while the state of said at least one electronic-component mounting machine is monitored by said monitoring device on the basis of the result detected by said detecting machine and said object information.

30. A process of mounting electronic components on circuit substrates, to fabricate electronic circuits, by using a circuit-substrate working system including (a) at least one electronic-component mounting machine each operable to mount the electronic components on the circuit substrates and to transmit object information relating to at least one monitoring-object portion thereof to be monitored, (b) at least one result-detecting device each operable to detect a result of an operation of said at least one electronic-component mounting machine to mount said electronic components, and (c) a monitoring device operable on the basis of the result detected by said each result-detecting device and said object information received from said at least one electronic-component mounting machine, to estimate a state of each of said at least one monitoring-object portion, wherein said at least one result-detecting device includes a detecting device incorporated in a corresponding one of said at least one electronic-component mounting machine and operable after said plurality of electronic components have been mounted on one circuit substrate by said corresponding one electronic-component mounting machine, to effect at least one of detection as to whether each of at least one of the electronic components is present or absent at a predetermined mounting spot on said circuit substrate, and detection of mounting-position errors of at least one of the electronic components as mounted on said circuit substrate, the electronic circuits being fabricated while the state of said at least one electronic-component mounting machine is monitored by said monitoring device on the basis of the result detected by said detecting device and said object information.

31. A process of mounting electronic components on circuit substrates, to fabricate electronic circuits, by using a circuit-substrate working system including (a) at least one electronic-component mounting machine each operable to mount the electronic components on the circuit substrates and to transmit object information relating to at least one monitoring-object portion thereof to be monitored, (b) at least one result-detecting device each operable to detect a result of an operation of said at least one electronic-component mounting machine to mount said electronic components, and (c) a monitoring device operable on the basis of the result detected by said each result-detecting device and said object information received from said at least one electronic-component mounting machine, to estimate a state of each of said at least one monitoring-object portion, wherein said at least one result-detecting device includes a detecting device incorporated in a corresponding one of said at least one electronic-component mounting machine and operable during mounting of said plurality of electronic components on one circuit substrate by said corresponding one electronic-component mounting machine, to effect at least one of detection as to whether each of at least one of the electronic components is present or absent at a predetermined mounting spot on said circuit substrate, and detection of mounting-position errors of at least one of the electronic components as mounted on said circuit substrate, the electronic circuits being fabricated while the state of said at least one electronic-component mounting machine is monitored by said monitoring device on the basis of the result detected by said detecting device and said object information are fabricated.

* * * * *